(12) United States Patent
Zhang et al.

(10) Patent No.: US 11,425,398 B2
(45) Date of Patent: Aug. 23, 2022

(54) SIMPLIFICATION OF COMBINED INTER-INTRA PREDICTION

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/154,680

(22) Filed: Jan. 21, 2021

(65) Prior Publication Data

US 2021/0144366 A1 May 13, 2021

Related U.S. Application Data

(63) Continuation of application No. PCT/CN2019/117508, filed on Nov. 12, 2019.

(30) Foreign Application Priority Data

Nov. 12, 2018 (WO) ................ PCT/CN2018/115042
Nov. 16, 2018 (WO) ................ PCT/CN2018/115840
(Continued)

(51) Int. Cl.
*H04N 19/107* (2014.01)
*H04N 19/159* (2014.01)
(Continued)

(52) U.S. Cl.
CPC ......... *H04N 19/159* (2014.11); *H04N 19/105* (2014.11); *H04N 19/107* (2014.11);
(Continued)

(58) Field of Classification Search
CPC ..... G06T 15/005; G06T 15/40; G06T 15/405; G06T 15/80; G06T 1/20; G06T 1/60;
(Continued)

(56) References Cited

U.S. PATENT DOCUMENTS 9,374,578 B1  6/2016  Mukherjee et al.
9,554,150 B2  1/2017  Zhang et al.
(Continued)

FOREIGN PATENT DOCUMENTS

CN   101877785 A   11/2010
CN   101911706 A   12/2010
(Continued)

OTHER PUBLICATIONS

Alshin et al. "EE3: Bi-Directional Optical Flow w/o Block Extension," Joint Video Exploration Team (JVET) of ITU-T SG 16 WP3 and ISO/IEC JTC 1/SC 29/WG 11, 5th Meeting, Geneva, CH, Jan. 12-20, 2020, document JVET-E0028, 2017.
(Continued)

*Primary Examiner* — Md N Haque
(74) *Attorney, Agent, or Firm* — Perkins Coie LLP

(57) ABSTRACT

Techniques for implementing video processing techniques are described. In one example implementation, a method of video processing includes determining, for a conversion between a current block of a video coded using a combined inter and intra prediction (CIIP) coding technique and a bitstream representation of the video, an intra-prediction mode of the current block independently from an intra-prediction mode of a neighboring block. The CIIP coding technique uses an intermedia inter prediction value and an
(Continued)

intermedia intra prediction value to derive a final prediction value of the current block. The method also includes performing the conversion based on the determining.

19 Claims, 32 Drawing Sheets

(30) Foreign Application Priority Data

| | | |
|---|---|---|
| Jan. 2, 2019 | (WO) | PCT/CN2019/070060 |
| Jan. 6, 2019 | (WO) | PCT/CN2019/070549 |
| Feb. 20, 2019 | (WO) | PCT/CN2019/075546 |
| Feb. 22, 2019 | (WO) | PCT/CN2019/075858 |
| Mar. 6, 2019 | (WO) | PCT/CN2019/077179 |
| Mar. 20, 2019 | (WO) | PCT/CN2019/078939 |
| Mar. 24, 2019 | (WO) | PCT/CN2019/079397 |

(51) Int. Cl.
| | |
|---|---|
| *H04N 19/105* | (2014.01) |
| *H04N 19/117* | (2014.01) |
| *H04N 19/96* | (2014.01) |
| *H04N 19/176* | (2014.01) |
| *H04N 19/186* | (2014.01) |
| *H04N 19/577* | (2014.01) |

(52) U.S. Cl.
CPC ......... *H04N 19/117* (2014.11); *H04N 19/176* (2014.11); *H04N 19/186* (2014.11); *H04N 19/577* (2014.11); *H04N 19/96* (2014.11)

(58) Field of Classification Search
CPC ... G06T 2200/04; G06T 2200/28; G06T 7/50; G06T 7/70
See application file for complete search history.

(56) References Cited

U.S. PATENT DOCUMENTS

| | | | |
|---|---|---|---|
| 10,757,420 B2 | 8/2020 | Zhang et al. | |
| 10,778,997 B2 | 9/2020 | Zhang et al. | |
| 10,855,992 B2 | 12/2020 | Ye | |
| 10,893,267 B2 | 1/2021 | Jang et al. | |
| 11,057,642 B2 | 7/2021 | Zhang et al. | |
| 2011/0090969 A1* | 4/2011 | Sung | H04N 19/14 375/240.25 |
| 2012/0230405 A1 | 9/2012 | An et al. | |
| 2012/0257678 A1 | 10/2012 | Zhou et al. | |
| 2013/0051467 A1 | 2/2013 | Zhou et al. | |
| 2013/0089145 A1 | 4/2013 | Guo et al. | |
| 2013/0136179 A1 | 5/2013 | Lim et al. | |
| 2013/0202037 A1 | 8/2013 | Wang et al. | |
| 2013/0272415 A1 | 10/2013 | Zhou | |
| 2013/0279596 A1 | 10/2013 | Gisquet et al. | |
| 2013/0287097 A1* | 10/2013 | Song | H04N 19/117 375/240.03 |
| 2014/0002594 A1 | 1/2014 | Chan et al. | |
| 2014/0003512 A1 | 1/2014 | Sato | |
| 2014/0072041 A1 | 3/2014 | Seregin et al. | |
| 2014/0226721 A1 | 8/2014 | Joshi et al. | |
| 2014/0294078 A1 | 10/2014 | Seregin et al. | |
| 2015/0043634 A1* | 2/2015 | Lin | H04N 19/11 375/240.12 |
| 2015/0063440 A1 | 3/2015 | Pang et al. | |
| 2015/0195527 A1 | 7/2015 | Zhou et al. | |
| 2015/0229955 A1 | 8/2015 | Seregin et al. | |
| 2015/0264396 A1 | 9/2015 | Zhang et al. | |
| 2015/0373358 A1 | 12/2015 | Pang et al. | |
| 2016/0219278 A1 | 7/2016 | Chen et al. | |
| 2016/0227214 A1 | 8/2016 | Rapaka et al. | |
| 2016/0249056 A1 | 8/2016 | Tsukuba et al. | |
| 2016/0360205 A1 | 12/2016 | Chang et al. | |
| 2017/0034526 A1 | 2/2017 | Rapaka et al. | |
| 2017/0332095 A1 | 11/2017 | Zou et al. | |
| 2017/0332099 A1 | 11/2017 | Lee et al. | |
| 2018/0014028 A1 | 1/2018 | Liu et al. | |
| 2018/0109806 A1 | 4/2018 | Zhou et al. | |
| 2018/0176596 A1 | 6/2018 | Jeong et al. | |
| 2018/0249156 A1 | 8/2018 | Heo et al. | |
| 2018/0278942 A1 | 9/2018 | Zhang et al. | |
| 2018/0288410 A1* | 10/2018 | Park | H04N 19/105 |
| 2018/0295385 A1 | 10/2018 | Alshin et al. | |
| 2018/0309983 A1* | 10/2018 | Heo | H04N 19/139 |
| 2018/0310017 A1 | 10/2018 | Chen et al. | |
| 2018/0352223 A1 | 12/2018 | Chen et al. | |
| 2018/0376148 A1 | 12/2018 | Zhang et al. | |
| 2018/0376149 A1 | 12/2018 | Zhang et al. | |
| 2019/0045184 A1 | 2/2019 | Zhang et al. | |
| 2020/0051288 A1* | 2/2020 | Lim | G06T 9/004 |
| 2020/0137422 A1 | 4/2020 | Misra et al. | |
| 2020/0177878 A1 | 6/2020 | Choi et al. | |
| 2020/0213590 A1 | 7/2020 | Kim et al. | |
| 2020/0252605 A1 | 8/2020 | Xu et al. | |
| 2020/0260070 A1 | 8/2020 | Yoo et al. | |
| 2020/0277878 A1* | 9/2020 | Avis | F16N 29/02 |
| 2020/0314432 A1 | 10/2020 | Wang et al. | |
| 2021/0105485 A1 | 4/2021 | Zhang et al. | |
| 2021/0144388 A1 | 5/2021 | Zhang et al. | |
| 2021/0144392 A1 | 5/2021 | Zhang et al. | |
| 2021/0211716 A1 | 7/2021 | Zhang et al. | |
| 2021/0297688 A1 | 9/2021 | Xu et al. | |

FOREIGN PATENT DOCUMENTS

| | | |
|---|---|---|
| CN | 102037732 A | 4/2011 |
| CN | 102934444 A | 2/2013 |
| CN | 103202016 A | 7/2013 |
| CN | 104702957 A | 6/2015 |
| CN | 105103556 A | 11/2015 |
| CN | 105163116 A | 12/2015 |
| CN | 105959698 A | 9/2016 |
| CN | 107925775 A | 4/2018 |
| CN | 107995489 A | 5/2018 |
| CN | 108702515 A | 10/2018 |
| EP | 3301918 A1 | 4/2018 |
| EP | 3367681 A1 | 8/2018 |
| EP | 3383045 A1 | 10/2018 |
| EP | 3849184 A1 | 7/2021 |
| JP | 2013240046 A | 11/2013 |
| KR | 100203281 B1 | 6/1999 |
| WO | 2005022919 A1 | 3/2005 |
| WO | 2008048489 A2 | 4/2008 |
| WO | 2013111596 A1 | 8/2013 |
| WO | 2015180014 A1 | 12/2015 |
| WO | 2015192353 A1 | 12/2015 |
| WO | 2016078511 A1 | 5/2016 |
| WO | 2017138393 A1 | 8/2017 |
| WO | 2017156669 A1 | 9/2017 |
| WO | 2017197146 A1 | 11/2017 |
| WO | 2018033661 A1 | 2/2018 |
| WO | 2018048265 A1 | 3/2018 |
| WO | 2018062892 A1 | 4/2018 |
| WO | 2018067823 A1 | 4/2018 |
| WO | 2018113658 A1 | 6/2018 |
| WO | 2018210315 A1 | 11/2018 |
| WO | 2021058033 A1 | 4/2021 |

OTHER PUBLICATIONS

Bross et al. "Versatile Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.

Bross et al. "CE3: Multiple Reference Line Intra Prediction (Test1. 1.1, 1.1.2, 1.1.3 and 1.1.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0283, 2018.

Bross et al. "Versatile Video Coding (Draft 3)," Joint Video Experts Team (JVET) of ITU-T SG 16 WP 3 and ISO/IEC JTC 1/SC 29/WG

(56) References Cited

OTHER PUBLICATIONS 11, 12th Meeting, Macao, CN, Oct. 3-12, 2018, document JVET-L1001, 2018.
Chen et al. "Generalized Bi-Prediction for Inter Coding," Joint Video Exploration Team (JVET) of ITU-T SG 16 WP 3 and ISO/IEC JTC 1/SC 29/WG 11, 3rd Meeting, Geneva, CH, May 26-Jun. 1, 2016, document JVET-C0047, 2016.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
Chen et al. "CE4: Affine Merge Enhancement (Test 2.10)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0186, 2018.
Chen et al. "AHG5: Reducing VVC Worst-Case Memory Bandwidth by Restricting Bi-Directional 4×4 Inter CUs/Sub-blocks," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0104, 2018.
Chen et al. "CE4: Cross-Model Inheritance for Affine Candidate Derivation (Test 4.1.1)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0363, 2018.
Chen et al. "CE4: Common Base for Affine Merge Mode (Test 4.2.1)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0366, 2018.
Chen et al. "CE4: Affine Merge Enhancement with Simplification (Test 4.2.2)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0368, 2018.
Chen et al. "CE2.5.1: Simplification of SbTMVP," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0165, 2019.
Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0100, 2018.
Deng et al. "CE4-1.14 Related: Block Size Limitation of Enabling TPM and GEO," Joint Video Experts Team (JVET) of ITU-T SG 16 WP 3 and ISO/IEC JTC 1/SC 29/WG 11, 16th Meeting, Geneva, CH, Oct. 1-11, 2019, document JVET-P0663, 2019.
https://vcgit.hhi.fraunhofer.de/jvet/VVCSoftware_VTM/tags/VTM-2.1.
JEM-7.0: https://jvet.hhi.fraunhofer.de/svn/svn_HMJEMSoftware/tags/ HM-16.6-JEM-7.0.(only website).
VTM-2.0.1;http:vcgit.hhi.fraunhofer.de/jvet/VVCSoftware_VTM/tags/VTM-2.0.1.
Gao et al. "CE4-Related: Sub-block MV Clipping in Affine Prediction," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0317, 2018.
Gao et al. "CE4-Related: Sub-block MV Clipping in Planar Motion Vector Prediction," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0319, 2018.
He et al. "CE4-Related: Encoder Speed-Up and Bug Fix for Generalized Bi-Prediction in BMS-2.1," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0296, 2018.
H.265/HEVC, https://www.itu.int/rec/T-REC-H.265.(only website).
Jeong et al. "CE4 Ulitmate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.
Lee et al. "CE4: Simplified Affine MVP List Construction (Test 4.1.4)," Joint Video Experts Team (JVET) of ITU-T SG 16 WP 3 and ISO/IEC JTC 1/SC 29/WG 11, 12th Meeting, Macau, CN, Oct. 8-12, 2018, document JVET-L0141, 2018.
Li et al. "AHG5: Reduction of Worst Case Memory Bandwidth," Joint Video Exploration Team (JVET) of ITU-T SG 16 WP 3 and iSO/IEC JTC 1/SC 29/WG 11, 12th Meeting: Macao, CN, Oct. 3-12, 2018, document JVET-L0122, 2018.
Liao et al. "CE10.3.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124, 2018.
Lin et al. "CE4.2.3: Affine Merge Mode," Joint Video Experts Team (JVET) of ITU-T SG 16 WP 3 and ISO/IEC JTC 1/SC 29/WG 11, 12th Meeting, Macao, CN Oct. 3-12, 2018, document JVET-L0088, 2018.
Liu et al. "CE2-Related: Disabling Bi-Prediction or Inter-Prediction for Small Blocks," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0266, 2018.
Luo et al. "CE2-Related: Prediction Refinement with Optical Flow for Affine Mode," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0236, 2019.
Racape et al. "CE3-Related: Wide-Angle Intra Prediction for Non-Square Blocks," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0500, 2018.
Sethuraman, Sriram. "CE9: Results of DMVR Related Tests CE9. 2.1 and CE9.2.2," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0147, 2019.
Su et al. "CE4.4.1: Generalized Bi-Prediction for Inter Coding," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0248, 2018.
Su et al. "CE4-Related: Generalized Bi-Prediction Improvements," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0197, 2018.
Su et al. "CE4-Related: Generalized Bi-Prediction Improvements Combined from JVET-L0197 and JVET-L0296," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0646, 2018.
Van et al. "CE4-Related: Affine Restrictions for the Worst-Case Bandwidth Reduction," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0396, 2018.
Xiu et al. "CE9-Related: Complexity Reduction and Bit-Width Control for Bi-Directional Optical Flow (BIO)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0256, 2018.
Yang et al. "CE4-Related: Control Point MV Offset for Affine Merge Mode," Joint Video Experts Team (JVET) of ITU-T SG 16 WP 3 and ISO/IEC JTC 1/SC 29/WG 11, 12th Meeting, Macao, CN, oct. 3-12, 2018, document JVET-L0389, 2018.
International Search Report and Written Opinion from International Patent Application No. PCT/CN2019/117508 dated Feb. 1, 2020 (9 pages).
International Search Report and Written Opinion from International Patent Application No. PCT/CN2019/117512 dated Jan. 31, 2020 (9 pages).
International Search Report and Written Opinion from International Patent Application No. PCT/CN2019/117519 dated Feb. 18, 2020 (12 pages).
International Search Report and Written Opinion from International Patent Application No. PCT/CN2019/117523 dated Feb. 18, 2020 (10 pages).
International Search Report and Written Opinion from International Patent Application No. PCT/CN2019/117528 dated Jan. 31, 2020 (9 pages).

(56) References Cited

OTHER PUBLICATIONS

International Search Report and Written Opinion from International Patent Application No. PCT/CN2019/117580 dated Jan. 23, 2020 (10 pages).
International Search Report and Written Opinion from International Patent Application No. PCT/CN2019/118779 dated Feb. 7, 2020 (9 pages).
International Search Report and Written Opinion from International Patent Application No. PCT/CN2019/118788 dated Jan. 23, 2020 (8 pages).
International Search Report and Written Opinion from International Patent Application No. PCT/CN2020/078107 dated Jun. 4, 2020 (10 pages).
International Search Report and Written Opinion from International Patent Application No. PCT/CN2020/078108 dated May 29, 2020 (12 pages).
International Search Report and Written Opinion from International Patent Application No. PCT/CN2020/080824 dated Jun. 30, 2020 (10 pages).
Cha et al. "Improved Combined Inter-Intra Prediction Using Spatial-Variant Weighted Coefficient," School of Electronic and Computer Engineering, Hong Kong University of Science and Technology, 2011.
Jin et al. "Combined Inter-Intra Prediction for High Definition Video Coding," Picture Coding Symposium, Nov. 2007.
Non-Final Office Action from U.S. Appl. No. 17/154,795 dated Apr. 21, 2021.
Non-Final Office Action from U.S. Appl. No. 17/154,736 dated Apr. 27, 2021.
Extended European Search Report from European Application No. 19883887.2 dated Aug. 20, 2021.
Notice of Allowance from U.S. Appl. No. 17/154,736 dated Aug. 3, 2021.
Non-Final Office Action from U.S. Appl. No. 17/356,321 dated Aug. 13, 2021.
Notice of Allowance from U.S. Appl. No. 17/356,275 dated Sep. 10, 2021.
Final Office Action from U.S. Appl. No. 17/154,639 dated Sep. 22, 2021.
Partial Supplementary European Search Report from European Application No. 19885858.1 dated Oct. 28, 2021.
Notice of Allowance from U.S. Appl. No. 17/154,639 dated Dec. 1, 2021.
Final Office Action from U.S. Appl. No. 17/154,795 dated Jan. 25, 2022.
Sullivan et al. "Overview of the High Efficiency Video Coding (HEVC) Standard", IEEE Transaction on Circuits and Systems for Video Technology, Dec. 2012, 22 (12):1649-1668. (cited in EP20766860.9 EESR mailed Feb. 16, 2022).
Van et al. "Non-CE3: Removal of Chroma 2xN Blocks in CIIP Mode,", Joint Video Expert Team (JVET) of ITU-T SG 16 WP 3 and ISO/IEC JTC 1/SC 29/WG 11 16th Meeting, Geneva, CH Oct. 1-11, 2019, document JVET-P0596, 2019. (cited in EP19885858.1 EESR mailed Feb. 16, 2022).
Extended European Search Report from European Application No. 19885858.1 dated Feb. 16, 2022.
Extended European Search Report Application No. 20766860.9 dated Feb. 16, 2022.
Albrecht et al. "Description of SDR, HDR and 360 Degree Video Coding Technology Proposal by Fraunhofer HHI," Joint Video Experts Team (JVET0 of ITU-SG 16 WP 3 and ISO/IEC JTC 1/SC 29/WG11, 10th Meeting, San Diego, US, Apr. 10-20, 2018, document JVET-J0014, 2018. (cited in EP19883617.3 EESR dated Apr. 11, 2022).
Chen et al. "CE4-Related: Reducing Worst Case Memory Bandwidth in Inter Predicition," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0371, 2018. (cited in JP2021-522970 OA dated Apr. 26, 2022).
Chen et al. "Algorithm Description for Versatile Video Coding and Test Model 4 (VTM 4)" Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M1002, 2019. (cited in EP20766773.4 EESR dated Feb. 25, 2022).
Liao et al. "CE10: Triangular Prediction Unit Mode (CE10.3.1 and CE10.3.2)," Joint Video Exploration Team (JVET) of ITU-T SG 16 WP 3 and ISO/IEC JTC 1/SC 29/WG 11 11th Meeting, Ljubljana, SI, Jul. 10-18, 2018 document JVET-K0144, 2018. (cited in JP2021-522970 OA dated Apr. 26, 2022).
Zhang et al. "CE4.5.2: Motion Compensated Boundary Pixel Padding," Joint Video Exploration Team (JVET) of ITU-T SG 16 WP 3 and ISO/IEC JTC 1/SC 29/WG 11, 11th Meeting, Ljubljana, SI, Jul. 10-18, 2018, document JVET-K0363, 2018. (cited in EP19883617.3 EESR dated Apr. 11, 2022).
Extended European Search Report from European Application No. 20766773.4 dated Feb. 25, 2022.
Extended European Search Report from European Application No. 19883617.3 dated Apr. 11, 2022.

* cited by examiner

SIMPLIFICATION OF COMBINED INTER-INTRA PREDICTION

CROSS REFERENCE TO RELATED APPLICATIONS

This application is a continuation of International Application No. PCT/CN2019/117508, filed on Nov. 12, 2019, which claims the priority to and benefits of International Patent Application No. PCT/CN2018/115042, filed on Nov. 12, 2018, International Patent Application No. PCT/CN2018/115840, filed on Nov. 16, 2018, International Patent Application No. PCT/CN2019/070060, filed on Jan. 2, 2019, International Patent Application No. PCT/CN2019/070549, filed on Jan. 6, 2019, International Patent Application No. PCT/CN2019/075546, filed on Feb. 20, 2019, International Patent Application No. PCT/CN2019/075858, filed on Feb. 22, 2019, International Patent Application No. PCT/CN2019/077179, filed on Mar. 6, 2019, International Patent Application No. PCT/CN2019/078939, filed on Mar. 20, 2019, and International Patent Application No. PCT/CN2019/079397, filed on Mar. 24, 2019. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow

SUMMARY

The present document discloses various video processing techniques that can be used by video encoders and decoders during encoding and decoding operations.

In one example aspect, a method of video processing is disclosed. The method includes determining, for a conversion between a current block of a video and a bitstream representation of the video using an affine coding tool, that a first motion vector of a sub-block of the current block and a second motion vector that is a representative motion vector for the current block comply with a size constraint. The method also includes performing the conversion based on the determining.

In another example aspect, a method of video processing is disclosed. The method includes determining, for a conversion between a current block of a video and a bitstream representation of the video, an affine model that comprises six parameters. The affine model is inherited from affine coding information of a neighboring block of the current block. The method also includes performing the conversion based on the affine model.

In another example aspect, a method of video processing is disclosed. The method includes determining, for a conversion between a block of a video and a bitstream representation of the video, whether a bi-prediction coding technique is applicable to the block based on a size of the block having a width W and a height H, W and H being positive integers. The method also includes performing the conversion according to the determining.

In another example aspect, a method of video processing is disclosed. The method includes determining, for a conversion between a block of a video and a bitstream representation of the video, whether a coding tree split process is applicable to the block based on a size of a sub-block that is a child coding unit of the block according to the coding tree split process. The sub-block has a width W and a height H, W and H being positive integers. The method also includes performing the conversion according to the determining.

In another example aspect, a method of video processing is disclosed. The method includes determining, for a conversion between a current block of a video and a bitstream representation of the video, whether an index of a bi-prediction with coding unit level weight (BCW) coding mode is derived based on a rule with respect to a position of the current block. In the BCW coding mode, a weight set including multiple weights is used to generate bi-prediction values of the current block. The method also includes performing the conversion based on the determining.

In another example aspect, a method of video processing is disclosed. The method includes determining, for a conversion between a current block of a video coded using a combined inter and intra prediction (CIIP) coding technique and a bitstream representation of the video, an intra-prediction mode of the current block independently from an intra-prediction mode of a neighboring block. The CIIP coding technique uses an intermediate inter prediction value and an intermediate intra prediction value to derive a final prediction value of the current block. The method also includes performing the conversion based on the determining.

In another example aspect, a method of video processing is disclosed. The method includes determining, for a conversion between a current block of a video coded using a combined inter and intra prediction (CIIP) coding technique and a bitstream representation of the video, an intra-prediction mode of the current block according to a first intra-prediction mode of a first neighboring block and a second intra-prediction mode of a second neighboring block. The first neighboring block is coded using an intra-prediction coding technique and the second neighboring block is coded using the CIIP coding technique. The first intra-prediction mode is given a priority different than the second intra-prediction mode. The CIIP coding technique uses an intermediate inter prediction value and an intermediate intra prediction value to derive a final prediction value of the current block. The method also includes performing the conversion based on the determining.

In another example aspect, a method of video processing is disclosed. The method includes determining, for a conversion between a current block of a video and a bitstream representation of the video, whether a combined inter and intra prediction (CIIP) process is applicable to a color component of the current block based on a size of the current block. The CIIP coding technique uses an intermediate inter prediction value and an intermediate intra prediction value to derive a final prediction value of the current block. The method also includes performing the conversion based on the determining.

In another example aspect, a method of video processing is disclosed. The method includes determining, for a conversion between a current block of a video and a bitstream representation of the video, whether a combined inter and intra prediction (CIIP) coding technique is to be applied to the current block based on a characteristic of the current block. The CIIP coding technique uses an intermediate inter prediction value and an intermediate intra prediction value to derive a final prediction value of the current block. The method also includes performing the conversion based on the determining.

In another example aspect, a method of video processing is disclosed. The method includes determining, for a conversion between a current block of a video and a bitstream representation of the video, whether a coding tool is to be disabled for the current block based on whether the current block is coded with a combined inter and intra prediction (CIIP) coding technique. The coding tool comprises at least one of: a Bi-Directional Optical Flow (BDOF), an Overlapped Block Motion Compensation (OBMC), or a decoder-side motion vector refinement process (DMVR). The method also includes performing the conversion based on the determining.

In another example aspect, a method of video processing is disclosed. The method includes determining, for a conversion between a block of a video and a bitstream representation of the video, a first precision P1 used for motion vectors for spatial motion prediction and a second precision P2 used for motion vectors for temporal motion prediction. P1 and/or P2 are fractions, and neither P1 nor P2 is signaled in the bitstream representation. The method also includes performing the conversion based on the determining.

In another example aspect, a method of video processing is disclosed. The method includes determining, for a conversion between a block of a video and a bitstream representation of the video, a motion vector (MVx, MVy) with a precision (Px, Py). Px is associated with MVx and Py is associated with MVy. MVx and MVy are stored as integers each having N bits, and MinX≤MVx≤MaxX and MinY≤MVy≤MaxY, MinX, MaxX, MinY, and MaxY being real numbers. The method also includes performing the conversion based on the determining.

In another example aspect, a method of video processing is disclosed. The method includes determining, for a conversion between a current block of a video and a bitstream representation of the video, whether a shared merge list is applicable to the current block according to a coding mode of the current block. The method also includes performing the conversion based on the determining.

In another example aspect, a method of video processing is disclosed. The method includes determining, for a conversion between a current block of video having a W×H size and a bitstream representation of the video, a second block of a dimension (W+N−1)×(H+N−1) for motion compensation during the conversion. The second block is determined based on a reference block of a dimension (W+N−1−PW)× (H+N−1−PH). N represents a filter size, W, H, N, PW and PH are non-negative integers. PW and PH are not both equal to 0. The method also includes performing the conversion based on the determining.

In another example aspect, a method of video processing is disclosed. The method includes determining, for a conversion between a current block of a video having a W×H size and a bitstream representation of the video, a second block of a dimension (W+N−1)×(H+N−1) for motion compensation during the conversion. W, H are non-negative integers, and N are non-negative integers and based on a filter size. During the conversion, a refined motion vector is determined based on a multi-point search according to a motion vector refinement operation on an original motion vector, and pixels long boundaries of the reference block are determined by repeating one or more non-boundary pixels. The method also includes performing the conversion based on the determining.

In another example aspect, a method of video processing is disclosed. The method includes determining, for a conversion of a block of a video that is coded using a Combined Inter-Intra Prediction (CIIP) coding technique and a bitstream representation of the video, a prediction value at a position in the block based on a weighted sum of an inter prediction value and an intra prediction value at the position. The weighted sum is based on adding an offset to an initial sum obtained based on the inter prediction value and the intra prediction value, and the offset is added prior to a right-shift operation performed to determine the weighted sum. The method also includes performing the conversion based on the determining.

In another example aspect, a method of video processing is disclosed. The method includes determining a size restriction between a representative motion vector of a current video block that is affine coded and motion vectors of sub-blocks of the current video block and performing, by using the size restriction, a conversion between a bitstream representation and pixel values of the current video block or the subblocks.

In another example aspect, another method of video processing is disclosed. The method includes determining for a current video block that is affine coded, one or more sub-blocks of the current video block, wherein each sub-block has a size of M×N pixels, where M and N are multiples of 2 or 4, conforming motion vectors of the sub-blocks to a size restriction, and performing, conditionally based on a trigger, by using the size restriction, a conversion between a bitstream representation and pixel values of the current video block.

In yet another example aspect, another method of video processing is disclosed. The method includes determining that a current video block satisfies a size condition, and performing, based on the determining, a conversion between a bitstream representation and pixel values of the current video block by excluding bi-prediction encoding mode for the current video block.

In yet another example aspect, another method of video processing is disclosed. The method includes determining that a current video block satisfies a size condition and performing, based on the determining, a conversion between a bitstream representation and pixel values of the current video block wherein an inter prediction mode is signaled in the bitstream representation according to the size condition.

In yet another example aspect, another method of video processing is disclosed. The method includes determining that a current video block satisfies a size condition, and performing, based on the determining, a conversion between a bitstream representation and pixel values of the current video block wherein a generation of merge candidate list during the conversion is dependent on the size condition.

In yet another example aspect, another method of video processing is disclosed. The method includes determining that a child coding unit of a current video block satisfies a size condition, and performing, based on the determining, a conversion between a bitstream representation and pixel values of the current video block, wherein a coding tree splitting process used to generate the child coding unit is dependent on the size condition.

In yet another example aspect, another method of video processing is disclosed. The method includes determining, a weight index for a generalized bi-prediction (GBi) process for a current video block based on a position of the current video block and performing a conversion between the current video block and a bitstream representation thereof using the weight index to implement the GBi process.

In yet another example aspect, another method of video processing is disclosed. The method includes determining that a current video block is coded as an intra-inter prediction (IIP) coded block and performing a conversion between the current video block and a bitstream representation thereof using a simplification rule for determining an intra-prediction mode or a most probable mode (MPM) for the current video block.

In yet another example aspect, another method of video processing is disclosed. The method includes determining that a current video block meets a simplification criterion and performing a conversion between the current video block and a bitstream representation by disabling use of inter-intra prediction mode for the conversion or by disabling additional coding tools used for the conversion.

In yet another example aspect, another method of video processing is disclosed. The method includes performing a conversion between a current video block and a bitstream representation for the current video block using a motion vector based encoding process wherein (a) a precision P1 is used for storing spatial motion prediction results and a precision P2 is used for storing temporal motion prediction results during the conversion process, wherein P1 and P2 are fractional numbers or (b) a precision Px is used for storing x-motion vectors and a precision Py is used for storing y-motion vectors, wherein Px and Py are fractional numbers.

In yet another example aspect, another method of video processing is disclosed. The method includes interpolating, a small sub-block of W1×H1 size within a large sub-block of W2×H2 size of a current video block by fetching a (W2+N−1−PW)*(H2+N−1−PH) block, pixel padding the fetched block, performing boundary pixel repeating on the pixel padded block and obtaining pixel values of the small sub-block, wherein W1, W2, H1, H2, and PW and PH are integers and performing a conversion between the current video block and a bitstream representation of the current video block using the interpolated pixel values of the small sub-block.

In another example aspect, another method of video processing is disclosed. The method includes performing, during a conversion of a current video block of W×H dimension and a bitstream representation of the current video block, a motion compensation operation by fetching (W+N−1−PW)*(W+N−1−PH) reference pixels and padding reference pixels outsize the fetched reference pixels during the motion compensation operation and performing a conversion between the current video block and a bitstream representation of the current video block using a result of the motion compensation operation, where W, H, N, PW and PH are integers.

In yet another example aspect, another method of video processing is disclosed. The method includes determining, based on a size of a current video block, that bi-prediction or uni-prediction of the current video block is disallowed, and performing, based on the determining, a conversion between a bitstream representation and pixel values of the current video block by disabling bi-prediction or uni-prediction mode.

In yet another example aspect, another method of video processing is disclosed. The method includes determining, based on a size of a current video block, that bi-prediction or uni-prediction of the current video block is disallowed, and performing, based on the determining, a conversion between a bitstream representation and pixel values of the current video block by disabling bi-prediction or uni-prediction mode.

In yet another example aspect, a video encoder apparatus is disclosed. The video encoder comprises a processor configured to implement above-described methods.

In yet another example aspect, a video encoder apparatus is disclosed. The video encoder comprises a processor configured to implement above-described methods.

In yet another example aspect, a computer readable medium having code stored thereon is disclose. The code embodies one of the methods described herein in the form of processor-executable code.

These, and other, features are described throughout the present document.

DETAILED DESCRIPTION

Section headings are used in the present document for ease of understanding and do not limit the applicability of techniques and embodiments disclosed in each section only to that section.

1. Summary

This patent document is related to video/image coding technologies. Specifically, it is related to reducing bandwidth and line buffers of several coding tools in video/image coding. It may be applied to the existing video coding standards like HEVC, or the standard (Versatile Video Coding) to be finalized. It may be also applicable to future video/image coding standards or video/image codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Inter Prediction in HEVC/VVC

Interpolation Filters

In HEVC, luma sub-samples are generated by 8-tap interpolation filters and chroma sub-samples are generated by 4-tap interpolation filters.

The filters are separable in the two dimensions. Samples are filtered horizontally first then vertically.

2.2 Sub-Block Based Prediction Technology

Figure 1:
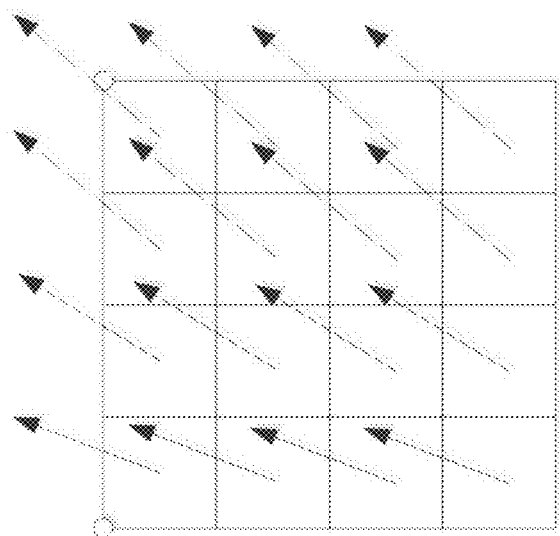
FIG. 1 shows an example of sub-block based prediction.

Sub-block based prediction is first introduced into the video coding standard by HEVC Annex I (3D-HEVC). With sub-block based prediction, a block, such as a Coding Unit (CU) or a Prediction Unit (PU), is divided into several non-overlapped sub-blocks. Different sub-block may be assigned different motion information, such as reference index or Motion Vector (MV), and Motion Compensation (MC) is performed individually for each sub-block. FIG. 1 demonstrates the concept of sub-block based prediction.

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

In JEM, sub-block based prediction is adopted in several coding tools, such as affine prediction, Alternative temporal motion vector prediction (ATMVP), spatial-temporal motion vector prediction (STMVP), Bi-directional Optical flow (BIO) and Frame-Rate Up Conversion (FRUC). Affine prediction has also been adopted into VVC.

2.3 Affine Prediction

Figure 2B:
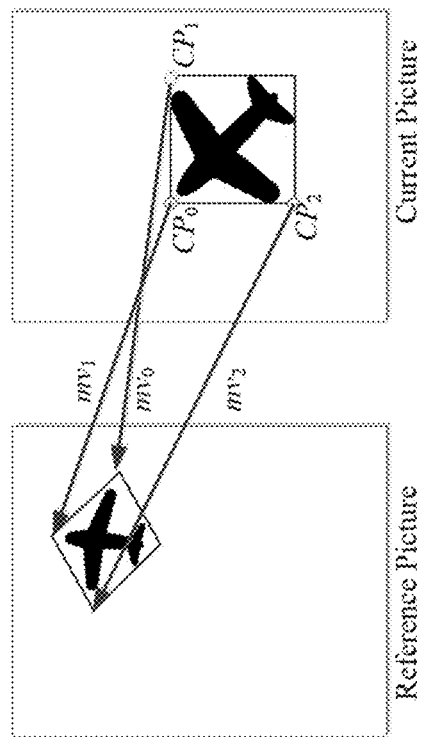
FIG. 2B shows a 6-parameter affine model.
Figure 2A:
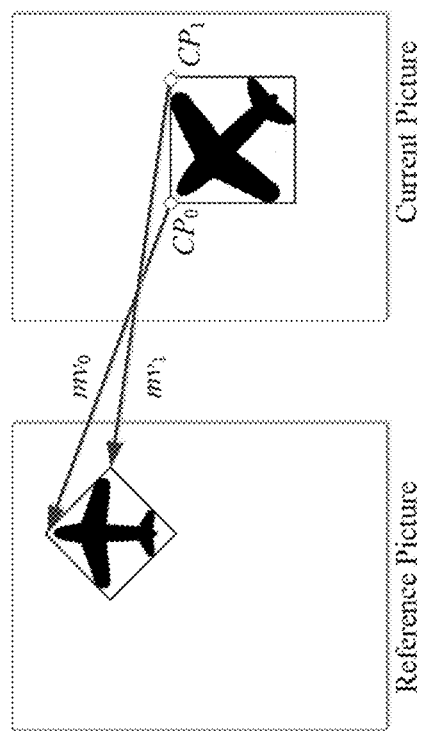
FIG. 2A shows a 4-parameter affine model.

In HEVC, only translation motion model is applied for motion compensation prediction (MCP). While in the real world, there are many kinds of motion, e.g. zoom in/out, rotation, perspective motions and the other irregular motions. In the VVC, a simplified affine transform motion compensation prediction is applied. As shown FIG. 2A-2B, the affine motion field of the block is described by two (in the 4-parameter affine model) or three (in the 6-parameter affine model) control point motion vectors.

The motion vector field (MVF) of a block is described by the following equations with the 4-parameter affine model (wherein the 4-parameter are defined as the variables a, b, e and f) in Eq. (1) and 6-parameter affine model (wherein the 4-parameter are defined as the variables a, b, c, d, e and f) in Eq. (2) respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad \text{Eq. (1)}$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad \text{Eq. (2)}$$

where $(mv^h_0, mv^h_0)$ is motion vector of the top-left corner control point, and $(mv^h_1, mv^h_1)$ is motion vector of the top-right corner control point and $(mv^h_2, mv^h_2)$ is motion vector of the bottom-left corner control point, all of the three motion vectors are called control point motion vectors (CPMV), (x, y) represents the coordinate of a representative point relative to the top-left sample within current block. The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2).

In a division-free design, Eq. (1) and Eq. (2) are implemented as $$\begin{cases} iDMvHorX = (mv_1^h - mv_0^h) \ll (S - \log2(w)) \\ iDMvHorY = (mv_1^v - mv_0^v) \ll (S - \log2(w)) \end{cases} \quad \text{Eq. (3)}$$

For the 4-parameter affine model shown in (1):

$$\begin{cases} iDMvVerX = -iDMvHorY \\ iDMvVerY = iDMvHorX \end{cases} \quad \text{Eq. (4)}$$

For the 6-parameter affine model shown in (2):

$$\begin{cases} iDMvVerX = (mv_2^h - mv_0^h) \ll (S - \log2(h)) \\ iDMvVerY = (mv_2^v - mv_0^v) \ll (S - \log2(h)) \end{cases} \quad \text{Eq. (5)}$$

Finally, $$\begin{cases} mv^h(x, y) = \text{Normalize}(iDMvHorX \cdot x + \\ \qquad iDMvVerX \cdot y + (mv_0^h \ll S), S) \\ mv^v(x, y) = \text{Normalize}(iDMvHorY \cdot x + \\ \qquad iDMvVerY \cdot y + (mv_0^v \ll S), S) \end{cases} \quad \text{Eq. (6)}$$

$$\text{Normalize}(Z, S) = \begin{cases} (Z + \text{Off}) \gg S & \text{if } Z \geq 0 \\ -((-Z + \text{Off}) \gg S) & \text{Otherwise} \end{cases} \quad \text{Eq. (7)}$$

$$\text{Off} = 1 \ll (S - 1)$$

where S represents the calculation precision. e.g. in VVC, S=7. In VVC, the MV used in MC for a sub-block with the top-left sample at (xs, ys) is calculated by Eq. (6) with x=xs+2 and y=ys+2.

Figure 3:
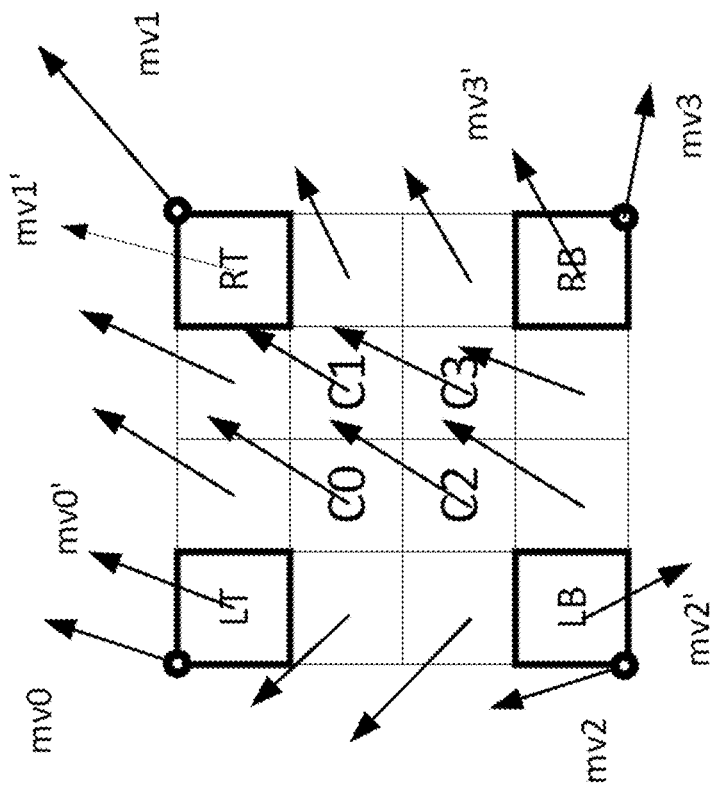
FIG. 3 shows an example of an affine motion vector field per sub-block.

To derive motion vector of each 4×4 sub-block, the motion vector of the center sample of each sub-block, as shown in FIG. 3, is calculated according to Eq. (1) or Eq. (2), and rounded to 1/16 fraction accuracy. Then the motion compensation interpolation filters are applied to generate the prediction of each sub-block with derived motion vector.

Figure 4B:
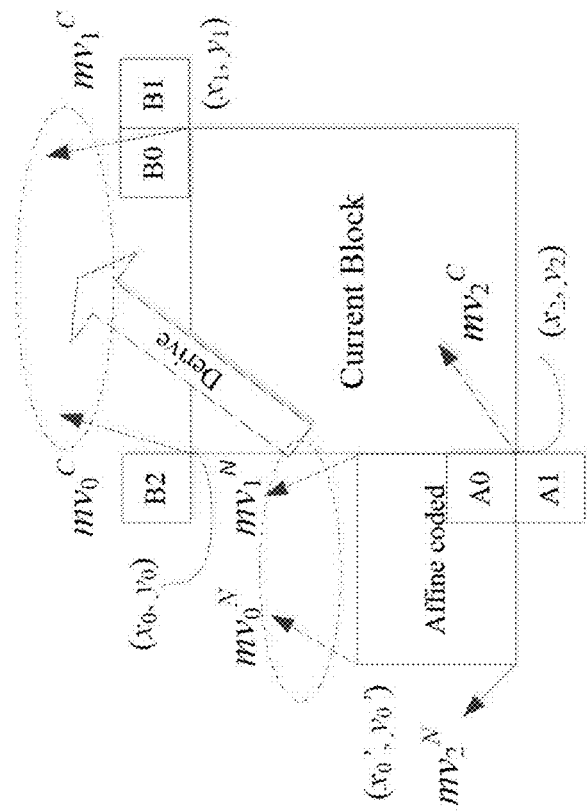
FIG. 4B show another example of candidates for AF_MERGE.
Figure 4A:
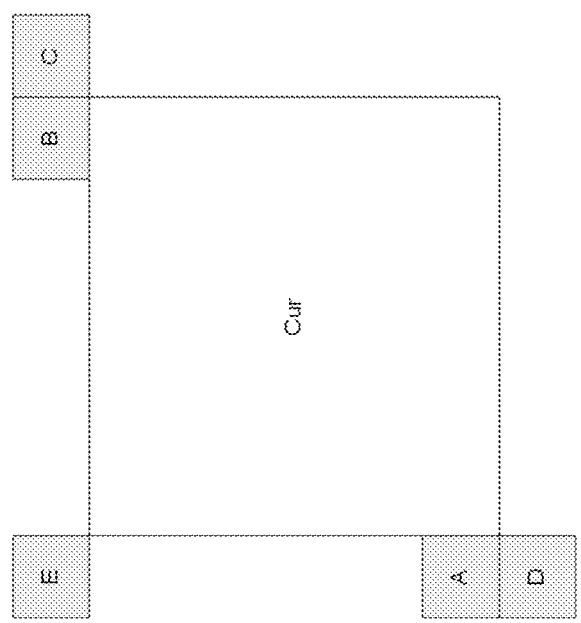
FIG. 4A show an example of candidates for AF_MERGE.

Affine model can be inherited from spatial neighboring affine-coded block such as left, above, above right, left bottom and above left neighboring block as shown in FIG. 4A. For example, if the neighbour left bottom block A in FIG. 4A is coded in affine mode as denoted by A0 in FIG. 4B, the Control Point (CP) motion vectors $mv_0^N$, $mv_1^N$ and $mv_2^N$ of the top left corner, above right corner and left bottom corner of the neighboring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$. It should be noted that in VTM-2.0, sub-block (e.g. 4×4 block in VTM) LT stores mv0, RT stores mv1 if the current block is affine coded. If the current block is coded with the 6-parameter affine model, LB stores mv2; otherwise (with the 4-parameter affine model), LB stores mv2'. Other sub-blocks stores the MVs used for MC.

It should be noted that when a CU is coded with affine merge mode, e.g., in AF_MERGE mode, it gets the first block coded with affine mode from the valid neighbour reconstructed blocks. And the selection order for the candidate block is from left, above, above right, left bottom to above left as shown FIG. 4A.

The derived CP MVs $mv_0^C$, $mv_1^C$ and $mv_2^C$ of current block can be used as CP MVs in the affine merge mode. Or they can be used as MVP for affine inter mode in VVC. It should be noted that for the merge mode, if the current block is coded with affine mode, after deriving CP MVs of current block, the current block may be further split into multiple sub-blocks and each block will derive its motion information based on the derived CP MVs of current block.

2.4 Example Embodiment in JVET

Different from VTM wherein only one affine spatial neighboring block may be used to derive affine motion for a block. In some embodiments, a separate list of affine candidates is constructed for the AF_MERGE mode.

1) Insert inherited affine candidates into candidate list

Figure 5:
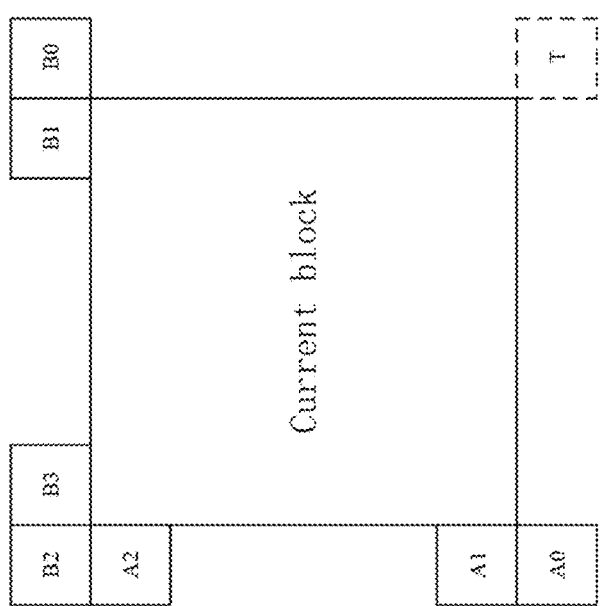
FIG. 5 shows candidate positions for affine merge mode.

Inherited affine candidate means that the candidate is derived from the valid neighbor reconstructed block coded with affine mode. As shown in FIG. 5, the scan order for the candidate block is $A_1$, $B_1$, $B_0$, $A_0$ and $B_2$. When a block is selected (e.g., $A_1$), the two-step procedure is applied:

1.a Firstly, use the three corner motion vectors of the CU covering the block to derive two/three control points of current block.

1.b Based on the control points of current block to derive sub-block motion for each sub-block within current block 2) Insert constructed affine candidates If the number of candidates in affine merge candidate list is less than MaxNumAffineCand, constructed affine candidates are insert into the candidate list.

Constructed affine candidate means the candidate is constructed by combining the neighbor motion information of each control point.

The motion information for the control points is derived firstly from the specified spatial neighbors and temporal neighbor shown in FIG. 5. CPk (k=1, 2, 3, 4) represents the k-th control point. $A_0$, $A_1$, $A_2$, $B_0$, $B_1$, $B_2$ and $B_3$ are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

2.a For CP1, the checking priority is $B_2 \to B_3 \to A_2$. $B_2$ is used if it is available. Otherwise, if $B_2$ is available, $B_3$ is used. If both $B_2$ and $B_3$ are unavailable, $A_2$ is used. If all the three candidates are unavailable, the motion information of CP1 cannot be obtained.

2.b For CP2, the checking priority is $B1 \to B0$;

2.c For CP3, the checking priority is $A1 \to A0$;

2.d For CP4, T is used.

Secondly, the combinations of controls points are used to construct the motion model.

Motion vectors of three control points are needed to compute the transform parameters in 6-parameter affine model. The three control points can be selected from one of the following four combinations ({CP1, CP2, CP4}, {CP1, CP2, CP3}, {CP2, CP3, CP4}, {CP1, CP3, CP4}). For example, use CP1, CP2 and CP3 control points to construct 6-parameter affine motion model, denoted as Affine (CP1, CP2, CP3).

Motion vectors of two control points are needed to compute the transform parameters in 4-parameter affine model. The two control points can be selected from one of the following six combinations ({CP1, CP4}, {CP2, CP3}, {CP1, CP2}, {CP2, CP4}, {CP1, CP3}, {CP3, CP4}). For example, use the CP1 and CP2 control points to construct 4-parameter affine motion model, denoted as Affine (CP1, CP2).

The combinations of constructed affine candidates are inserted into to candidate list as following order: {CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

3) Insert zero motion vectors

If the number of candidates in affine merge candidate list is less than MaxNumAffineCand, zero motion vectors are insert into the candidate list, until the list is full.

2.5 Affine Merge Candidate List

2.5.1 Affine Merge Mode

In the affine merge mode of VTM-2.0.1, only the first available affine neighbour can be used to derive motion information of affine merge mode. In some embodiments, a candidate list for affine merge mode is constructed by searching valid affine neighbours and combining the neighbor motion information of each control point.

The affine merge candidate list is constructed as following steps:

1) Insert inherited affine candidates

Inherited affine candidate means that the candidate is derived from the affine motion model of its valid neighbor affine coded block. In the common base, as shown FIG. 5, the scan order for the candidate positions is: A1, B1, B0, A0 and B2.

After a candidate is derived, full pruning process is performed to check whether same candidate has been inserted into the list. If a same candidate exists, the derived candidate is discarded.

2) Insert Constructed Affine Candidates

If the number of candidates in affine merge candidate list is less than MaxNumAffineCand (set to 5 in this contribution), constructed affine candidates are inserted into the candidate list. Constructed affine candidate means the candidate is constructed by combining the neighbor motion information of each control point.

The motion information for the control points is derived firstly from the specified spatial neighbors and temporal neighbors. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.
For CP3, the checking priority is A1→A0.
For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.

The combinations of constructed affine candidates are inserted into to candidate list as following order: {CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived candidate is discarded.

3) Padding with Zero Motion Vectors

If the number of candidates in affine merge candidate list is less than 5, zero motion vectors with zero reference indices are insert into the candidate list, until the list is full.

2.5.2 Example Affine Merge Mode

In some embodiments, the affine merge mode can be simplified as follows:

1) The pruning process for inherited affine candidates is simplified by comparing the coding units covering the neighboring positions, instead of comparing the derived affine candidates in VTM-2.0.1. Up to 2 inherited affine candidates are inserted into affine merge list. The pruning process for constructed affine candidates is totally removed.

2) The MV scaling operation in constructed affine candidate is removed. If the reference indices of control points are different, the constructed motion model is discarded.

3) The number of constructed affine candidates is reduced from 10 to 6.

4) In some embodiments, other merge candidates with sub-block prediction such as ATMVP is also put into the affine merge candidate list. In that case, the affine merge candidate list may be renamed with some other names such as sub-block merge candidate list.

2.6 Example Control Point MV Offset for Affine Merge Mode

New Affine merge candidates are generated based on the CPMVs offsets of the first Affine merge candidate. If the first Affine merge candidate enables 4-parameter Affine model, then 2 CPMVs for each new Affine merge candidate are derived by offsetting 2 CPMVs of the first Affine merge candidate; Otherwise (6-parameter Affine model enabled), then 3 CPMVs for each new Affine merge candidate are derived by offsetting 3 CPMVs of the first Affine merge candidate. In Uni-prediction, the CPMV offsets are applied to the CPMVs of the first candidate. In Bi-prediction with List 0 and List 1 on the same direction, the CPMV offsets are applied to the first candidate as follows:

$$MV_{new(L0),i} = MV_{old(L0)} + MV_{offset(i)} \quad \text{Eq. (8)}$$

$$MV_{new(L1),i} = MV_{old(L1)} + MV_{offset(i)} \quad \text{Eq. (9)}$$

In Bi-prediction with List 0 and List 1 on the opposite direction, the CPMV offsets are applied to the first candidate as follows:

$$MV_{new(L0),i} = MV_{old(L0)} + MV_{offset(i)} \quad \text{Eq. (10)}$$

$$MV_{new(L1),i} = MV_{old(L1)} - MV_{offset(i)} \quad \text{Eq. (11)}$$

Various offset directions with various offset magnitudes can be used to generate new Affine merge candidates. Two implementations have been tested:

(1) 16 new Affine merge candidates with 8 different offset directions with 2 different offset magnitudes are generated as shown in the following offsets set:

Offset set={(4, 0), (0, 4), (−4, 0), (0, −4), (−4, −4), (4, −4), (4, 4), (−4, 4), (8, 0), (0, 8), (−8, 0), (0, −8), (−8, −8), (8, −8), (8, 8), (−8, 8)}.

The Affine merge list is increased to 20 for this design. The number of potential Affine merge candidates is 31 in total.

(2) 4 new Affine merge candidates with 4 different offset directions with 1 offset magnitude are generated as shown in the following offsets set:

Offset set={(4, 0), (0, 4), (−4, 0), (0, −4)}.

Figure 6:
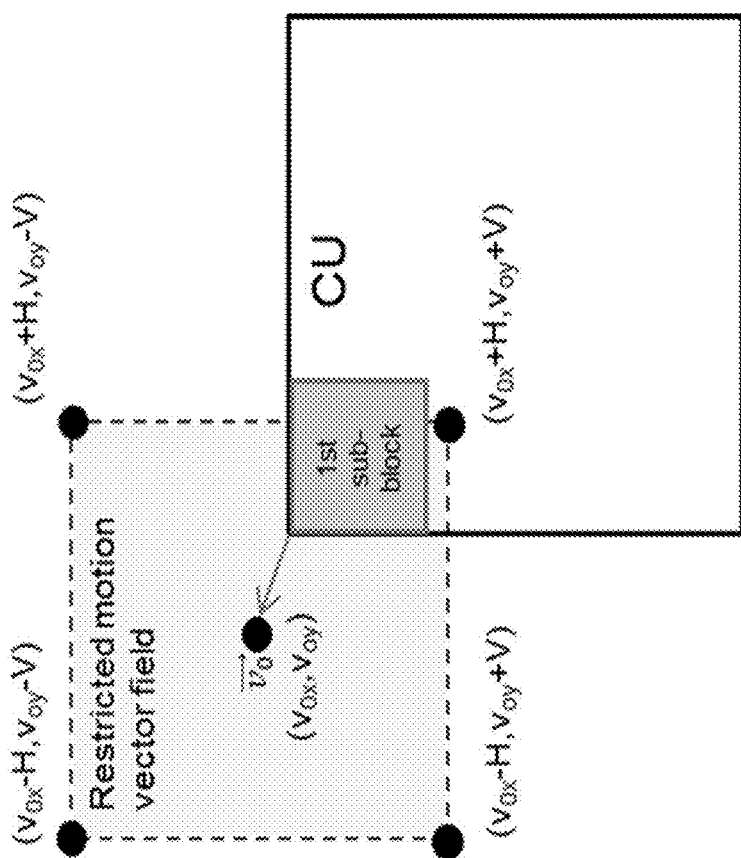
FIG. 6 shows an example of a constrained sub-block motion vector for a coding unit (CU) of an affine mode.

The Affine merge list is kept to 5 as VTM2.0.1 does. Four temporal constructed Affine merge candidates are removed to keep the number of potential Affine merge candidates unchanged, e.g., 15 in total. Suppose the coordinates of CPMV1, CPMV2, CPMV3 and CPMV4 are (0, 0), (W, 0), (H, 0) and (W, H). Note that CPMV4 is derived from the temporal MV as shown in FIG. 6. The removed candidates are the following four temporal-related constructed Affine merge candidates: {CP2, CP3, CP4}, {CP1, CP4}, {CP2, CP4}, {CP3, CP4}.

2.7 Bandwidth Problem of Affine Motion Compensation

Since the current block is divided into 4×4 sub-blocks for luma component and 2×2 sub-blocks for the two chroma components to do the motion compensation, the total bandwidth requirement is much higher than non sub-block inter-prediction. To address the bandwidth problem, several approaches are proposed.

2.7.1 Example 1

4×4 block is used as the sub-block size for a uni-directional affine coded CU while 8×4/4×8 block is used as the sub-block size for a bi-directional affine coded CU.

2.7.2 Example 2

For affine mode, sub-block motion vectors of an affine CU are constrained to be within a pre-defined motion vector field. Assume that the motion vectors of $1^{st}$ (top left) sub-block is $(v_{0x}, v_{0y})$ and the second sub-block is $(v_{ix}, v_{iy})$, values of $v_{ix}$ and $v_{iy}$ exhibit the following constraints:

$$v_{ix} \in [v_{0x}-H, v_{0x}+H] \quad \text{Eq. (12)}$$

$$v_{iy} \in [v_{0y}-V, v_{0y}+V] \quad \text{Eq. (13)}$$

If the motion vector of any sub-block exceeds the pre-defined motion vector field, the motion vector is clipped. An illustration of the idea of constrained sub-block motion vector is given in FIG. 6.

Assume memory is retrieved per CU instead of per sub-block, values H and V are chosen so that worst case memory bandwidth of affine CU will not exceed that of normal inter MC of a 8×8 bi-prediction block. Note that values of H and V are adaptive to CU size and uni-prediction or bi-prediction.

2.7.3 Example 3

To reduce the memory bandwidth requirement in affine prediction, each 8×8 block within the block is regarded as the basic unit. The MVs of all four 4×4 sub-blocks inside the 8×8 block are constrained such that the max difference between integer parts of the four 4×4 sub-block MVs is no more than 1 pixel. So that the bandwidth is (8+7+1)*(8+7+1)/(8*8)=4 sample/pixel.

In some cases, after the MVs of all sub-blocks inside the current block are calculated with affine model, the MV of the sub-blocks containing the control points are firstly replaced with the corresponding control point MV. This means that, the MV of the top-left, top-right and bottom-left sub-blocks are replaced by the top-left, top-right and bottom-left control points MV, respectively. Then, for each 8×8 block within the current block, the MVs of all four 4×4 sub-blocks are clipped to guarantee the max difference between integer parts of the four MVs no more than 1 pixel. Here it should be noted that the sub-blocks containing the control points (top-left, top-right and bottom-left sub-blocks) use the corresponding control point MV to involve in the MV clipping process. During the clipping process, the MV of the top-right control point is kept un-changed.

The clipping process applied to each 8×8 block is described as follows:

1. the minimal and maximal values for the MV components, MV minx, MVminy, MVmaxx, MVmaxy are firstly determined for each 8×8 block as follows:

a) Get the minimal MV component among the four 4×4 sub-block MVs $$MV\text{minx} = \min(MVx0, MVx1, MVx2, MVx3)$$

$$MV\text{miny} = \min(MVy0, MVy1, MVy2, MVy3)$$

b) Use the integer part of MVminx and MVminy as the minimal MV component $$MV\text{minx} = MV\text{minx} >> MV\_precision << MV\_precision$$

$$MV\text{miny} = MV\text{miny} >> MV\_precision << MV\_precision$$

c) The maximal MV component is calculated as follows:

$$MV\text{maxx} = MV\text{minx} + (2 << MV\_precision) - 1$$

$$MV\text{maxy} = MV\text{miny} + (2 << MV\_precision) - 1$$

d) if the top-right control point is in current 8×8 block if $(MV1x > MV\text{maxx})$ $$MV\text{minx} = (MV1x >> MV\_precision << MV\_precision) - (1 << MV\_precision)$$

$$MV\text{maxx} = MV\text{minx} + (2 << MV\_precision) - 1$$

if ($MV1y > MVmaxy$)

$MVminy = (MV1y >> MV\_precision << MV\_precision) - (1 << MV\_precision)$ $MVmaxy = MVminy + (2 << MV\_precision) - 1$ 2. The MV components of each 4×4 block inside this 8×8 block are clipped as follows:

$MVxi = \max(MV\min x, \min(MVmaxx, MVxi))$ $MVyi = \max(MVminy, \min(MVmaxy, MVyi))$ where (MVxi, MVyi) is the MV of ith sub-block within one 8×8 block, where i is 0, 1, 2, 3; (MV1x, MV1y) is the MV of the top-right control point; MV_precision is equal to 4 corresponding to 1/16 motion vector fraction accuracy. Since the difference between integer parts of MV minx and MVmaxx (MVminy and MVmaxy) is 1 pixel, the max difference between integer parts of the four 4×4 sub-block MVs is no more than 1 pixel.

A similar method may also be used to handle the planar mode in some embodiments.

2.7.4 Example 4

In some embodiments, the restrictions to the affine mode for the worst-case bandwidth reduction. To ensure that the worst-case bandwidth of the affine block is not worse than an INTER_4×8/INTER_8×4 block or even an INTER_9×9 block, the motion vector differences between affine control points are used to decide whether the subblock size of the affine block is 4×4 or 8×8.

General Affine Restriction for Worst-Case Bandwidth Reduction

The memory bandwidth reduction for the affine mode is controlled by restricting the motion vector difference between the affine control points (also named as the control points difference). In general, if the control points differences satisfy the restriction below, the affine motion is using 4×4 subblocks (namely 4×4 affine mode). Otherwise, it is using 8×8 subblocks (8×8 affine mode). The restrictions for the 6-parameters and 4-parameters model are given as follows.

To derive the constraints for different block sizes (w×h), the motion vector differences of the control points are normalized as:

$$Norm(v_{1x} - v_{0x}) = (v_{1x} - v_{0x}) * \frac{128}{w}$$

$$Norm(v_{1y} - v_{0y}) = (v_{1y} - v_{0y}) * \frac{128}{w}$$

$$Norm(v_{2x} - v_{0x}) = (v_{2x} - v_{0x}) * \frac{128}{h}$$

$$Norm(v_{2x} - v_{0x}) = (v_{2x} - v_{0x}) * 128/h$$

Eq. (14)

In the 4-parameters affine model, $(v_{2x} - v_{0x})$ and $(v_{2y} - v_{0y})$ are set as the follows:

$(v_{2x} - v_{0x}) = -(v_{1y} - v_{0y})$ $(v_{2y} - v_{0y}) = -(v_{1x} - v_{0x})$   Eq. (15)

Hence, the Norms of $(v_{2x} - v_{0x})$ and $(v_{2y} - v_{0y})$ are given as:

$Norm(v_{2x} - v_{0x}) = -Norm(v_{1y} - v_{0y})$ $Norm(v_{2y} - v_{0y}) = Norm(v_{1x} - v_{0x})$   Eq. (16)

The restriction to ensure the worst-case bandwidth is achieve an INTER_4×8 or INTER_8×4:

$|Norm(v_{1x} - v_{0x}) + Norm(v_{2x} - v_{0x}) + 128| +$ $|Norm(v_{1y} - v_{0y}) + Norm(v_{2y} - v_{0y}) + 128| +$ $|Norm(v_{1x} - v_{0x}) - Norm(v_{2x} - v_{0x})| +$ $|Norm(v_{1y} - v_{0y}) - Norm(v_{2y} - v_{0y})| < 128 * 3.25$   Eq. (17)

where the left-hand side of Eq. (18) represents the shrink or span level of the sub affine blocks while (3.25) indicates 3.25 pixels shift.

The restriction to ensure the worst-case bandwidth is achieve an INTER_9×9

$(4*Norm(v_{1x} - v_{0x}) > -4*pel \&\& +4*Norm(v_{1x} - v_{0x}) \leq pel)$
&&

$(4*Norm(v_{1y} - v_{0y}) > -pel \&\& 4*Norm(v_{1y} - v_{0y}) \leq pel)$
&&

$(4*Norm(v_{2x} - v_{0x}) > -pel \&\& 4*Norm(v_{2x} - v_{0x}) \leq pel)$
&&

$(4*Norm(v_{2y} - v_{0y}) > -4*pel \&\& 4*Norm(v_{2y} - v_{0y}) \leq pel)$
&&

$((4*Norm(v_{1x} - v_{0x}) + 4*Norm(v_{2x} - v_{0x}) > -4*pel) \&\&$ $(4*Norm(v_{1x} - v_{0x}) + 4*Norm(v_{2x} - v_{0x}) \leq pel)) \&\&$ $((4*Norm(v_{1y} - v_{0y}) + 4*Norm(v_{2y} - v_{0y}) > -4*pel) \&\&$ $(4*Norm(v_{1y} - v_{0y}) + 4*Norm(v_{2y} - v_{0y}) \leq pel))$   Eq. (18)

where pel=128*16 (128 and 16 indicate the normalization factor and motion vector precision, respectively).

2.8 Generalized Bi-Prediction Improvement

Some embodiments improved the gain-complexity trade-off for GBi and was adopted into BMS2.1. GBi is also referred to Bi-prediction with CU-level weight (BCW). The BMS2.1 GBi applies unequal weights to predictors from L0 and L1 in bi-prediction mode. In inter prediction mode, multiple weight pairs including the equal weight pair (½, ½) are evaluated based on rate-distortion optimization (RDO), and the GBi index of the selected weight pair is signaled to the decoder. In merge mode, the GBi index is inherited from a neighboring CU. In BMS2.1 GBi, the predictor generation in bi-prediction mode is shown in Eq. (19).

$P_{GBi} = (w_0 * P_{L0} + w_1 * P_{L1} + RoundingOffset_{GBi}) >> shiftNum_{GBi}$,   Eq. (19)

where $P_{GBi}$ is the final predictor of GBi. $w_0$ and $w_1$ are the selected GBi weight pair and applied to the predictors of list 0 (L0) and list 1 (L1), respectively. $RoundingOffset_{GBi}$ and $shiftNum_{GBi}$ are used to normalize the final predictor in GBi. The supported $w_1$ weight set is {−¼, ⅜, ½, ⅝, 5/4}, in which the five weights correspond to one equal weight pair and four unequal weight pairs. The blending gain, e.g., sum of $w_1$ and $w_0$, is fixed to 1.0. Therefore, the corresponding $w_0$ weight set is {5/4, ⅝, ½, ⅜, −¼}. The weight pair selection is at CU-level.

For non-low delay pictures, the weight set size is reduced from five to three, where the $w_1$ weight set is {⅜, ½, ⅝} and the $w_0$ weight set is {⅝, ½, ⅜}. The weight set size reduction for non-low delay pictures is applied to the BMS2.1 GBi and all the GBi tests in this contribution.

In some embodiments, the following modifications are applied on top of the existing GBi design in the BMS2.1 to further improve the GBi performance.

2.8.1 GBi Encoder Bug Fix

To reduce the GBi encoding time, in current encoder design, the encoder will store uni-prediction motion vectors estimated from GBi weight equal to 4/8, and reuse them for uni-prediction search of other GBi weights. This fast encoding method is applied to both translation motion model and affine motion model. In VTM2.0, 6-parameter affine model was adopted together with 4-parameter affine model. The BMS2.1 encoder does not differentiate 4-parameter affine model and 6-parameter affine model when it stores the uni-prediction affine MVs when GBi weight is equal to 4/8. Consequently, 4-parameter affine MVs may be overwritten by 6-parameter affine MVs after the encoding with GBi weight 4/8. The stored 6-parameter affine MVs may be used for 4-parameter affine ME for other GBi weights, or the stored 4-parameter affine MVs may be used for 6-parameter affine ME. The proposed GBi encoder bug fix is to separate the 4-parameter and 6-parameter affine MVs storage. The encoder stores those affine MVs based on affine model type when GBi weight is equal to 4/8, and reuse the corresponding affine MVs based on the affine model type for other GBi weights.

2.8.2 CU Size Constraint for GBi

In this method, GBi is disabled for small CUs. In inter prediction mode, if bi-prediction is used and the CU area is smaller than 128 luma samples, GBi is disabled without any signaling.

2.8.3 Merge Mode with GBi

With Merge mode, GBi index is not signaled. Instead it is inherited from the neighboring block it is merged to. When TMVP candidate is selected, GBi is turned off in this block.

2.8.4 Affine Prediction with GBi

When the current block is coded with affine prediction, GBi can be used. For affine inter mode, GBi index is signaled. For Affine merge mode, GBi index is inherited from the neighboring block it is merged to. If a constructed affine model is selected, GBi is turned off in this block.

2.9 Example Inter-Intra Prediction Mode (IIP)

With inter-intra prediction mode which is also referred to combined inter and intra prediction (CIIP), multi-hypothesis prediction combines one intra prediction and one merge indexed prediction. Such a block is treated as a special inter-coded block. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is exclusive of the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling.

The weights for combining predictions are described as follow. When DC or planar mode is selected or the CB width or height is smaller than 4, equal weights are applied. For those CBs with CB width and height larger than or equal to 4, when horizontal/vertical mode is selected, one CB is first vertically/horizontally split into four equal-area regions. Each weight set, denoted as (w_intra$_i$, w_inter$_i$), where i is from 1 to 4 and (w_intra$_1$, w_inter$_1$)=(6, 2), (w_intra$_2$, w_inter$_2$)=(5, 3), (w_intra$_3$, w_inter$_3$)=(3, 5), and (w_intra$_4$, w_inter$_4$)=(2, 6), will be applied to a corresponding region. (w_intra$_1$, w_inter$_1$) is for the region closest to the reference samples and (w_intra$_4$, w_inter$_4$) is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs.

Suppose intra and inter prediction values are PIntra and Pinter, and the weighting factor are w_intra and w_inter respectively. The prediction value at position (x, y) is calculated as (PIntra(x, y)*w_intra(x, y)+PInter(x, y)*w_inter(x, y))>>N, wherein w_intra(x, y)+w_iner(x, y)=2^N.

Signaling of Intra Prediction Modes in IIP-Coded Blocks

When inter-intra mode is used, one of the four allowed intra-prediction modes, DC, Planar, Horizontal and Vertical is selected and signaled. Three Most Probable Modes (MPMs) are constructed from the left and above neighboring blocks. The intra-prediction mode of an intra-coded neighboring block or an IIP-coded neighboring block is treated as one MPM. If the intra-prediction mode is not one of the four allowed intra-prediction modes, it will be rounded to vertical mode or horizontal mode depending on the angular difference. The neighboring block must be in the same CTU line as the current block.

Suppose the width and height of the current block is W and H. If W>2*H or H>2*W, then only one of the three MPMs can be used in the inter-intra mode. Otherwise, all the four valid intra-prediction modes can be used in the inter-intra mode.

It should be noted that the intra-prediction mode in inter-intra mode cannot be used to predict intra-prediction mode in a normal intra-coded block.

Inter-intra prediction can only be used when W*H>=64.

2.10 Example Triangular Prediction Mode

Figure 7B:
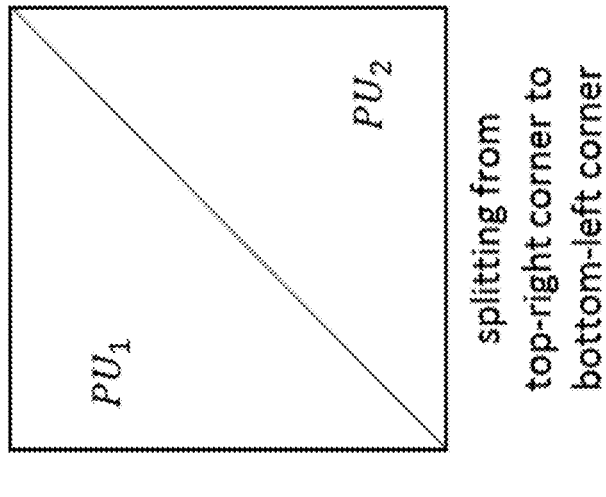
FIG. 7B shows an example of a 45 degree splitting pattern of splitting a CU into two triangular prediction units.
Figure 7A:
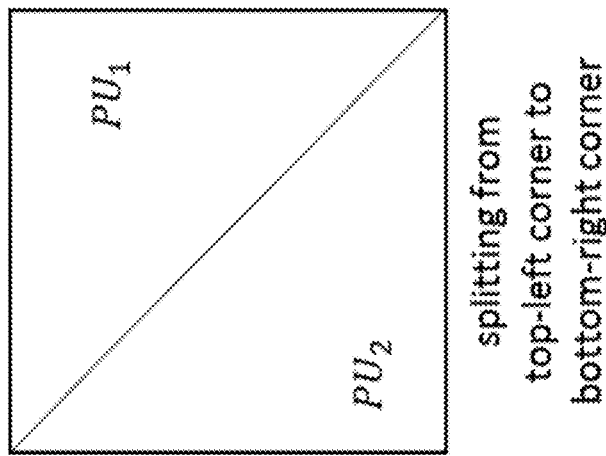
FIG. 7A shows an example of a 135 degree parttion of splitting a CU into two triangular prediction units.

The concept of the triangular prediction mode (TPM) is to introduce a new triangular partition for motion compensated prediction. As shown in FIG. 7A-7B, it splits a CU into two triangular prediction units, in either diagonal or inverse diagonal direction. Each triangular prediction unit in the CU is inter-predicted using its own uni-prediction motion vector and reference frame index which are derived from a uni-prediction candidate list. An adaptive weighting process is performed to the diagonal edge after predicting the triangular prediction units. Then, the transform and quantization process are applied to the whole CU. It is noted that this mode is only applied to skip and merge modes.

2.10.1 Uni-Prediction Candidate List for TPM

Figure 8:
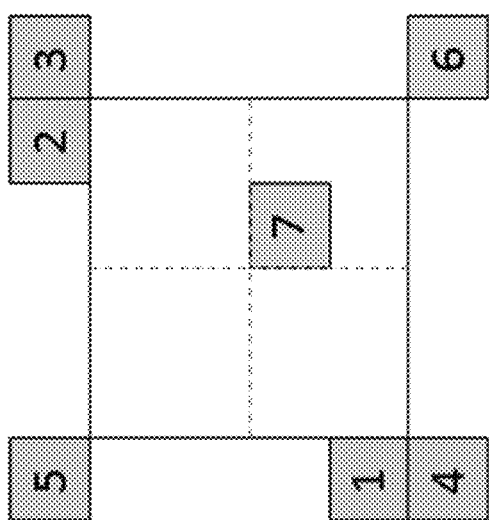
FIG. 8 shows examples of positions of neighboring blocks.

The uni-prediction candidate list consists of five uni-prediction motion vector candidates. It is derived from seven neighboring blocks including five spatial neighboring blocks (1 to 5) and two temporal co-located blocks (6 to 7), as shown in FIG. 8. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list. Motion candidates added in this list are called TPM motion candidates.

More specifically, the following steps are involved:

1) Obtain motion candidates from $A_1$, $B_1$, $B_0$, $A_0$, $B_2$, Col and Col2 (corresponding to block 1-7 in FIG. 8) without any pruning operations.

2) Set variable numCurrMergeCand=0.

3) For each motion candidates derived from $A_1$, $B_1$, $B_0$, $A_0$, $B_2$, Col and Col2 and numCurrMergeCand is less than 5, if the motion candidate is uni-prediction (either from List 0 or List 1), it is added to the merge list with numCurrMergeCand increased by 1. Such added motion candidates is named 'originally uni-predicted candidate'. Full pruning is applied.

4) For each motion candidates derived from $A_1$, $B_1$, $B_0$, $A_0$, $B_2$, Col and Col2 and numCurrMergeCand is less than 5, if the motion candidate is bi-prediction, the motion information from List 0 is added to the merge list (that is, modified to be uni-prediction from List 0) and numCurrMergeCand increased by 1. Such added motion candidates are named 'Truncated List0-predicted candidate'. Full pruning is applied.

5) For each motion candidates derived from $A_1$, $B_1$, $B_0$, $A_0$, $B_2$, Col and Col2 and numCurrMergeCand is less than 5, if the motion candidate is bi-prediction, the motion information from List 1 is added to the merge list (that is, modified to be uni-prediction from List 1) and numCurrMergeCand increased by 1. Such added motion candidates are named 'Truncated List1-predicted candidate'. Full pruning is applied.

6) For each motion candidates derived from $A_1$, $B_1$, $B_0$, $A_0$, $B_2$, Col and Col2 and numCurrMergeCand is less than 5, if the motion candidate is bi-prediction, If List 0 reference picture's slice Quantization Parameter (QP) is smaller than List 1 reference picture's slice QP, the motion information of List 1 is firstly scaled to List 0 reference picture, and the average of the two MVs (one is from original List 0, and the other is the scaled MV from List 1) is added to the merge list, that is averaged uni-prediction from List 0 motion candidate and numCurrMergeCand increased by 1.

Otherwise, the motion information of List 0 is firstly scaled to List 1 reference picture, and the average of the two MVs (one is from original List 1, and the other is the scaled MV from List 0) is added to the merge list, that is averaged uni-prediction from List 1 motion candidate and numCurrMergeCand increased by 1.

Full pruning is applied.

7) If numCurrMergeCand is less than 5, zero motion vector candidates are added.

2.11 Decoder-Side Motion Vector Refinement (DMVR) in VVC

Figure 13:
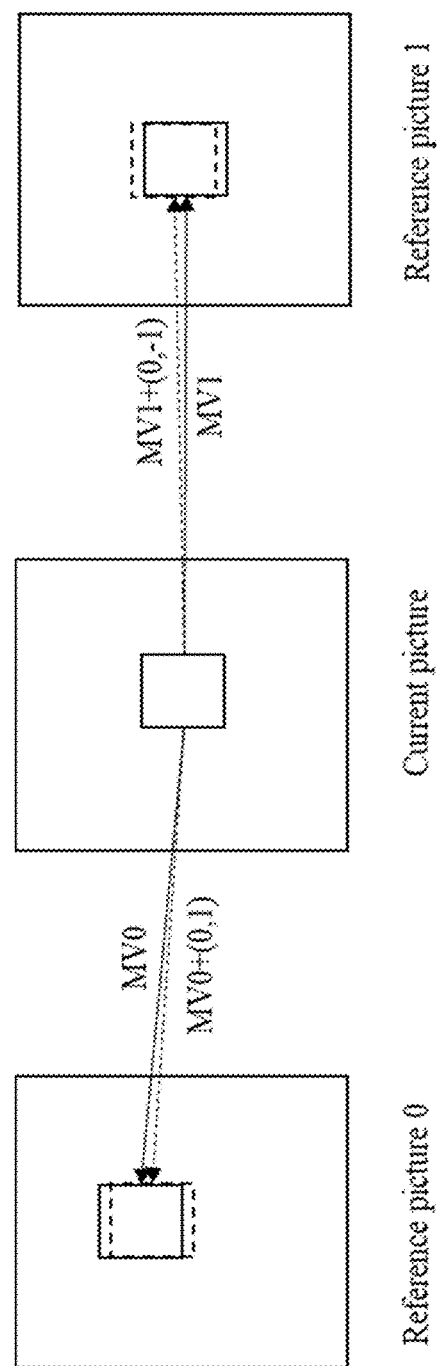
FIG. 13 shows an example of a motion vector difference MVD (0,1) mirrored between list 0 and liste 1 in DMVR.

For DMVR in VVC, MVD mirroring between list 0 and list 1 is assumed as shown in FIG. 13, and bilateral matching is performed to refine the MVs, e.g., to find the best MVD among several MVD candidates. Denote the MVs for two reference picture lists by MVL0(L0X, L0Y), and MVL1 (L1X, L1Y). The MVD denoted by (MvdX, MvdY) for list 0 that could minimize the cost function (e.g., SAD) is defined as the best MVD. For the SAD function, it is defined as the SAD between the reference block of list 0 derived with a motion vector (L0X+MvdX, L0Y+MvdY) in the list 0 reference picture and the reference block of list 1 derived with a motion vector (L1X−MvdX, L1Y−MvdY) in the list 1 reference picture.

Figure 14:
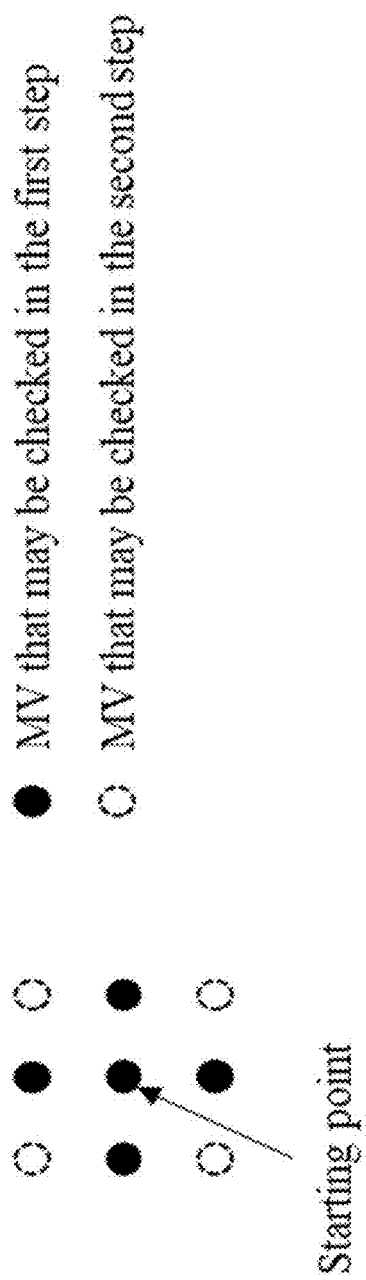
FIG. 14 shows example MVs that may be checked in one iteration.

The motion vector refinement process may iterate twice. In each iteration, at most 6 MVDs (with integer-pel precision) may be checked in two steps, as shown in FIG. 14. In the first step, MVD (0, 0), (−1, 0), (1, 0), (0, −1), (0, 1) are checked. In the second step, one of the MVD (−1, −1), (−1, 1), (1, −1) or (1, 1) may be selected and further checked. Suppose function Sad(x, y) returns SAD value of the MVD (x, y). The MVD, denoted by (MvdX, MvdY), checked in the second step is decided as follows:

$MvdX=-1$;

$MvdY=-1$;

If (Sad(1,0)<Sad(−1,0))

$MvdX=1$;

If (Sad(0,1)<Sad(0,−1))

$MvdY=1$;

In the first iteration, the starting point is the signaled MV, and in the second iteration, the starting point is the signaled MV plus the selected best MVD in the first iteration. DMVR applies only when one reference picture is a preceding picture and the other reference picture is a following picture, and the two reference pictures are with same picture order count distance from the current picture.

To further simplify the process of DMVR, the following main features can be implemented in some embodiments:

1. Early termination when (0,0) position SAD between list0 and list1 is smaller than a threshold.

2. Early termination when SAD between list0 and list1 is zero for some position.

3. Block sizes for DMVR: W*H>=64 && H>=8, wherein W and H are the width and height of the block.

4. Split the CU into multiple of 16×16 sub-blocks for DMVR of CU size>16*16. If only width or height of the CU is larger than 16, it is only split in vertical or horizontal direction.

5. Reference block size (W+7)*(H+7) (for luma).

6. 25 points SAD-based integer-pel search (e.g. (+−) 2 refinement search range, single stage)

7. Bilinear-interpolation based DMVR.

8. "Parametric error surface equation" based sub-pel refinement. This procedure is performed only when the minimum SAD cost is not equal to zero and the best MVD is (0, 0) in the last MV refinement iteration.

9. Luma/chroma MC w/reference block padding (if needed).

10. Refined MVs used for MC and TMVPs only.

2.11.1 Usage of DMVR

When the following conditions are all true, DMVR may be enabled:

DMVR enabling flag in the SPS (e.g., sps_dmvr_enabled_flag) is equal to 1.

TPM flag, inter-affine flag and subblock merge flag (either ATMVP or affine merge), MMVD flag are all equal to 0.

Merge flag is equal to 1.

Current block is bi-predicted, and Picture Order Count (POC) distance between current picture and reference picture in list 1 is equal to the POC distance between reference picture in list 0 and current picture.

The current CU height is greater than or equal to 8.

Number of luma samples (CU width*height) is greater than or equal to 64.

2.11.2 "Parametric Error Surface Equation" Based Sub-Pel Refinement

The method is summarized below:

1. The parametric error surface fit is computed only if the center position is the best cost position in a given iteration.

2. The center position cost and the costs at (−1,0), (0,−1), (1,0) and (0,1) positions from the center are used to fit a 2-D parabolic error surface equation of the form $$E(x,y)=A(x-x_0)^2+B(y-y_0)^2+C$$

where $(x_0,y_0)$ corresponds to the position with the least cost and C corresponds to the minimum cost value. By solving the 5 equations in 5 unknowns, $(x_0, y_0)$ is computed as:

$$x_0=(E(-1,0)-E(1,0))/(2(E(-1,0)+E(1,0)-2E(0,0)))$$

$$y_0=(E(0,-1)-E(0,1))/(2((E(0,-1)+E(0,1)-2E(0,0)))$$

$(x_0,y_0)$ can be computed to any required sub-pixel precision by adjusting the precision at which the division is performed (e.g. how many bits of quotient are computed). For $1/16^{th}$-pel accuracy, just 4-bits in the absolute value of the quotient needs to be computed, which lends itself to a fast shifted subtraction based implementation of the 2 divisions required per CU.

3. The computed $(x_0,y_0)$ are added to the integer distance refinement MV to get the sub-pixel accurate refinement delta MV.

2.11.3 Required reference samples in DMVR

Figure 15:
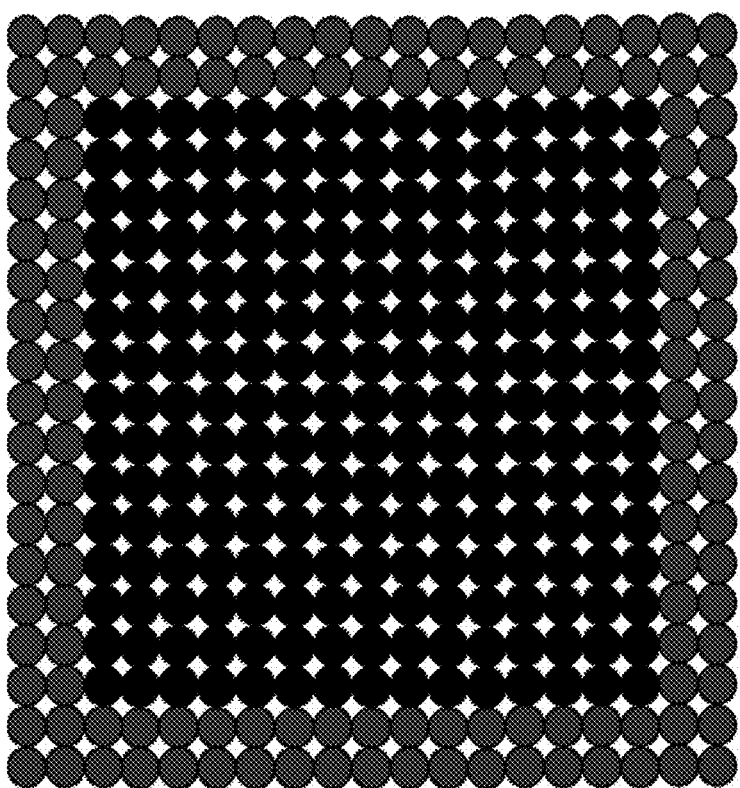
FIG. 15 shows required reference samples and boundary padded for calculations.

For a block with size W*H, suppose the maximum allowable MVD value is +/−offset (for example 2 in VVC), and the filter size is filteSize (for example, 8 for luma and 4 for chroma in VVC), then (W+2*offSet+filterSize−1)*(H+2*offSet+filterSize−1) reference samples are required. To reduce the memory bandwidth, only the center (W+filterSize−1)*(H+filterSize−1) reference samples are fetched, and the other pixels are generated by repeating the boundary of the fetched samples. Example for 8*8 block is shown in FIG. 15, 15*15 reference samples are fetched, and the boundary of the fetched samples are repeated to generate a 17*17 region.

During the motion vector refinement, bilinear motion compensation is performed using these reference samples. Meanwhile, the final motion compensation is also performed using these reference samples.

2.12 Bandwidth Calculation for Different Block Sizes

Based on the current 8-tap luma interpolation filter and 4-tap chroma interpolation filter, the memory bandwidth for each block unit (4:2:0 color format, one M×N luma block with two M/2×N/2 chroma blocks) is tabulated in Table 1 below.

TABLE 1

Example memory bandwidth

| Block Size M × N | Samples Required/pixel | Uni | Bi |
|---|---|---|---|
| 4*4 | (11*11 + 2*5*5)/(4*4) | 10.688 | 21.375 |
| 4*8 | (11*15 + 2*5*7)/(4*8) | 7.344 | 14.688 |
| 4*16 | (11*23 + 2*5*11)/(4*16) | 5.672 | 11.344 |
| 4*32 | (11*39 + 2*5*19)/(4*32) | 4.836 | 9.672 |
| 4*64 | (11*71 + 2*5*35)/(4*64) | 4.418 | 8.836 |
| 4*128 | (11*135 + 2*5*67)/(4*128) | 4.209 | 8.418 |
| 8*8 | (15*15 + 2*7*7)/(8*8) | 5.047 | 10.094 |
| 8*16 | (15*23 + 2*7*11)/(8*16) | 3.898 | 7.797 |
| 8*32 | (15*39 + 2*7*19)/(8*32) | 3.324 | 6.648 |
| 8*64 | (15*71 + 2*7*35)/(8*64) | 3.037 | 6.074 |
| 8*128 | (15*135 + 2*7*67)/(8*128) | 2.894 | 5.787 |

Similarly, based on the current 8-tap luma interpolation filter and 4-tap chroma interpolation filter, the memory bandwidth for each M×N luma block unit is tabulated in Table 2 below.

TABLE 2

Example memory bandwidth

| Block Size M × N | Samples Required/pixel | Uni | Bi |
|---|---|---|---|
| 4*4 | (11*11)/(4*4) | 7.563 | 15.125 |
| 4*8 | (11*15)/(4*8) | 5.156 | 10.313 |
| 4*16 | (11*23)/(4*16) | 3.953 | 7.906 |
| 4*32 | (11*39)/(4*32) | 3.352 | 6.703 |
| 4*64 | (11*71)/(4*64) | 3.051 | 6.102 |
| 4*128 | (11*135)/(4*128) | 2.900 | 5.801 |
| 8*8 | (15*15)/(8*8) | 3.516 | 7.031 |
| 8*16 | (15*23)/(8*16) | 2.695 | 5.391 |
| 8*32 | (15*39)/(8*32) | 2.285 | 4.570 |
| 8*64 | (15*71)/(8*64) | 2.080 | 4.160 |
| 8*128 | (15*135)/(8*128) | 1.978 | 3.955 |

Therefore, regardless the color format, the bandwidth requirement for each block size in descending order is:

4*4 Bi>4*8 Bi>4*16 Bi>4*4 Uni>8*8 Bi>4*32 Bi>4*64Bi>4*128 Bi>8*16 Bi>4*8 Uni>8*32 Bi> . . . .

2.12 Motion Vector Precision Issues in VTM-3.0

In VTM-3.0, the MV precision is $1/16$ luma pixel in storage. When MV is signaling, the finest precision is $1/4$ luma pixel.

3. Examples of Problems Solved by Disclosed Embodiments

1. The bandwidth control methods towards affine prediction are not clear enough and should be more flexible.

2. It is noted that in HEVC design, the worst case for memory bandwidth requirement is 8×8 bi-prediction even a coding unit (CU) could be split with asymmetric prediction mode, such as one 16×16 split to two PUs with size equal to 4×16 and 12×16. In VVC, due to the new QTBT partition structure, one CU could be set to 4×16 and bi-prediction could be enabled. bi-predicted 4×16 CU requires even higher memory bandwidth compared to bi-predicted 8×8 CU. How to deal with block sizes (such as 4×16 or 16×4) requiring higher bandwidth is unknown.

3. New coding tools, such as GBi, introduce more line buffer issues

4. Inter-intra mode requires more memory and logic to signal the intra-prediction mode used in an inter-coded block.

5. The 1/16 luma pixel MV precision requires a higher memory storage.

6. To interpolate four 4×4 blocks within one 8×8 block, it needs to fetch (8+7+1)*(8+7+1) reference pixels and requires around 14% more pixels when compared with non-affine/non-planar mode 8×8 block.

7. The averaging operation in hybrid intra and inter prediction shall be aligned with other coding tools, e.g., weighted prediction, local illumination compensation, OBMC and triangular prediction, wherein an offset is added before the shift.

4. Examples of Embodiments

The techniques disclosed herein can reduce the bandwidth and line buffers required in affine prediction and other new coding tools.

The description below should be considered as examples to explain general concepts and should not be interpreted in a narrow way. Furthermore, the embodiments can be combined in any manner.

In the discussions below, the width and height of the affine coded current CU are w and h, respectively. It is assumed that the interpolation filter tap (in motion compensation) is N (for example, 8, 6, 4, or 2), and the current block size is W×H.

Bandwidth Control for Affine Prediction

Example 1: Suppose the motion vector of a sub-block SB in an affine coded block is $MV_{SB}$ (denoted as (MVx, MVy)), $MV_{SB}$ can be within a certain range relative to a representative motion vector MV'(MV'x, MV'y).

In some embodiments, MVx>=MV'x−DH0 and MVx<=MV'x+DH1 and MVy>=MV'y−DV0 and MVy<=MV'y+DV1, where MV'=(MV'x, MV'y). In some embodiments, DH0 may be equal to DH1 or not; DV0 may be equal to DV1 or not. In some embodiments, DH0 may be equal to DV0 or not; DH1 may be equal to DV1 or not.

In some embodiments, DH0 may be not equal to DH1; DV0 may be not equal to DV1. In some embodiments, DH0, DH1, DV0 and DV1 may be signaled from encoder to decoder, such as in VPS/SPS/PPS/Slice header/tile group header/tile/CTU/CU/PU. In some embodiments, DH0, DH1, DV0 and DV1 may be specified differently for different standard profiles/levels/tiers. In some embodiments, DH0, DH1, DV0 and DV1 may depend on the width and height of the current block. In some embodiments, DH0, DH1, DV0 and DV1 may depend on whether the current block is uni-prediction or bi-prediction. In some embodiments, DH0, DH1, DV0 and DV1 may depend on the position of the sub-block SB. In some embodiments, DH0, DH1, DV0 and DV1 may depend on how to get MV'.

In some embodiments, MV' can be one CPMV such as MV0, MV1 or MV2.

In some embodiments, MV' can be the MV used in MC for one of the corner sub-block, such as MV0', MV1' or MV2' in FIG. 3.

In some embodiments, MV' can be the MV derived for any position inside or outside the current block with the affine model of the current block. For example, it may be derived for center position of the current block (e.g., x=w/2 and y=h/2).

In some embodiments, MV' can be the MV used in MC for any sub-block of the current block, such as one of the center sub-blocks (C0, C1, C2 or C3 shown in FIG. 3).

In some embodiments, If $MV_{SB}$ does not satisfy the constrain, $MV_{SB}$ should be clipped to the valid range. In some embodiments, the clipped $MV_{SB}$ is stored into the MV buffer, which will be used to predict the MVs of following coded blocks. In some embodiments, the $MV_{SB}$ before being clipped is stored into the MV buffer.

In some embodiments, if $MV_{SB}$ does not satisfy the constrain, the bit-stream is considered as not conforming to the standard (invalid). In one example, it can be specified in a standard that $MV_{SB}$ must or should satisfy the constrain. This constrains should be followed by any conforming encoder, otherwise, the encoder is regarded as not conforming to the standard.

In some embodiments, $MV_{SB}$ and MV' may be represented with the signaling MV precision (such as quarter-pixel precision). In some embodiments, $MV_{SB}$ and MV' may be represented with the storage MV precision (such as 1/16 precision). In some embodiments, $MV_{SB}$ and MV' may be rounded to a precision (such as the integer precision) different from the signaling or storage precision.

Example 2: For an affine coded block, each M×N (such as 8×4,4×8 or 8×8) block within the block is regarded as the basic unit. The MVs of all 4×4 sub-blocks inside the M×N are constrained such that the max difference between integer parts of the four 4×4 sub-block MVs is no more than K pixel.

In some embodiments, whether to and how to apply this constrain depends on whether the current block applies bi-prediction or uni-prediction. For example, the constrain is applied only for bi-prediction, not for uni-prediction. As another example, M, N and K are different for bi-prediction and uni-prediction.

In some embodiments, M, N and K may depend on the width and height of the current block.

In some embodiments, whether to apply the constrain may be signaled from encoder to decoder, such as in VPS/SPS/PPS/Slice header/tile group header/tile/CTU/CU/PU. For example, an on/off flag is signaled to indicate whether to apply the constrain. As another example, M, N and K are signaled.

In some embodiments, M, N and K may be specified differently for different standard profiles/levels/tiers.

Example 3: The width and height of a sub-block may be calculated differently for different affine coded blocks.

In some embodiments, the calculation methods are different for an affine coded block with uni-prediction and bi-prediction. In one example, the sub-block size is fixed (such as 4×4, 4×8 or 8×4) for a block with uni-prediction. In another example, the sub-block size is calculated for blocks with bi-prediction. In this case, sub-block size could be different for two different bi-predicted affine blocks.

In some embodiments, for bi-predicted affine blocks, the width and/or height of a sub-block from reference list 0 and the width and/or height of a sub-block from reference list 1 may be different. In one example, suppose the width and height of a sub-block from reference list 0 are derived as Wsb0 and Hsb0, respectively; the width and height of a sub-block from reference list 1 are derived as Wsb1 and Hsb1, respectively. Then the final width and height of sub-block for both reference list 0 and reference list 1 are calculated as Max(Wsb0, Wsb1) and Max(Hsb0, HSb1), respectively.

In some embodiments, the calculated width and height of a sub-block are only applied on the luma component. For chroma component, it is always fixed, such as 4×4 chroma sub-block, which corresponds to an 8×8 luma block with the 4:2:0 color format.

In some embodiments, MVx−MV'x and MVy−MV'y are calculated to decide the width and height of a sub-block. (MVx, MVy) and (MV'x, MV'y) are defined in Example 1.

In some embodiments, MVs involved in the calculation may be represented with the signaling MV precision (such as quarter-pixel precision). In one example, these MVs may be represented with the storage MV precision (such as 1/16 precision). As another example, these MVs may be rounded to a precision (such as the integer precision) different from the signaling or storage precision.

In some embodiments, the thresholds used in the calculation to decide the width and height of a sub-block may be signaled from encoder to decoder, such as in VPS/SPS/PPS/Slice header/tile group header/tile/CTU/CU/PU.

In some embodiments, the thresholds used in the calculation to decide the width and height of a sub-block may be different for different standard profiles/levels/tiers.

Example 4: To interpolate W1×H1 sub-blocks within one W2×H2 sub-block/block, a (W2+N−1−PW)*(H2+N−1−PH) block is first fetched and then pixel padding method (e.g., the boundary pixel repeating method) described in Example [00353] is applied to generate a larger block, which is then used to interpolate the W1×H1 sub-blocks. For example, W2=H2=8, W1=H1=4 and PW=PH=0.

In some embodiments, integer part of MV of any W1×H1 sub-block may be used to fetch the entire W2×H2 sub-block/block, and different boundary pixel repeating method may be required accordingly. For example, if the maximum difference between integer parts of all W1×H1 sub-block MVs is no more than 1 pixel, integer part of MV of the top-left W1×H1 sub-block is used to fetch the entire W2×H2 sub-block/block. The right and bottom boundary of the reference block are repeated once. As another example, if the maximum difference between integer parts of all W1×H1 sub-block MVs is no more than 1 pixel, integer part of MV of the bottom-right W1×H1 sub-block is used to fetch the entire W2×H2 sub-block/block. The left and top boundary of the reference block are repeated once.

In some embodiments, MV of any W1×H1 sub-block may be first modified and then used to fetch the entire W2×H2 sub-block/block, and different boundary pixel repeating method may be required accordingly. For example, if the maximum difference between integer parts of all W1×H1 sub-block MVs is no more than 2 pixels, integer part of MV of the top-left W1×H1 sub-block may be added by (1, 1) (here 1 means 1 integer pixel distance) and is then used to fetch the entire W2×H2 sub-block/block. In this case, the left, right, top and bottom boundary of the reference block are repeated once. As another example, if the maximum difference between integer parts of all W1×H1 sub-block MVs is no more than 2 pixels, integer part of MV of the bottom-right W1×H1 sub-block may be added by (−1, −1) (here 1 means 1 integer pixel distance) and is then used to fetch the entire W2×H2 sub-block/block. In this case, the left, right, top and bottom boundary of the reference block are repeated once.

Bandwidth Control for Specific Block Sizes

Example 5: Bi-prediction is not allowed if w and h of the current block satisfy one or more of the conditions as below.

A. w is equal to T1 and h is equal to T2, or h is equal to T1 and w is equal to T2.

In one example, T1=4 and T2=16.

B. w is equal to T1 and h is not greater than T2, or h is equal to T1 and w is not greater than T2. In one example, T1=4 and T2=16.

C. w is not greater than T1 and h is not greater than T2, or h is not greater than T1 and w is not greater than T2. In one example, T1=8 and T2=8. In another example, T1=8, T2=4. In still another example, T1=4 and T2=4.

In some embodiments, bi-prediction may be disabled for 4×8 blocks. In some embodiments, bi-prediction may be disabled for 8×4 blocks. In some embodiments, bi-prediction may be disabled for 4×16 blocks. In some embodiments, bi-prediction may be disabled for 16×4 blocks. In some embodiments, bi-prediction may be disabled for 4×8, 8×4 blocks. In some embodiments, bi-prediction may be disabled for 4×16, 16×4 blocks. In some embodiments, bi-prediction may be disabled for 4×8, 16×4 blocks. In some embodiments, bi-prediction may be disabled for 4×16, 8×4 blocks. In some embodiments, bi-prediction may be disabled for 4×N blocks, for example, N<=16. In some embodiments, bi-prediction may be disabled for N×4 blocks, for example, N<=16. In some embodiments, bi-prediction may be disabled for 8×N blocks, for example, N<=16. In some embodiments, bi-prediction may be disabled for N×8 blocks, for example, N<=16. In some embodiments, bi-prediction may be disabled for 4×8, 8×4, 4×16 blocks. In some embodiments, bi-prediction may be disabled for 4×8, 8×4, 16×4 blocks. In some embodiments, bi-prediction may be disabled for 8×4, 4×16, 16×4 blocks. In some embodiments, bi-prediction may be disabled for 4×8, 8×4, 4×16, 16×4 blocks.

In some embodiments, the block size disclosed in this document may refer to one color component such as the luma component, and the decision on whether bi-prediction is disabled can be applied to all color components. For example, if bi-prediction is disabled according to the block size of the luma component for a block, bi-prediction will also be disabled for corresponding blocks of other color components. In some embodiments, the block size disclosed in this document may refer to one color component such as the luma component, and the decision on whether bi-prediction is disabled can only be applied to that color component.

In some embodiments, if bi-prediction is disabled for a block, and the selected merge candidate is bi-predicted, then only one MV from reference list 0 or reference list 1 of the merge candidate is assigned to the block.

In some embodiments, Triangular Prediction Mode (TPM) is not allowed for a block if bi-prediction is disabled for the block.

In some embodiments, how to signal the prediction direction (uni-prediction from list 0/1, bi-prediction) may depend on the block dimension. In one example, when 1) block width*block height<64 or 2) block width*block height=64 but width is unequal to height, the indication of uni-prediction from list 0/1 may be signaled. As another example, when 1) block width*block height>64 or 2)n width*block height=64 and width is equal to height, the indication of uni-prediction from list 0/1 or bi-prediction may be signaled.

In some embodiments, both uni-prediction and bi-prediction may be disabled for 4×4 blocks. In some embodiments, it may be disabled for affine coded blocks. Alternatively, it may be disabled for non-affine coded blocks. In some embodiments, the indication of quad-tree split for an 8×8 block, binary tree split for 8×4 or 4×8 block, triple tree split for an 4×16 or 16×4 block may be skipped. In some embodiments, a 4×4 block must be coded as an intra-block. In some embodiments, the MV for a 4×4 block must be in integer-precision. For example, the IMV flag for a 4×4 block must be 1. As another example, the MV for a 4×4 block must be rounded to integer-precision.

Figure 9:
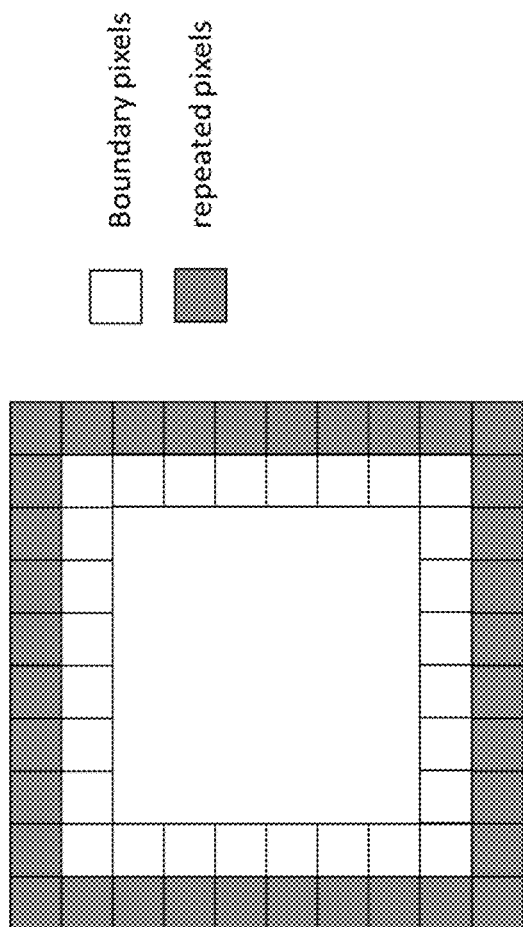
FIG. 9 shows an example of repeat boundary pixels of a reference block before interpolation.

In some embodiments, bi-prediction is allowed. However, suppose the interpolation filter tap is N, instead of fetching (W+N−1)*(H+N−1) reference pixels, only (W+N−1−PW)*(W+N−1−PH) reference pixels are fetched. Meanwhile, pixels at the reference block boundaries (top, left, bottom and right boundary) are repeated to generate a (W+N−1)*(H+N−1) block as shown in FIG. 9 which is used for the final interpolation. In some embodiments, PH is zero, and only left or/and right boundaries are repeated. In some embodiments, PW is zero, and only top or/and bottom boundaries are repeated. In some embodiments, both PW and PH are greater than zero, and first the left or/and the right boundaries are repeated, and then the top or/and bottom boundaries are repeated. In some embodiments, both PW and PH are greater than zero, and first the top or/and bottom boundaries are repeated, and then the left and right boundaries are repeated. In some embodiments, the left boundary is repeated by M1 times and the right boundary is repeated by PW−M1 times. In some embodiments, the top boundary is repeated by M2 times and the bottom boundary is repeated by PH−M2 times. In some embodiments, such boundary pixels repeating method may be applied to some of or all reference blocks. In some embodiments, PW and PH may be different for different color components such as Y, Cb and Cr.

FIG. 9 shows an example of repeat boundary pixels of the reference block before the interpolation.

Figure 11:
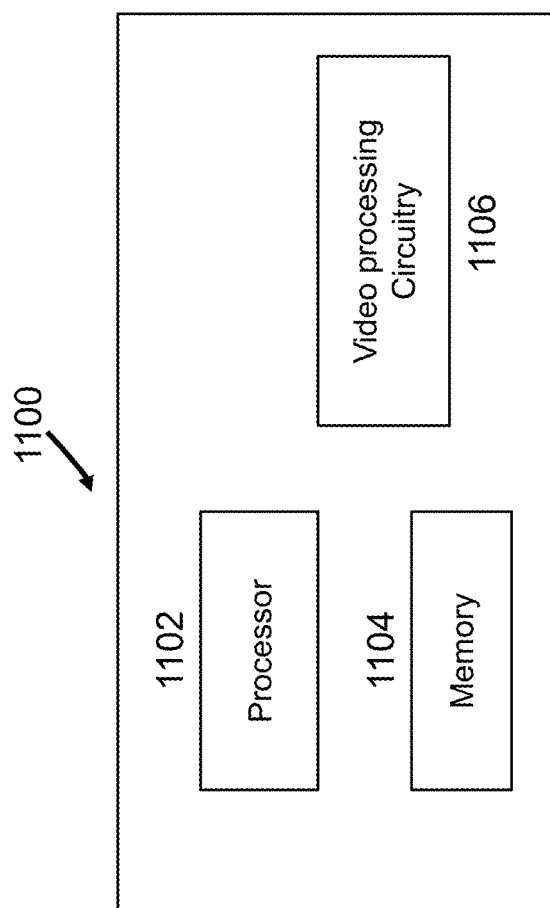
FIG. 11 is a block diagram of an example of a hardware platform for implementing a video decoder or video encoder apparatus described herein.

Example 6: In some embodiments, (W+N−1−PW)*(W+N−1−PH) reference pixels (instead of (W+N−1)*(H+N−1) reference pixels) may be fetched for motion compensation of W×H block. The samples out of the range (W+N−1−PW)*(W+N−1−PH) but inside the range (W+N−1)*(H+N−1) are padded to do the interpolation process. In one padding method, pixels at the reference block boundaries (top, left, bottom and right boundary) are repeated to generate a (W+N−1)*(H+N−1) block as shown in FIG. 11, which is used for the final interpolation.

In some embodiments, PH is zero, and only left or/and right boundaries are repeated.

In some embodiments, PW is zero, and only top or/and bottom boundaries are repeated.

In some embodiments, both PW and PH are greater than zero, and first the left or/and the right boundaries are repeated, and then the top or/and bottom boundaries are repeated.

In some embodiments, both PW and PH are greater than zero, and first the top or/and bottom boundaries are repeated, and then the left and right boundaries are repeated.

In some embodiments, the left boundary is repeated by M1 times and the right boundary is repeated by PW−M1 times.

In some embodiments, the top boundary is repeated by M2 times and the bottom boundary is repeated by PH−M2 times.

In some embodiments, such boundary pixels repeating method may be applied to some of or all reference blocks.

In some embodiments, PW and PH may be different for different color components such as Y, Cb and Cr.

In some embodiments, PW and PH may be different for different block size or shape.

In some embodiments, PW and PH may be different for uni-prediction and bi-prediction.

In some embodiments, padding may be not performed in affine mode.

In some embodiments, the samples out of the range (W+N−1−PW)*(W+N−1−PH) but inside the range (W+N−1)*(H+N−1) are set to be a single value. In some embodiments, the single value is 1<<(BD−1), where BD is the bit-depth the samples, such as 8 or 10. In some embodiments, the single value is signalled from the encoder to the decoder in VPS/SPS/PPS/slice header/tile group header/tile/CTU row/CTU/CU/PU.

In some embodiments, the single value is derived from samples inside the range (W+N−1−PW)*(W+N−1−PH).

Example 7: Instead of fetching (W+filterSize−1)*(H+filterSize−1) reference samples in DMVR, (W+filterSize−1−PW)*(H+filterSize−1−PH) reference samples may be fetched, and all other required samples may be generated by repeating the boundary of the fetched reference samples, wherein PW>=0 and PH>=0.

In some embodiments, method proposed in Example [00353] may be used to pad the non-fetched samples.

In some embodiments, in the final motion compensation of DMVR, padding may be not performed again.

In some embodiments, whether to apply the above methods may depend on the block dimension.

Example 8: The signaling method of inter_pred_idc may depend on whether w and h satisfy the conditions in Example 5. One example is shown in Table 3 below:

TABLE 3

| | Name of inter_pred_idc | |
|---|---|---|
| inter_pred_idc | !((w==T1 && h==T2) \|\|(h==T1 && w==T2)) | (w==T1 && h==T2) \|\|(h==T1 && w==T2) |
| 0 | PRED_L0 | PRED_L0 |
| 1 | PRED_L1 | PRED_L1 |
| 2 | PRED_BI | n.a. |

Another example is shown in Table 4 below:

TABLE 4

| | Name of inter_pred_idc | |
|---|---|---|
| inter_pred_idc | !((w==T1 && h<=T2) \|\|(h==T1 && w<=T2)) | (w==T1 && h<=T2) \|\|(h==T1 && w<=T2) |
| 0 | PRED_L0 | PRED_L0 |
| 1 | PRED_L1 | PRED_L1 |
| 2 | PRED_BI | n.a. |

Yet another example is shown in Table 5 below:

TABLE 5

| | Name of inter_pred_idc | |
|---|---|---|
| inter_pred_idc | !((w<=T1 && h<=T2) \|\|(h<=T1 && w<=T2)) | (w<=T1 && h<=T2) \|\|(h<=T1 && w<=T2) |
| 0 | PRED_L0 | PRED_L0 |
| 1 | PRED_L1 | PRED_L1 |
| 2 | PRED_BI | n.a. |

Example 9: The merge candidate list construction process may depend on whether w and h satisfy the conditions in Example 4. The following embodiments describe cases when w and h satisfy the conditions.

In some embodiments, if one merge candidate uses bi-prediction, then only the prediction from reference list 0 is retained, and the merge candidate is treated as uni-prediction referring to reference list 0.

In some embodiments, if one merge candidate uses bi-prediction, then only the prediction from reference list 1 is retained, and the merge candidate is treated as uni-prediction referring to reference list 1.

In some embodiments, if one merge candidate uses bi-prediction, then the candidate is treated as unavailable. That is, such a merge candidate is removed from the merge list.

In some embodiments, the merge candidate list construction process for Triangular Prediction Mode is used instead.

Example 10: The coding tree split process may depend on whether the width and height of a child CU after the split satisfies the conditions in Example 5.

In some embodiments, if the width and height of a child CU after the split satisfies the conditions in Example 5, then the split is not allowed. In some embodiments, the signaling of coding tree split may depend on whether one kind of split is allowed or not.

In one example, if one kind of split is not allowed, the codeword representing the split is omitted.

Example 11: Signaling of skip flag or/and Intra Block Copy (IBC) flag may depend on whether the width and/or height of the block satisfies certain conditions (e.g., conditions mentioned in Example 5).

In some embodiments, the condition is that the luma block contains no more than X samples. E.g. X=16;

In some embodiments, the condition is that the luma block contains X samples. E.g. X=16.

In some embodiments, the condition is that the luma block's width and height are both equal to X. e.g. X=4;

In some embodiments, when the one or some of the above conditions are true, inter mode and/or IBC mode is disallowed for such a block.

In some embodiments, if inter mode is disallowed for a block, skip flag may be not signaled for it. Alternatively, furthermore, the skip flag may be inferred to be false.

In some embodiments, if inter mode and IBC mode are disallowed for a block, skip flag may be not signaled for it and may be derived to be false implicitly (e.g., the block is derived to be coded in non-skip mode).

In some embodiments, if inter mode is disallowed for a block but IBC mode is allowed for the block, skip flag may be still signaled. In some embodiments, IBC flag may be not signaled if the block is coded in skip mode, and the IBC flag is derived to be true implicitly (e.g., the block is derived to be coded in IBC mode).

Example 12: Signaling of prediction mode may depend on whether the width and/or height of the block satisfies certain conditions (e.g., conditional mentioned in Example 5).

In some embodiments, the condition is that the luma block contains no more than 1×6 samples, e.g. X=16.

In some embodiments, the condition is that the luma block contains X samples, e.g. X=16.

In some embodiments, the condition is that the luma block's width and height are both equal to X, e.g. X=4.

In some embodiments, when one or some of the above conditions are true, inter mode and/or IBC mode is disallowed for such a block.

In some embodiments, signaling of indications of certain modes may be skipped.

In some embodiments, if inter mode and IBC mode are disallowed for a block, signalling of indications of inter and IBC modes is skipped, remaining allowed modes may be still signaled, such as whether it is intra mode or palette mode.

In some embodiments, if inter mode and IBC mode are disallowed for a block, prediction mode may be not signaled. Alternatively, furthermore, and the prediction mode may be derived to be intra mode implicitly.

In some embodiments, if inter mode is disallowed for a block, signalling of indications of inter modes is skipped, remaining allowed modes may be still signaled, such as whether it is intra mode or IBC mode. Alternatively, remaining allowed modes may be still signaled, such as whether it is intra mode or IBC mode or palette mode.

In some embodiments, if inter mode is disallowed for a block but IBC mode and intra mode are allowed for it, IBC flag may be signaled to indicate whether the block is coded in IBC mode or not. Alternatively, furthermore, prediction mode may be not signaled.

Example 13: Signaling of triangle mode may depend on whether the width and/or height of the block satisfies certain conditions (e.g., conditional mentioned in Example 5).

In some embodiments, the condition is that the luma block size is one of some specific sizes. For example, the specific sizes may include 4×16 or/and 16×4.

In some embodiments, when the above condition is true, triangle mode may be disallowed, and the flag indicating whether the current block is coded in triangle mode may be not signaled and may be derived to be false.

Example 14: Signaling of inter prediction direction may depend on whether the width and/or height of the block satisfies certain conditions (e.g., conditional mentioned in Example 5).

In some embodiments, the condition is that the luma block size is one of some specific sizes. For example, the specific sizes may include 8×4 or/and 4×8 or/and 4×16 or/and 16×4.

In some embodiments, when the above condition is true, the block may be only uni-predicted, and the flag indicating whether the current block is bi-predicted may be not signaled and may be derived to be false.

Example 15: Signaling of SMVD (symmetric MVD) flag may depend on whether the width and/or height of the block satisfies certain conditions (e.g., conditional mentioned in Example 5).

In some embodiments, the condition is that the luma block size is one of some specific sizes. In some embodiments, the condition is defined as whether block size has no more than 32 samples. In some embodiments, the condition is defined as whether block size is 4×8 or 8×4. In some embodiments, the condition is defined as whether block size is 4×4, 4×8 or 8×4. In some embodiments, the specific sizes may include 8×4 or/and 4×8 or/and 4×16 or/and 16×4.

In some embodiments, when certain conditions are true, the indication of usage of SMVD (such as SMVD flag) may be not signaled and may be derived to be false. For example, the block may be set to uni-predicted.

In some embodiments, when certain conditions are true, the indication of usage of SMVD (such as SMVD flag) may be still signaled, however, only list 0 or list 1 motion information may be utilized in the motion compensation process.

Example 16: Motion vectors (like motion vectors derived in regular merge mode, ATMVP mode, MMVD merge mode, MMVD skip mode etc.) or block vectors used for IBC, may be modified depending on whether the width and/or height of the block satisfies certain conditions.

In some embodiments, the condition is that the luma block size is one of some specific sizes. For example, the specific sizes may include 8×4 or/and 4×8 or/and 4×16 or/and 16×4.

In some embodiments, when the above condition is true, motion vectors or block vectors of the block may be changed to uni-directional motion vectors, if the derived motion information is bi-prediction (e.g., inherited from a neighboring block with some offsets). Such a process is called converting process and the final uni-directional motion vector is named as 'converted uni-directional' motion vector. In some embodiments, motion information of reference picture list X (e.g., X is 0 or 1) may be kept and the motion information and that of list Y (Y being 1−X) may be discarded. In some embodiments, motion information of reference picture list X (e.g., X is 0 or 1) and that of list Y (Y being 1−X) may be jointly utilized to derive a new motion candidate point to list X. In one example, the motion vector of the new motion candidate may be the averaged motion vector of two reference picture lists. As another example, motion information of list Y may be scaled to list X firstly. Then the motion vector of the new motion candidate may be the averaged motion vector of two reference picture lists. In some embodiments, motion vectors in prediction direction X may be not used (e.g., motion vector in prediction direction X is changed to (0, 0), and reference index in prediction direction X is changed to −1), and prediction direction may be changed to 1−X, X=0 or 1. In some embodiments, the converted uni-directional motion vectors may be used to update the HMVP lookup table. In some embodiments, the derived bi-directional motion information, e.g., the bi-directional MVs before converted to uni-directional MVs, may be used to update the HMVP lookup table. In some embodiments, the converted uni-directional motion vectors may be stored and may be used for motion prediction of following coded blocks, TMVP, deblocking, etc. In some embodiments, the derived bi-directional motion information, e.g., the bi-directional MVs before converted to uni-directional MVs, may be stored and may be used for motion prediction of following coded blocks, TMVP, deblocking, etc. In some embodiments, the converted uni-directional motion vectors may be used for motion refinement. In some embodiments, the derived bi-directional motion information may be used for motion refinement and/or sample refinement, such as with the optical flow methods. In some embodiments, the prediction blocks generated according to the derived bi-directional motion information may be firstly refined, afterwards, only one prediction block may be utilized to derive the final prediction and/or reconstruction block of one block.

In some embodiments, when certain conditions are true, (bi-predicted) motion vectors may be converted to uni-directional motion vectors before being used as the base merge candidates in MMVD.

In some embodiments, when certain conditions are true, (bi-predicted) motion vectors may be converted to uni-directional motion vectors before being inserted into the merge list.

In some embodiments, the converted uni-directional motion vectors may be from reference list 0 only. In some embodiments, when the current slice/tile group/picture is bi-predicted, the converted uni-directional motion vectors may be from reference list 0 or list 1. In some embodiments, when the current slice/tile group/picture is bi-predicted, the converted uni-directional motion vectors from reference list 0 and list 1 may be interleaved in merge list or/and MMVD base merge candidate list.

In some embodiments, how to convert motion information to uni-directional motion vectors may depend on reference pictures. In some embodiments, if all reference pictures of one video data unit (such as tile/tile group) are past pictures in the display order, list 1 motion information may be utilized. In some embodiments, if at least one of reference pictures of one video data unit (such as tile/tile group) is a past picture, and at least one is a future picture, in the display order, list 0 motion information may be utilized. In some embodiments, how to convert motion information to uni-directional motion vectors may depend on the low delay check flag.

In some embodiments, the converting process may be invoked right before the motion compensation process. In some embodiments, the converting process may be invoked right after the motion candidate list (e.g., merge list) construction process. In some embodiments, the converting process may be invoked before invoking the adding MVD process in the MMVD process. That is, the adding MVD process follows the design of uni-prediction instead of bi-prediction. In some embodiments, the converting process may be invoked before invoking the sample refinement process in the PROF process. That is, the adding MVD process follows the design of uni-prediction instead of bi-prediction. In some embodiments, the converting process may be invoked before invoking the BIO (a.k.a. BDOF) process. That is, for some cases, BIO may be disabled since it has been converted to uni-prediction. In some embodiments, the converting process may be invoked before invoking the DMVR process. That is, for some cases, DMVR may be disabled since it has been converted to uni-prediction.

Example 17: In some embodiments, how to generate motion candidate list may depend on block dimension.

In some embodiments, for certain block dimensions, all the motion candidates derived from spatial blocks and/or temporal block and/or HMVP and/or other kinds of motion candidates may be restricted to be uni-predicted.

In some embodiments, for certain block dimensions, if one motion candidate derived from spatial blocks and/or temporal block and/or HMVP and/or other kinds of motion candidates is bi-prediction, it may be firstly converted to uni-predicted before being added to the candidate list.

Example 18: Whether shared merge list is allowed may depend on the encoding mode.

In some embodiments, shared merge list may be disallowed for blocks coded with regular merge mode and may be allowed for blocks coded with IBC mode.

In some embodiments, when one block split from a parent sharing node is coded with regular merge mode, updating of HMVP tables may be disabled after encoding/decoding the block.

Example 19: In the above disclosed examples, the block size/width/height for a luma block can also be changed to the block size/width/height for a chroma block, such as Cb, Cr, or G/B/R.

Line Buffer Reduction for GBi Mode

Example 20: Whether the GBi weighted index can be inherited or predicted (including CABAC context selection) from a neighboring block or not, depends on the position of the current block.

In some embodiments, the GBi weighted index cannot be inherited or predicted from a neighboring block which is not in the same Coding Tree Unit (CTU, a.k.a. Largest Coding Unit LCU) as the current block.

In some embodiments, the GBi weighted index cannot be inherited or predicted from a neighboring block which is not in the same CTU line or CTU row as the current block.

In some embodiments, the GBi weighted index cannot be inherited or predicted from a neighboring block which is not in the M×N region as the current block. For example, M=N=64. In this case, a tile/slice/picture is split to multiple un-overlapped M×N regions.

Figure 10:
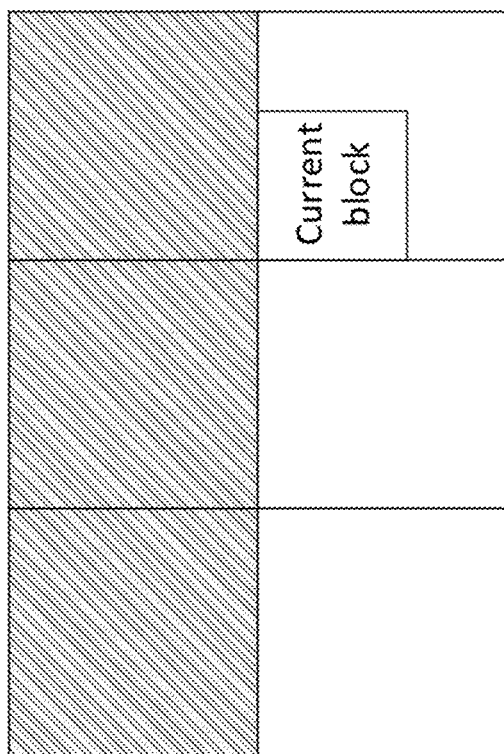
FIG. 10 shows an example of a coding tree unit (CTU) and CTU (region) lines. Shaded CTUs (regions) are in one CUT (region) line, Un-shaded CTUs (regions) are in the other CUT (region) line.

In some embodiments, the GBi weighted index cannot be inherited or predicted from a neighboring block which is not in the same M×N region line or M×N region row as the current block. For example, M=N=64. CTU line/row and region line/row are depicted in FIG. 10.

In some embodiments, suppose the top-left corner (or any other position) of the current block is (x,y), the top-left corner (or any other position) of the neighboring block is (x', y'), then it cannot be inherited or predicted from the neighboring block if one of the following conditions is met.

(1) x/M !=x'/M. For example, M=128 or 64.
(2) y/N !=y'/N. For example, N=128 or 64.
(3) ((x/M !=x'/M) && (y/N !=y'/N)). For example, M=N=128 or M=N=64.
(4) ((x/M !=x'/M)||(y/N !=y'/N)). For example, M=N=128 or M=N=64.
(5) x>>M !=x'>>M. For example, M=7 or 6.
(6) y>>N !=y'>>N. For example, N=7 or 6.
(7) ((x>>M !=x'>>M) && (y>>N !=y'>>N)). For example, M=N=7 or M=N=6.
(8) ((x>>M!=x'>>M)||(y>>N !=y'>>N)). For example, M=N=7 or M=N=6.

In some embodiments, a flag is signaled in PPS or slice header or tile group header or tile to indicate whether GBi can be applied or not in a picture/slice/tile group/tile. In some embodiments, whether GBi is used and how GBi is used (such as how many candidate weights and the weights' values) may be derived for a picture/slice/tile group/tile. In some embodiments, the derivation may depend on information such as QP, temporal layer, POC distance, etc.

FIG. 10 shows an example of CTU (region) lines. Shaded CTUs (regions) are in one CUT (region) line, Un-shaded CTUs (regions) are in the other CUT (region) line.

Simplification for Inter-Intra Prediction (IIP)

Example 21: Coding of an intra-prediction mode in an IIP-coded block is coded is independently from the intra-prediction mode of an IIP-coded neighboring block.

In some embodiments, only intra-prediction mode of an intra-coded block can be used in the coding of the intra-prediction mode for an IIP-coded block, such as, during the MPM list construction process.

In some embodiments, the intra-prediction mode in an IIP-coded block is coded without mode prediction from any neighboring blocks.

Example 22: the intra-prediction mode of an IIP-coded block may have a lower priority than that of an intra-coded block when they are both used to code the intra-prediction mode of a new IIP-coded block.

In some embodiments, when deriving the MPMs for an IIP-coded block, intra-prediction modes of both IIP-coded block and intra-coded neighboring blocks are utilized. However, intra prediction modes from intra-coded neighboring blocks may be inserted to the MPM list before those from IIP-coded neighboring blocks.

In some embodiments, intra-prediction modes from intra-coded neighboring blocks may be inserted to the MPM list after those from IIP-coded neighboring blocks.

Example 23: The intra-prediction mode in an IIP-coded block can also be used to predict that of an intra-coded block.

In some embodiments, the intra-prediction mode in an IIP-coded block can be used to derive the MPMs for a normal intra-coded block. In some embodiments, the intra-prediction mode in an IIP-coded block may have a lower priority than the intra-prediction mode in an intra-coded block when they are used to derive the MPMs for a normal intra-coded block.

In some embodiments, the intra-prediction mode in an IIP-coded block can also be used to predict the intra-prediction mode of a normal intra-coded block or IIP-coded block only when one or more of the following conditions is met:
1. the two blocks are in the same CTU line.
2. the two blocks are in the same CTU.
3. the two blocks are in the same M×N region such as M=N=64.
4. the two blocks are in the same M×N region line such as M=N=64.

Example 24: In some embodiments, the MPM construction process for an IIP-coded block should be the same to that for a normal intra-coded block.

In some embodiments, six MPMs are used for an inter-coded block with inter-intra prediction.

In some embodiments, only partial of MPMs are used for an IIP-coded block. In some embodiments, the first one is always used. Alternatively, furthermore, there is no need to signal the MPM flag and MPM index neither. In some embodiments, the first four MPMs may be utilized. Alternatively, furthermore, there is no need to signal the MPM flag but MPM index needs to be signaled.

In some embodiments, each block may select one from the MPM list according to the intra prediction modes included in the MPM list, such as selecting the mode with smallest index compared to a given mode (e.g., planar).

In some embodiments, each block may select a subset of modes from the MPM list and signal the mode index in the subset.

In some embodiments, the contexts used for coding intra MPM modes are reused for coding intra modes in IIP-coded blocks. In some embodiments, different contexts used for coding intra MPM modes are employed for coding intra modes in IIP-coded blocks.

Example 25: In some embodiments, for angular intra prediction modes excluding Horizontal and vertical directions, equal weights are utilized for the intra prediction block and inter prediction block generated for IIP-coded blocks.

Example 26: In some embodiments, for certain positions, zero weights may be applied in the IIP coding process.

In some embodiments, zero weights may be applied to the intra prediction block used in IIP coding process.

In some embodiments, zero weights may be applied to the inter prediction block used in IIP coding process.

Example 27: In some embodiments, the intra-prediction mode of an IIP-coded block can only be selected as one of the MPMs, no matter what the size of the current block is.

In some embodiments, the MPM flag is not signaled and inferred to be 1, no matter what the size of the current block is.

Example 28: For an IIP-coded block, Luma-predict-chroma mode (LM) mode is used instead of derived mode (DM) mode to do the intra-prediction for the chroma components.

In some embodiments, both DM and LM may be allowed.

In some embodiments, multiple intra prediction modes may be allowed for chroma components.

In some embodiments, whether to allow multiple modes for chroma components may depend on the color format. In one example, for 4:4:4 color format, the allowed chroma intra prediction modes may be the same as that for the luma component.

Example 29: Inter-intra prediction may not be allowed in one or more specific cases as below:
A. w==T1||h==T1, for example, T1=4
B. w>T1||h>T1, for example, T1=64
C. (w==T1 && h==T2) 11 (w==T2 && h==T1), for example, T1=4, T2=16.

Example 30: Inter-intra prediction may not be allowed for a block with bi-prediction.

In some embodiments, if the selected merge candidate for an IIP-coded block uses bi-prediction, it will be converted to a uni-prediction merge candidate. In some embodiments, only the prediction from reference list 0 is retained, and the merge candidate is treated as uni-prediction referring to reference list 0. In some embodiments, only the prediction from reference list 1 is retained, and the merge candidate is treated as uni-prediction referring to reference list 1.

In some embodiments, a restriction is added that the selected merge candidate shall be an uni-prediction merge candidate. Alternatively, the signaled merge index for an IIP-coded block indicates the index of uni-prediction merge candidates (that is, bi-prediction merge candidates are not counted).

In some embodiments, the merge candidate list construction process used in Triangular Prediction Mode may be utilized to derive the motion candidate list for IIP-coded blocks.

Example 31: When Inter-intra prediction is applied, some coding tools may be disallowed.

In some embodiments, the Bi-directional Optical flow (BIO) is not applied for bi-prediction.

In some embodiments, the Overlapped Block Motion Compensation (OBMC) is not applied.

In some embodiments, decoder side motion vector derivation/refinement processes are disallowed.

Example 32: The intra prediction process used in inter-intra prediction may be different from that used in normal intra-coded blocks.

In some embodiments, the neighboring samples may be filtered in different ways. In some embodiments, the neighboring samples are not filtered before conducting intra-prediction used in inter-intra prediction.

In some embodiments, position-dependent intra prediction sample filtering process is not conducted for intra-prediction used in inter-intra prediction. In some embodiments, multiline intra-prediction is not allowed in inter-intra prediction. In some embodiments, wide-angle intra-prediction is not allowed in inter-intra prediction.

Example 33: Suppose intra and inter prediction values in hybrid intra and inter prediction are PIntra and Pinter, and the weighting factor are w_intra and w_inter respectively. The prediction value at position (x, y) is calculated as (PIntra(x, y)*w_intra(x, y)+PInter(x, y)*w_inter(x, y)+offset(x, y))>>N, wherein w_intra(x, y)+w_iner(x, y)=2^N, and offset(x, y)=2^(N−1). In one example, N=3.

Example 34: In some embodiments, the MPM flags signaled in normal intra-coded block and in the IIP-coded block should share the same arithmetic coding context.

Example 35: In some embodiments, no MPM is needed to code the intra-prediction mode in a IIP-coded block. (Suppose the block width and height are w and h).

In some embodiments, the four modes {Planar, DC, Vertical, Horizontal} are binarized as 00, 01, 10 and 11 (can be with any mapping rule such as 00-Planar, 01-DC, 10-Vertical, 11-Horizontal).

In some embodiments, the four modes {Planar, DC, Vertical, Horizontal} are binarized as 0, 10, 110 and 111 (can be with any mapping rule such as 0-Planar, 10-DC, 110-Vertical, 111-Horizontal).

In some embodiments, the four modes {Planar, DC, Vertical, Horizontal} are binarized as 1, 01, 001 and 000 (can be with any mapping rule such as 1-Planar, 01-DC, 001-Vertical, 000-Horizontal).

In some embodiments, only three modes {Planar, DC, Vertical} can be used when W>N*H (N is an integer such as 2) can be used. The three modes are binarized as 1, 01, 11 (can be with any mapping rule such as 1-Planar, 01-DC, 11-Vertical).

In some embodiments, only three modes {Planar, DC, Vertical} can be used when W>N*H (N is an integer such as 2) can be used. The three modes are binarized as 0, 10, 00 (can be with any mapping rule such as 0-Planar, 10-DC, 00-Vertical).

In some embodiments, only three modes {Planar, DC, Horizontal} can be used when H>N*W (N is an integer such as 2) can be used. The three modes are binarized as 1, 01, 11 (can be with any mapping rule such as 1-Planar, 01-DC, 11-Horizontal).

In some embodiments, only three modes {Planar, DC, Horizontal} can be used when H>N*W (N is an integer such as 2) can be used. The three modes are binarized as 0, 10, 00 (can be with any mapping rule such as 0-Planar, 10-DC, 00-Horizontal).

Example 36: In some embodiments, only DC and Planar modes are used in an IIP-coded block. In some embodiments, one flag is signaled to indicate whether DC or Planar is used.

Example 37: In some embodiments, IIP is conducted differently for different colour component.

In some embodiments, inter-intra-prediction is not done on chroma components (such as Cb and Cr).

In some embodiments, intra-prediction mode for chroma component is different from that for the Luma component in an IIP-coded block. In some embodiments, DC mode is always used for chroma. In some embodiments, planar mode is always used for chroma.

In some embodiments, LM mode is always used for chroma. In some embodiments, how to conduct IP for different color component may depend on color format (such as 4:2:0 or 4:4:4).

In some embodiments, how to conduct IP for different color component may depend on block size. For example, Inter-intra-prediction is not done on chroma components (such as Cb and Cr), when width or height of the current block is equal or smaller than 4.

MV Precision Issues

In the following discussion, the precision used for MVs stored for spatial motion prediction is denoted as P1, and the precision used for MVs stored for temporal motion prediction is denoted as P2.

Example 38: P1 and P2 may be the same, or they may be different.

In some embodiments, P1 is 1/16 luma pixel and P2 is ¼ luma pixel. In some embodiments, P1 is 1/16 luma pixel and P2 is ⅛ luma pixel. In some embodiments, P1 is ⅛ luma pixel and P2 is ¼ luma pixel. In some embodiments, P1 is ⅛ luma pixel and P2 is ⅛ luma pixel. In some embodiments, P2 is 1/16 luma pixel and P1 is ¼ luma pixel. In some embodiments, P2 is 1/16 luma pixel and P1 is ⅛ luma pixel. In some embodiments, P2 is ⅛ luma pixel and P1 is ¼ luma pixel.

Example 39: P1 and P2 may not be fixed. In some embodiments, P1/P2 may be different for different standard profiles/levels/tiers. In some embodiments, P1/P2 may be different for pictures in different temporal layers. In some embodiments, P1/P2 may be different for pictures with different width/height. In some embodiments, P1/P2 may be signaled from the encoder to the decoder in VPS/SPS/PPS/slice header/tile group header/tile/CTU/CU.

Example 40: For a MV (MVx, MVy), the precision for MVx and MVy may be different, denoted as Px and Py.

In some embodiments, Px/Py may be different for different standard profiles/levels/tiers. In some embodiments, Px/Py may be different for pictures in different temporal layers. In some embodiments, Px may be different for pictures with different width. In some embodiments, Py may be different for pictures with different height. In some embodiments, Px/Py may be signaled from the encoder to the decoder in VPS/SPS/PPS/slice header/tile group header/tile/CTU/CU.

Example 41: Before putting a MV (MVx, MVy) into the storage for temporal motion prediction, it should be changed to the correct precision.

In some embodiments, MVx=Shift(MVx, P1-P2), MVy=Shift(MVy, P1-P2), if P1>=P2. In some embodiments, MVx=SignShift(MVx, P1-P2), MVy=SignShift(MVy, P1-P2), if P1>=P2. In some embodiments, MVx=MVx<< (P2-P1), MVy=MVy<<(P2-P1), if P1<P2.

Example 42: Suppose the MV(MVx, MVy) precision is Px and Py, and MVx or MVy is stored by an integer with N bits. The range of MV (MVx, MVy) is MinX<=MVx<=MaxX, and MinY<=MVy<=MaxY.

In some embodiments, MinX may be equal to MinY, or it may not be equal to MinY. In some embodiments, MaxX may be equal to MaxY, or it may not be equal to MaxY. In some embodiments, {MinX, MaxX} may depend on Px. In some embodiments, {MinY, MaxY} may depend on Py. In some embodiments, MinX, MaxX, MinY, MaxY} may depend on N. In some embodiments, {MinX, MaxX, MinY, MaxY} may be different for a MV stored for spatial motion prediction and a MV stored for temporal motion prediction.

In some embodiments, {MinX, MaxX, MinY, MaxY} may be different for different standard profiles/levels/tiers. In some embodiments, {MinX, MaxX, MinY, MaxY} may be different for pictures in different temporal layers. In some embodiments, {MinX, MaxX, MinY, MaxY} may be different for pictures with different width/height. In some embodiments, {MinX, MaxX, MinY, MaxY} may be signaled from the encoder to the decoder in VPS/SPS/PPS/slice header/tile group header/tile/CTU/CU. In some embodiments, {MinX, MaxX} may be different for pictures with different width. In some embodiments, {MinY, MaxY} may be different for pictures with different height. In some embodiments, MVx is clipped to [MinX, MaxX] before it is put into the storage for spatial motion prediction. In some embodiments, MVx is clipped to [MinX, MaxX] before it is put into the storage for temporal motion prediction. In some embodiments, MVy is clipped to [MinY, MaxY] before it is put into the storage for spatial motion prediction. In some embodiments, MVy is clipped to [MinY, MaxY] before it is put into the storage for temporal motion prediction.

Line Buffer Reduction for Affine Merge Mode

Example 43: The affine model (derived CPMVs or affine parameters) inherited by a affine merge candidate from a neighboring block is always a 6-parameter affine model.

In some embodiments, if the neighboring block is coded with the 4-parameter affine model, the affine model is still inherited as a 6-parameter affine model.

In some embodiments, whether the 4-parameter affine model from a neighboring block is inherited as a 6-parameter affine model or a 4-parameter affine model may depends the position of the current block. In some embodiments, the 4-parameter affine model from a neighboring block is inherited as a 6-parameter affine model if the neighboring block is not in the same Coding Tree Unit (CTU, a.k.a. Largest Coding Unit LCU) as the current block. In some embodiments, the 4-parameter affine model from a neighboring block is inherited as a 6-parameter affine model if the neighboring block is not in the same CTU line or CTU row as the current block. In some embodiments, the 4-parameter affine model from a neighboring block is inherited as a 6-parameter affine model if the neighboring block is not in the M×N region as the current block. For example, M=N=64. In this case, a tile/slice/picture is split to multiple un-overlapped M×N regions. In some embodiments, the 4-parameter affine model from a neighboring block is inherited as a 6-parameter affine model if the neighboring block is not in the same M×N region line or M×N region row as the current block. For example, M=N=64. CTU line/row and region line/row are depicted in FIG. 10.

In some embodiments, suppose the top-left corner (or any other position) of the current block is (x,y), the top-left corner (or any other position) of the neighboring block is (x', y'), then the 4-parameter affine model from a neighboring block is inherited as a 6-parameter affine model if the neighboring block satisfies one or more of the following conditions:

(a) x/M !=x'/M. For example, M=128 or 64.

(b) y/N !=y'/N. For example, N=128 or 64.

(c) ((x/M !=x'/M) && (y/N !=y'/N)). For example, M=N=128 or M=N=64.

(d) ((x/M !=x'/M)||(y/N !=y'/N)). For example, M=N=128 or M=N=64.

(e) x>>M !=x'>>M. For example, M=7 or 6.

(f) y>>N !=y'>>N. For example, N=7 or 6.

(g) ((x>>M !=x'>>M) && (y>>N !=y'>>N)). For example, M=N=7 or M=N=6.

(h) ((x>>M !=x'>>M)||(y>>N !=y'>>N)). For example, M=N=7 or M=N=6.

5. Embodiments

The description below shows an example of how the disclosed technology can be implemented within the syntax structure of the current VVC standard. New additions are indicated in bold, and deletions are indicated italics.

5.1 Embodiment #1 (Disabling 4×4 Inter Prediction, and Disabling Bi-Prediction for 4×8, 8×4, 4×16 and 16×4 Blocks)

7.3.6.6 Coding Unit Syntax

| | Descriptor |
|---|---|
| coding_unit( x0, y0, cbWidth, cbHeight, treeType ) { | |
|   if( tile_group_type != I | | sps_ibc_enabled_flag ) { | |
|     if( treeType != DUAL_TREE_CHROMA && !( cbWidth == 4 && cbHeight == 4 && !sps_ibc_enabled_flag ) ) | |
|       cu_skip_flag[ x0 ][ y0 ] | ae(v) |
|     if( cu_skip_flag[ x0 ][ y0 ] = = 0 && tile_group_type != I && !( cbWidth == 4 && cbHeight == 4 ) ) | |

-continued

| | Descriptor |
|---|---|
|     pred_mode_flag | ae(v) |
|     if( ( ( tile_group_type = = I && cu_skip_flag[ x0 ][ y0 ] = =0 ) \|\| | |
|       ( tile_group_type != I && CuPredMode[ x0 ][ y0 ] != MODE_INTRA ) ) && | |
|       sps_ibc_enabled_flag && !( cbWidth == 4 && cbHeight == 4 && cu_skip_flag[ x0 ][ y0 ] = = 1 ) ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \|\| treeType = = DUAL_TREE_LUMA ) { | |
|         if( ( y0 % CtbSizeY ) > 0 ) | |
|           intra_luma_ref_idx[ x0 ][ y0 ] | ae(v) |
|         if (intra_luma_ref_idx[ x0 ][ y0 ] = = 0 && | |
|           ( cbWidth <= MaxTbSizeY \|\| cbHeight <= MaxTbSizeY ) && | |
|           ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] = = 1 && | |
|           cbWidth <= MaxTbSizeY && cbHeight <= MaxTbSizeY ) | |
|           intra_subpartitions_split_flag[ x0 ][ y0 ] | ae(v) |
|         if( intra_luma_ref_idx[ x0 ][ y0 ] = = 0 && | |
|           intra_subpartitions_mode_flag[ x0 ][ y0 ] = = 0 ) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|       if( treeType = = SINGLE_TREE \|\| treeType = = DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER or MODE_IBC */ | |
|     if( cu_skip_flag[ x0 ][ y0 ] = = 0 ) | |
|       merge_flag[ x0 ][ y0 ] | ae(v) |
|     if( merge_flag[ x0 ][ y0 ] ) { | |
|       merge_data( x0, y0, cbWidth, cbHeight ) | |
|     } else if ( CuPredMode[ x0 ][ y0 ] = = MODE_IBC ) { | |
|       mvd_coding( x0, y0, 0, 0 ) | |
|       mvp_l0_flag[ x0 ][ y0 ] | ae(v) |
|       if( sps_amvr_enabled_flag && | |
|         ( MvdL0[ x0 ][ y0 ][ 0 ] != 0 \|\| MvdL0[ x0 ][ y0 ][ 1 ] != 0 ) ) { | |
|         amvr_precision_flag[ x0 ][ y0 ] | ae(v) |
|       } | |
|     } else { | |
|       if( tile_group_type = = B ) | |
|         inter_pred_idc[ x0 ][ y0 ] | ae(v) |
|       if( sps_affine_enabled_flag && cbWidth >= 16 && cbHeight >= 16 ) { | |
|         inter_affine_flag[ x0 ][ y0 ] | ae(v) |
|         if( sps_affine_type_flag && inter_affine_flag[ x0 ][ y0 ] ) | |
|           cu_affine_type_flag[ x0 ][ y0 ] | ae(v) |
|       } | |
| ... | |
| } | |

7.4.7.6 Coding Unit Semantics pred_mode_flag equal to 0 specifies that the current coding unit is coded in inter prediction mode. pred_mode_flag equal to 1 specifies that the current coding unit is coded in intra prediction mode. The variable CuPredMode[xfy] is derived as follows for x=x0 . . . x0+cbWidth−1 and y=y0 . . . y0+cbHeight−1:

If pred_mod_flag is equal to 0,CuPredMode[x][y] is set equal to MODE_INTER.

Otherwise (pred_mode_flag is equal to 1), CuPredMode[xf][y] is set equal to MODE_INTRA.

When pred_mode_flag is not present, it is inferred to be equal to 1 when decoding an I tile group or when decoding a coding unit with cb Width is equal to 4 and cb Height is equal to 4, and equal to 0 when decoding a P or B tile group, respectively.

pred_mode_ibc_flag equal to 1 specifies that the current coding unit is coded in IBC prediction mode. pred_mode_ibc_flag equal to 0 specifies that the current coding unit is not coded in IBC prediction mode.

When pred_mode_ibc_flag is not present, it is inferred to be equal to the value of sps_ibc_enabled_flag when decoding an I tile group or when decoding a coding unit coded in skip mode and cbWidth is equal to 4 and cbHeight is equal to 4, and 0 when decoding a P or B tile group, respectively.

When pred_mode_ibc_flag is equal to 1, the variable CuPredMode[x]I[y] is set to be equal to MODE_IBC for x=x0 . . . x0+cbWidth−1 and y=y0 . . . y0+cbHeight−1.

inter_pred_idc[x0][y0] specifies whether list0, list1, or bi-prediction is used for the current coding unit according to Table 7-9. The array indices x0, y0 specify the location (x0, y0) of the top-left luma sample of the considered coding block relative to the top-left luma sample of the picture.

TABLE 7-9

Name association to inter prediction mode

| inter_pred_idc | Name of inter_pred_idc | |
|---|---|---|
| | ( cbWidth + cbHeight ) != 8 | ( cbWidth + cbHeight ) == 8 \|\| ( cbWidth + cbHeight ) == 12 \|\| ( cbWidth + cbHeight ) == 20 |
| 0 | PRED_L0 | PRED_L0 |
| 1 | PRED_L1 | PRED_L1 |
| 2 | PRED_BI | n.a. |

When inter_pred_idc[x0][y0] is not present, it is inferred to be equal to PRED_L0.

8.5.2.1 General

Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.

Outputs of this process are:
  the luma motion vectors in 1/16 fractional-sample accuracy mvL0[0][0] and mvL1[0][0],
  the reference indices refIdxL0 and refIdxL1,
  the prediction list utilization flags predFlagL0[0][0] and predFlagL1[0][0],
  the bi-prediction weight index gbiIdx.

Let the variable LX be RefPicList[X], with X being 0 or 1, of the current picture.

For the derivation of the variables mvL0[0][0] and mvL1[0][0], refIdxL0 and refIdxL1, as well as predFlagL0[0][0] and predFlagL1[0][0], the following applies:

If merge_flag[xCb][yCb] is equal to 1, the derivation process for luma motion vectors for merge mode as specified in clause 8.5.2.2 is invoked with the luma location (xCb, yCb), the variables cbWidth and cbHeight inputs, and the output being the luma motion vectors mvL0[0][0], mvL1[0][0], the reference indices refIdxL0, refIdxL1, the prediction list utilization flags predFlagL0[0][0] and predFlagL1[0][0], and the bi-prediction weight index gbiIdx.

Otherwise, the following applies:

For X being replaced by either 0 or 1 in the variables predFlagLX[0][0], mvLX[0][0] and refIdxLX, in PRED_LX, and in the syntax elements ref_idx_lX and MvdLX, the following ordered steps apply:

1. The variables refIdxLX and predFlagLX[0][0] are derived as follows:

If inter_pred_idc[xCb][yCb] is equal to PRED_LX or PRED_BI, $$\text{refIdx}LX=\text{ref\_idx\_}lX[xCb][yCb] \quad (8\text{-}266)$$

$$\text{predFlag}LX[0][0]=1 \quad (8\text{-}267)$$

Otherwise, the variables refIdxLX and predFlagLX[0][0] are specified by:

$$\text{refIdx}LX=-1 \quad (8\text{-}268)$$

$$\text{predFlag}LX[0][0]=0 \quad (8\text{-}269)$$

2. The variable mvdLX is derived as follows:

$$mvdLX[0]=MvdLX[xCb][yCb][0] \quad (8\text{-}270)$$

$$mvdLX[1]=MvdLX[xCb][yCb][1] \quad (8\text{-}271)$$

3. When predFlagLX[0][0] is equal to 1, the derivation process for luma motion vector prediction in clause 8.5.2.8 is invoked with the luma coding block location (xCb, yCb), the coding block width cbWidth, the coding block height cbHeight and the variable refIdxLX as inputs, and the output being mvpLX.

4. When predFlagLX[0][0] is equal to 1, the luma motion vector mvLX[0][0] is derived as follows:

$$uLX[0]=(mvpLX[0]+mvdLX[0]+2^{18})\%\ 2^{18} \quad (8\text{-}272)$$

$$mvLX[0][0][0]=(uLX[0]>=2^{17})?(uLX[0]-2^{18}):uLX[0] \quad (8\text{-}273)$$

$$uLX[1]=(mvpLX[1]+mvdLX[1]+2^{18})\%\ 2^{18} \quad (8\text{-}274)$$

$$mvLX[0][0][1]=(uLX[1]>=2^{17})?(uLX[1]-2^{18}):uLX[1] \quad (8\text{-}275)$$

NOTE 1—The resulting values of mvLX[0][0][0] and mvLX[0][0][1] as specified above will always be in the range of $-2^{17}$ to $2^{17}-1$, inclusive.

The bi-prediction weight index gbiIdx is set equal to gbi_idx[xCb][yCb].

When all of the following conditions are true, refIdxL1 is set equal to −1, predFlagL1 is set equal to 0, and gbiIdx is set equal to 0:

predFlagL0[0][0] is equal to 1.
  predFlagL1[0][0] is equal to 1.
  (cbWidth+cbHeight==8)||(cbWidth+cbHeight==12)||(cbWidth+cbHeight==20)
  =cbWidth is equal to 4; cbHeight equal to 4.

The updating process for the history-based motion vector predictor list as specified in clause 8.5.2.16 is invoked with luma motion vectors mvL0[0][0] and mvL1[0][0], reference indices refIdxL0 and refIdxL1, prediction list utilization flags predFlagL0[0][0] and predFlagL1[0][0], and bi-prediction weight index gbiIdx.

9.5.3.8 Binarization Process for Inter_Pred_Idc

Input to this process is a request for a binarization for the syntax element inter_pred_idc, the current luma coding block width cbWidth and the current luma coding block height cbHeight.

Output of this process is the binarization of the syntax element.

The binarization for the syntax element inter_pred_idc is specified in Table 9-9.

TABLE 9-9

Binarization for inter_pred_idc

| | | Bin string | |
|---|---|---|---|
| Value of inter_pred_idc | Name of inter_pred_idc | ( cbWidth + cbHeight ) != 8 | ( cbWidth + cbHeight ) == 8 \|\| (cbWidth + cbHeight) == 12 \|\| (cbWidth + cbHeight) == 20 |
| 0 | PRED_L0 | 00 | 0 |
| 1 | PRED_L1 | 01 | 1 |
| 2 | PRED_BI | 1 | — |

9.5.4.2.1 General

TABLE 9-10

Assignment of ctxInc to syntax elements with context coded bins

| inter_pred_idc[ x0 ][ y0 ] | ( cbWidth + cbHeight ) != 8 && (cbWidth + cbHeight) != 12 && (cbWidth + cbHeight) != 20 ? 7 − ( ( 1 + Log2( cbWidth ) + Log2( cbHeight ) ) >> 1 ) : 4 | 4 | na | na | na | na |

5.2 Embodiment #2 (Disabling 4×4 Inter Prediction)

7.3.6.6 Coding Unit Syntax

| | Descriptor |
|---|---|
| coding_unit( x0, y0, cbWidth, cbHeight, treeType ) { | |
|   if( tile_group_type != I \|\| sps_ibc_enabled_flag ) { | |
|     if( treeType != DUAL_TREE_CHROMA && !( cbWidth == 4 && cbHeight == 4 && !sps_ibc_enabled_flag ) ) | |
|       cu_skip_flag[ x0 ][ y0 ] | ae(v) |
|     if( cu_skip_flag[ x0 ][ y0 ] == 0 && tile_group_type != I && !( cbWidth == 4 && cbHeight == 4 ) ) | |
|       pred_mode_flag | ae(v) |
|     if( ( ( tile_group_type == I && cu_skip_flag[ x0 ][ y0 ] ==0 ) \|\| | |
|     ( tile_group_type != I && CuPredMode[ x0 ][ y0 ] != MODE_INTRA ) ) && | |
|     sps_ibc_enabled_flag && !( cbWidth == 4 && cbHeight == 4 && cu_skip_flag[ x0 ][ y0 ] == 1 ) ) | |
|       pred_mode_ibc_flag | ae(v) |
|   } | |
|   if( CuPredMode[ x0 ][ y0 ] == MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType == SINGLE_TREE \|\| treeType == DUAL_TREE_LUMA ) { | |
|         if( ( y0 % CtbSizeY ) > 0 ) | |
|           intra_luma_ref_idx[ x0 ][ y0 ] | ae(v) |
|         if (intra_luma_ref_idx[ x0 ][ y0 ] == 0 && | |
|           ( cbWidth <= MaxTbSizeY \|\| cbHeight <= MaxTbSizeY ) && | |
|           ( cbWidth * cbHeight > MinTbSizeY * MinTbSizeY )) | |

|  | Descriptor |
|---|---|
| intra_subpartitions_mode_flag[ x0 ][ y0 ] | ae(v) |
| if( intra_subpartitions_mode_flag[ x0 ][ y0 ] = = 1 && | |
| cbWidth <= MaxTbSizeY && cbHeight <= MaxTbSizeY ) | |
| intra_subpartitions_split_flag[ x0 ][ y0 ] | ae(v) |
| if( intra_luma_ref_idx[ x0 ][ y0 ] = = 0 && | |
| intra_subpartitions_mode_flag[ x0 ][ y0 ] = = 0 ) | |
| intra_luma_mpm_flag[ x0 ][ y0 ] | ae(v) |
| if( intra_luma_mpm_flag[ x0 ][ y0 ] ) | |
| intra_luma_mpm_idx[ x0 ][ y0 ] | ae(v) |
| else | |
| intra_luma_mpm_remainder[ x0 ][ y0 ] | ae(v) |
| } | |
| if( treeType = = SINGLE_TREE | | treeType = = DUAL_TREE_CHROMA ) | |
| intra_chroma_pred_mode[ x0 ][ y0 ] | ae(v) |
| } | |
| } else if( treeType != DUAL_TREE_CHROMA ) { /* MODE_INTER or MODE_IBC */ | |
| if( cu_skip_flag[ x0 ][ y0 ] = = 0 ) | |
| merge_flag[ x0 ][ y0 ] | ae(v) |
| if( merge_flag[ x0 ][ y0 ] ) { | |
| merge_data( x0, y0, cbWidth, cbHeight ) | |
| } else if ( CuPredMode[ x0 ][ y0 ] = = MODE_IBC ) { | |
| mvd_coding( x0, y0, 0, 0 ) | |
| mvp_l0_flag[ x0 ][ y0 ] | ae(v) |
| if( sps_amvr_enabled_flag && | |
| ( MvdL0[ x0 ][ y0 ][ 0 ] != 0 | | MvdL0[ x0 ][ y0 ][ 1 ] != 0 ) ) { | |
| amvr_precision_flag[ x0 ][ y0 ] | ae(v) |
| } | |
| } else { | |
| if( tile_group_type = = B ) | |
| inter_pred_idc[ x0 ][ y0 ] | ae(v) |
| if( sps_affine_enabled_flag && cbWidth >= 16 && cbHeight >= 16 ) { | |
| inter_affine_flag[ x0 ][ y0 ] | ae(v) |
| if( sps_affine_type_flag && inter_affine_flag[ x0 ][ y0 ] ) | |
| cu_affine_type_flag[ x0 ][ y0 ] | ae(v) |
| } | |
| ... | |
| } | |

7.4.7.6 Coding Unit Semantics pred_mode_flag equal to 0 specifies that the current coding unit is coded in inter prediction mode. pred_mode_flag equal to 1 specifies that the current coding unit is coded in intra prediction mode. The variable CuPredMode[xfy] is derived as follows for x=x0 . . . x0+cbWidth−1 and y=y0 . . . y0+cbHeight−1:

If pred_mod_flag is equal to 0,CuPredMode[x][y] is set equal to MODE_INTER.

Otherwise (pred_mode_flag is equal to 1), CuPredMode[xf][y] is set equal to MODE_INTRA.

When pred_mode_flag is not present, it is inferred to be equal to 1 when decoding an I tile group or when decoding a coding unit with cbWidth is equal to 4 and cbHeight is equal to 4, and equal to 0 when decoding a P or B tile group, respectively.

pred_mode_ibc_flag equal to 1 specifies that the current coding unit is coded in IBC prediction mode. pred_mode_ibc_flag equal to 0 specifies that the current coding unit is not coded in IBC prediction mode.

When pred_mode_ibc_flag is not present, it is inferred to be equal to the value of sps_ibc_enabled_flag when decoding an I tile group or when decoding a coding unit coded in skip mode and cbWidth is equal to 4 and cbHeight is equal to 4, and 0 when decoding a P or B tile group, respectively.

When pred_mode_ibc_flag is equal to 1, the variable CuPredMode[x]I[y] is set to be equal to MODE_IBC for x=x0 . . . x0+cbWidth−1 and y=y0 . . . y0+cbHeight−1.

5.3 Embodiment #3 (Disabling Bi-Prediction for 4×8, 8×4, 4×16 and 16×4 Blocks)

7.4.7.6 Coding Unit Semantics inter_pred_idc[x0][y0] specifies whether list0, list1, or bi-prediction is used for the current coding unit according to Table 7-9. The array indices x0, y0 specify the location (x0, y0) of the top-left luma sample of the considered coding block relative to the top-left luma sample of the picture.

TABLE 7-9

| | | Name association to inter prediction mode | |
|---|---|---|---|
| | | Name of inter_pred_idc | |
| inter_pred_idc | ( cbWidth + cbHeight ) != 8 | ( cbWidth + cbHeight ) = = 8 | | ( cbWidth + cbHeight ) = = 12 | | ( cbWidth + cbHeight ) = = 20 |
| 0 | PRED_L0 | PRED_L0 |
| 1 | PRED_L1 | PRED_L1 |
| 2 | PRED_BI | n.a. |

When inter_pred_idc[x0][y0] is not present, it is inferred to be equal to PRED_L0.

8.5.2.1 General

Inputs to this process are:

a luma location (xCb, yCb) of the top-left sample of the current luma coding block relative to the top-left luma sample of the current picture, a variable cbWidth specifying the width of the current coding block in luma samples,
a variable cbHeight specifying the height of the current coding block in luma samples.
Outputs of this process are:
the luma motion vectors in 1/16 fractional-sample accuracy mvL0[0][0] and mvL1[0],[0]
the reference indices refIdxL0 and refIdxL1,
the prediction list utilization flags predFlagL0[0][0] and predFlagL1[0][0],
the bi-prediction weight index gbiIdx.
Let the variable LX be RefPicList[X], with X being 0 or 1, of the current picture.
For the derivation of the variables mvL0[0][0] and mvL1[0][0], refIdxL0 and refIdxL1, as well as predFlagL0[0][0] and predFlagL1[0][0], the following applies:
If merge_flag[xCb][yCb] is equal to 1, the derivation process for luma motion vectors for merge mode as specified in clause 8.5.2.2 is invoked with the luma location (xCb, yCb), the variables cbWidth and cbHeight inputs, and the output being the luma motion vectors mvL0[0][0], mvL1[0][0], the reference indices refIdxL0, refIdxL1, the prediction list utilization flags predFlagL0[0][0] and predFlagL1[0][0], and the bi-prediction weight index gbiIdx.
Otherwise, the following applies:
For X being replaced by either 0 or 1 in the variables predFlagLX[0][0], mvLX[0][0] and refIdxLX, in PRED_LX, and in the syntax elements ref_idx_lX and MvdLX, the following ordered steps apply:
5. The variables refIdxLX and predFlagLX[0][0] are derived as follows:
If inter_pred_idc[xCb][yCb] is equal to PRED_LX or PRED_BI, refIdx$LX$=ref_idx_$lX$[$xCb$][$yCb$]  (8-266)

predFlag$LX$[0][0]=1  (8-267)

Otherwise, the variables refIdxLX and predFlagLX[0][0] are specified by:

refIdx$LX$=−1  (8-268)

predFlag$LX$[0][0]=0  (8-269)

6. The variable mvdLX is derived as follows:

mvd$LX$[0]=Mvd$LX$[$xCb$][$yCb$][0]  (8-270)

mvd$LX$[1]=Mvd$LX$[$xCb$][$yCb$][1]  (8-271)

7. When predFlagLX[0][0] is equal to 1, the derivation process for luma motion vector prediction in clause 8.5.2.8 is invoked with the luma coding block location (xCb, yCb), the coding block width cbWidth, the coding block height cbHeight and the variable refIdxLX as inputs, and the output being mvpLX.
8. When predFlagLX[0][0] is equal to 1, the luma motion vector mvLX[0][0] is derived as follows:

$uLX[0]=(mvpLX[0]+mvdLX[0]+2^{18})\% \ 2^{18}$  (8-272)

$mvLX[0][0][0]=(uLX[0]>=2^{17})?(uLX[0]-2^{18}): uLX[0]$  (8-273)

$uLX[1]=(mvpLX[1]+mvdLX[1]+2^{18})\% \ 2^{18}$  (8-274)

$mvLX[0][0][1]=(uLX[1]>=2^{17})?(uLX[1]-2^{18}):uLX[1]$  (8-275)

NOTE 1—The resulting values of mvLX[0][0][0] and mvLX[0][0][1] as specified above will always be in the range of $-2^{17}$ to $2^{17}-1$, inclusive.
The bi-prediction weight index gbiIdx is set equal to gbi_idx[xCb][yCb].
When all of the following conditions are true, refIdxL1 is set equal to −1, predFlagL1 is set equal to 0, and gbiIdx is set equal to 0:
predFlagL0[0][0] is equal to 1.
predFlagL1[0][0] is equal to 1.
(cbWidth+cbHeight==8) II (cbWidth+cbHeight==12) II (cbWidth+cbHeight==20)
cbWidth is equal to 4; cbHeight equal to 4.
The updating process for the history-based motion vector predictor list as specified in clause 8.5.2.16 is invoked with luma motion vectors mvL0[0][0] and mvL1[0][0], reference indices refIdxL0 and refIdxL1, prediction list utilization flags predFlagL0[0][0] and predFlagL1[0][0], and bi-prediction weight index gbiIdx.

9.5.3.8 Binarization Process for Inter_Pred_Idc
Input to this process is a request for a binarization for the syntax element inter_pred_idc, the current luma coding block width cbWidth and the current luma coding block height cbHeight.
Output of this process is the binarization of the syntax element.
The binarization for the syntax element inter_pred_idc is specified in Table 9-9.

TABLE 9-9

Binarization for inter_pred_idc

| | | Bin string | |
|---|---|---|---|
| Value of inter_pred_idc | Name of inter_pred_idc | ( cbWidth + cbHeight ) != 8 | ( cbWidth + cbHeight ) = = 8 \|\| ( cbWidth + cbHeight ) = = 12 \|\| ( cbWidth + cbHeight ) = = 20 |
| 0 | PRED_L0 | 00 | 0 |
| 1 | PRED_L1 | 01 | 1 |
| 2 | PRED_BI | 1 | — |

9.5.4.2.1 General

TABLE 9-10

Assignment of ctxInc to syntax elements with context coded bins

| inter_pred_idc[ x0 ][ y0 ] | ( cbWidth + cbHeight ) != 8 && ( cbWidth + cbHeight ) != 12 && | 4 | na | na | na | na |

TABLE 9-10-continued

Assignment of ctxInc to syntax elements with context coded bins ( cbWidth + cbHeight ) != 20 ?
7 − ( ( 1 + Log2( cbWidth ) +
Log2( cbHeight ) ) >> 1 ) : 4

Embodiment #4 (Disabling 4×4 Inter Prediction, and Disabling Bi-Prediction for 4×8, 8×4 Blocks)

7.3.6.6 Coding Unit Syntax

|  | Descriptor |
|---|---|
| coding_unit( x0, y0, cbWidth, cbHeight, treeType ) { |  |
|   if( tile_group_type != I \|\| sps_ibc_enabled_flag ) { |  |
|     if( treeType != DUAL_TREE_CHROMA && !( cbWidth == 4 && cbHeight == 4 && !sps_ibc_enabled_flag ) ) |  |
|       cu_skip_flag[ x0 ][ y0 ] | ae(v) |
|     if( cu_skip_flag[ x0 ][ y0 ] == 0 && tile_group_type != I && !( cbWidth == 4 && cbHeight == 4 ) ) |  |
|       pred_mode_flag | ae(v) |
|     if( ( ( tile_group_type == I && cu_skip_flag[ x0 ][ y0 ] == 0 ) \|\| |  |
|       ( tile_group_type != I && CuPredMode[ x0 ][ y0 ] != MODE_INTRA ) ) && |  |
|     sps_ibc_enabled_flag && !( cbWidth == 4 && cbHeight == 4 && cu_skip_flag[ x0 ][ y0 ] == 1 ) ) |  |
|       pred_mode_ibc_flag | ae(v) |
|   } |  |
|   if( CuPredMode[ x0 ][ y0 ] == MODE_INTRA ) { |  |
|     if( sps_pcm_enabled_flag && |  |
|       cbWidth >= MinIpcmCbSizeY && cbWidth <= MaxIpcmCbSizeY && |  |
|       cbHeight >= MinIpcmCbSizeY && cbHeight <= MaxIpcmCbSizeY ) |  |
|       pcm_flag[ x0 ][ y0 ] | ae(v) |
|     if( pcm_flag[ x0 ][ y0 ] ) { |  |
|       while( !byte_aligned( ) ) |  |
|         pcm_alignment_zero_bit | f(1) |
|       pcm_sample( cbWidth, cbHeight, treeType) |  |
|     } else { |  |
|       if( treeType == SINGLE_TREE \|\| treeType == DUAL_TREE_LUMA ) { |  |
|         if( ( y0 % CtbSizeY ) > 0 ) |  |
|           intra_luma_ref_idx[ x0 ][ y0 ] | ae(v) |
|         if (intra_luma_ref_idx[ x0 ][ y0 ] == 0 && |  |
|           ( cbWidth <= MaxTbSizeY \|\| cbHeight <= MaxTbSizeY ) && |  |
|           ( cbWidth * cbHeight > MinTbSizeY * MinTbSizeY )) |  |
|           intra_subpartitions_mode_flag[ x0 ][ y0 ] | ae(v) |
|         if( intra_subpartitions_mode_flag[ x0 ][ y0 ] == 1 && |  |
|           cbWidth <= MaxTbSizeY && cbHeight <= MaxTbSizeY ) |  |
|           intra_subpartitions_split_flag[ x0 ][ y0 ] | ae(v) |
|         if( intra_luma_ref_idx[ x0 ][ y0 ] == 0 && |  |
|           intra_subpartitions_mode_flag[ x0 ][ y0 ] == 0 ) |  |
|           intra_luma_mpm_flag[ x0 ][ y0 ] | ae(v) |
|         if( intra_luma_mpm_flag[ x0 ][ y0 ] ) |  |
|           intra_luma_mpm_idx[ x0 ][ y0 ] | ae(v) |
|         else |  |
|           intra_luma_mpm_remainder[ x0 ][ y0 ] | ae(v) |
|       } |  |
|       if( treeType == SINGLE_TREE \|\| treeType == DUAL_TREE_CHROMA ) |  |
|         intra_chroma_pred_mode[ x0 ][ y0 ] | ae(v) |
|     } |  |
|   } else if( treeType != DUAL_TREE_CHROMA ) { /* MODE_INTER or MODE_IBC */ |  |
|     if( cu_skip_flag[ x0 ][ y0 ] == 0 ) |  |
|       merge_flag[ x0 ][ y0 ] | ae(v) |
|     if( merge_flag[ x0 ][ y0 ] ) { |  |
|       merge_data( x0, y0, cbWidth, cbHeight ) |  |
|     } else if ( CuPredMode[ x0 ][ y0 ] == MODE_IBC ) { |  |
|       mvd_coding( x0, y0, 0, 0 ) |  |
|       mvp_l0_flag[ x0 ][ y0 ] | ae(v) |
|       if( sps_amvr_enabled_flag && |  |
|         ( MvdL0[ x0 ][ y0 ][ 0 ] != 0 \|\| MvdL0[ x0 ][ y0 ][ 1 ] != 0 ) ) { |  |
|         amvr_precision_flag[ x0 ][ y0 ] | ae(v) |
|       } |  |

|  | Descriptor |
|---|---|
| ```
    } else {
        if( tile_group_type = = B )
            inter_pred_idc[ x0 ][ y0 ]
        if( sps_affine_enabled_flag && cbWidth >= 16 && cbHeight >=
16 ) {
            inter_affine_flag[ x0 ][ y0 ]
            if( sps_affine_type_flag && inter_affine_flag[ x0 ][ y0 ] )
                cu_affine_type_flag[ x0 ][ y0 ]
        }
...
}
``` | ae(v)<br><br>ae(v)<br><br>ae(v) |

7.4.7.6 Coding Unit Semantics pred_mode_flag equal to 0 specifies that the current coding unit is coded in inter prediction mode. pred_mode_flag equal to 1 specifies that the current coding unit is coded in intra prediction mode. The variable CuPredMode[xfy] is derived as follows for x=x0 . . . x0+cbWidth−1 and y=y0 . . . y0+cbHeight−1:

If pred_mod_flag is equal to 0,CuPredMode[x][y] is set equal to MODE_INTER.

Otherwise (pred_mode_flag is equal to 1), CuPredMode [x][y] is set equal to MODE_INTRA.

When pred_mode_flag is not present, it is inferred to be equal to 1 when decoding an I tile group or when decoding a coding unit with cbWidth is equal to 4 and cbHeight is equal to 4, and equal to 0 when decoding a P or B tile group, respectively.

pred_mode_ibc_flag equal to 1 specifies that the current coding unit is coded in IBC prediction mode. pred_mode_ibc_flag equal to 0 specifies that the current coding unit is not coded in IBC prediction mode.

When pred_mode_ibc_flag is not present, it is inferred to be equal to the value of sps_ibc_enabled_flag when decoding an I tile group or when decoding a coding unit coded in skip mode and cbWidth is equal to 4 and cbHeight is equal to 4, and 0 when decoding a P or B tile group, respectively. When pred_mode_ibc_flag is equal to 1, the variable CuPredMode[x][y] is set to be equal to MODE_IBC for x=x0 . . . x0+cbWidth−1 and y=y0 . . . y0+cbHeight−1.

inter_pred_idc[x0][y0] specifies whether list0, list1, or bi-prediction is used for the current coding unit according to Table 7-9. The array indices x0, y0 specify the location (x0, y0) of the top-left luma sample of the considered coding block relative to the top-left luma sample of the picture.

TABLE 7-9

Name association to inter prediction mode

| | Name of inter_pred_idc | |
|---|---|---|
| inter_pred_idc | ( cbWidth + cbHeight ) != 8 | ( cbWidth + cbHeight ) = = 8 \|\| ( cbWidth + cbHeight ) = = 12 |
| 0 | PRED_L0 | PRED_L0 |
| 1 | PRED_L1 | PRED_L1 |
| 2 | PRED_BI | n.a. |

When inter_pred_idc[x0][y0] is not present, it is inferred to be equal to PRED_L0.

8.5.2.1 General

Inputs to this process are:
- a luma location (xCb, yCb) of the top-left sample of the current luma coding block relative to the top-left luma sample of the current picture,
- a variable cbWidth specifying the width of the current coding block in luma samples,
- a variable cbHeight specifying the height of the current coding block in luma samples.

Outputs of this process are:
- the luma motion vectors in 1/16 fractional-sample accuracy mvL0[0][0] and mvL1[0],[0]
- the reference indices refIdxL0 and refIdxL1,
- the prediction list utilization flags predFlagL0[0][0] and predFlagL1[0][0],
- the bi-prediction weight index gbiIdx.

Let the variable LX be RefPicList[X], with X being 0 or 1, of the current picture.

For the derivation of the variables mvL0[0][0] and mvL1 [0][0], refIdxL0 and refIdxL1, as well as predFlagL0[0][0] and predFlagL1[0][0], the following applies:

If merge_flag[xCb][yCb] is equal to 1, the derivation process for luma motion vectors for merge mode as specified in clause 8.5.2.2 is invoked with the luma location (xCb, yCb), the variables cbWidth and cbHeight inputs, and the output being the luma motion vectors mvL0[0][0], mvL1[0][0], the reference indices refIdxL0, refIdxL1, the prediction list utilization flags predFlagL0[0][0] and predFlagL1[0][0], and the bi-prediction weight index gbiIdx.

Otherwise, the following applies:

For X being replaced by either 0 or 1 in the variables predFlagLX[0][0], mvLX[0][0] and refIdxLX, in PRED_LX, and in the syntax elements ref_idx_lX and MvdLX, the following ordered steps apply:

1. The variables refIdxLX and predFlagLX[0][0] are derived as follows:

If inter_pred_idc[xCb][yCb] is equal to PRED_LX or PRED_BI, $\text{refIdx}LX=\text{ref\_idx\_}lX[xCb][yCb]$ (8-266)

$\text{predFlag}LX[0][0]=1$ (8-267)

Otherwise, the variables refIdxLX and predFlagLX [0][0] are specified by:

$\text{refIdx}LX=-1$ (8-268)

$\text{predFlag}LX[0][0]=0$ (8-269)

2. The variable mvdLX is derived as follows:

$mvdLX[0]=MvdLX[xCb][yCb][0]$ (8-270)

$mvdLX[1]=MvdLX[xCb][yCb][1]$ (8-271)

3. When predFlagLX[0][0] is equal to 1, the derivation process for luma motion vector prediction in clause 8.5.2.8 is invoked with the luma coding block location (xCb, yCb), the coding block width cbWidth, the coding block height cbHeight and the variable refIdxLX as inputs, and the output being mvpLX.

4. When predFlagLX[0][0] is equal to 1, the luma motion vector mvLX[0][0] is derived as follows:

$$uLX[0]=(mvpLX[0]+mvdLX[0]+2^{18})\% \ 2^{18} \quad (8\text{-}272)$$

$$mvLX[0][0][0]=(uLX[0]>=2^{17})?(uLX[0]-2^{18}):uLX[0] \quad (8\text{-}273)$$

$$uLX[1]=(mvpLX[1]+mvdLX[1]+2^{18})\% \ 2^{18} \quad (8\text{-}274)$$

$$mvLX[0][0][1]=(uLX[1]>=2^{17})?(uLX[1]-2^{18}):uLX[1] \quad (8\text{-}275)$$

NOTE 1—The resulting values of mvLX[0][0][0] and mvLX[0][0][1] as specified above will always be in the range of $-2^{17}$ to $2^{17}-1$, inclusive.

The bi-prediction weight index gbiIdx is set equal to gbi_idx[xCb][yCb].

When all of the following conditions are true, refIdxL1 is set equal to −1, predFlagL1 is set equal to 0, and gbiIdx is set equal to 0:

predFlagL0[0][0] is equal to 1.
predFlagL1[0][0] is equal to 1.
(cbWidth+cbHeight==8)||(cbWidth+cbHeight==12)
cbWidth is equal to 4.
cbHeight is equal to 4.

The updating process for the history-based motion vector predictor list as specified in clause 8.5.2.16 is invoked with luma motion vectors mvL0[0][0] and mvL1[0][0], reference indices refIdxL0 and refIdxL1, prediction list utilization flags predFlagL0[0][0] and predFlagL1[0][0], and bi-prediction weight index gbiIdx.

9.5.3.8 Binarization Process for Inter_Pred_Idc

Input to this process is a request for a binarization for the syntax element inter_pred_idc, the current luma coding block width cbWidth and the current luma coding block height cbHeight.

Output of this process is the binarization of the syntax element.

The binarization for the syntax element inter_pred_idc is specified in Table 9-9.

TABLE 9-9

Binarization for inter_pred_idc

| | | Bin string | |
|---|---|---|---|
| Value of inter_pred_idc | Name of inter_pred_idc | ( cbWidth + cbHeight ) != 8 | ( cbWidth + cbHeight ) == 8 \|\| ( cbWidth + cbHeight ) == 12 |
| 0 | PRED_L0 | 00 | 0 |
| 1 | PRED_L1 | 01 | 1 |
| 2 | PRED_BI | 1 | — |

9.5.4.2.1 General

TABLE 9-10

Assignment of ctxInc to syntax elements with context coded bins

| inter_pred_idc[ x0 ][ y0 ] | ( cbWidth + cbHeight ) != 8 && ( cbWidth + cbHeight ) != 12 ? 7 − ( ( 1 + Log2( cbWidth ) + Log2( cbHeight ) ) >> 1 ) : 4 | 4 | na | na | na | na |
|---|---|---|---|---|---|---|

Embodiment #5 (Disabling 4×4 Inter Prediction, and Disabling Bi-Prediction for 4×8, 8×4 Blocks, Disable Shared Merge List for Regular Merge Mode)

7.3.6.6 Coding Unit Syntax

| | Descriptor |
|---|---|
| coding_unit( x0, y0, cbWidth, cbHeight, treeType ) { | |
|   if( tile_group_type != I \|\| sps_ibc_enabled_flag ) { | |
|     if( treeType != DUAL_TREE_CHROMA && !( cbWidth == 4 && cbHeight == 4 && !sps_ibc_enabled_flag ) ) | |
|       cu_skip_flag[ x0 ][ y0 ] | ae(v) |
|     if( cu_skip_flag[ x0 ][ y0 ] == 0 && tile_group_type != I && !( cbWidth == 4 && cbHeight == 4 ) ) | |
|       pred_mode_flag | ae(v) |
|     if( ( ( tile_group_type == I && cu_skip_flag[ x0 ][ y0 ] ==0 ) \|\| | |
|       ( tile_group_type != I && CuPredMode[ x0 ][ y0 ] != MODE_INTRA ) ) && | |
|       sps_ibc_enabled_flag && !( cbWidth == 4 && cbHeight == 4 && cu_skip_flag[ x0 ][ y0 ] == 1 ) ) | |
|       pred_mode_ibc_flag | ae(v) |
| } | |

|  | Descriptor |
|---|---|
| if( CuPredMode[ x0 ][ y0 ] = = MODE_INTRA ) { | |
|   if( sps_pcm_enabled_flag && | |
|     cbWidth >= MinIpcmCbSizeY && cbWidth <= MaxIpcmCbSizeY && | |
|     cbHeight >= MinIpcmCbSizeY && cbHeight <= MaxIpcmCbSizeY ) | |
|     pcm_flag[ x0 ][ y0 ] | ae(v) |
|   if( pcm_flag[ x0 ][ y0 ] ) { | |
|     while( !byte_aligned( ) ) | |
|       pcm_alignment_zero_bit | f(1) |
|     pcm_sample( cbWidth, cbHeight, treeType) | |
|   } else { | |
|     if( treeType = = SINGLE_TREE \| \| treeType = = DUAL_TREE_LUMA ) { | |
|       if( ( y0 % CtbSizeY ) > 0 ) | |
|         intra_luma_ref_idx[ x0 ][ y0 ] | ae(v) |
|       if (intra_luma_ref_idx[ x0 ][ y0 ] = = 0 && | |
|         ( cbWidth <= MaxTbSizeY \| \| cbHeight <= MaxTbSizeY ) && | |
|         ( cbWidth * cbHeight > MinTbSizeY * MinTbSizeY )) | |
|         intra_subpartitions_mode_flag[ x0 ][ y0 ] | ae(v) |
|       if( intra_subpartitions_mode_flag[ x0 ][ y0 ] = = 1 && | |
|         cbWidth <= MaxTbSizeY && cbHeight <= MaxTbSizeY ) | |
|         intra_subpartitions_split_flag[ x0 ][ y0 ] | ae(v) |
|       if( intra_luma_ref_idx[ x0 ][ y0 ] = = 0 && | |
|         intra_subpartitions_mode_flag[ x0 ][ y0 ] = = 0 ) | |
|         intra_luma_mpm_flag[ x0 ][ y0 ] | ae(v) |
|       if( intra_luma_mpm_flag[ x0 ][ y0 ] ) | |
|         intra_luma_mpm_idx[ x0 ][ y0 ] | ae(v) |
|       else | |
|         intra_luma_mpm_remainder[ x0 ][ y0 ] | ae(v) |
|     } | |
|     if( treeType = = SINGLE_TREE \| \| treeType = = DUAL_TREE_CHROMA ) | |
|       intra_chroma_pred_mode[ x0 ][ y0 ] | ae(v) |
|   } | |
| } else if( treeType != DUAL_TREE_CHROMA ) { /* MODE_INTER or MODE_IBC */ | |
|   if( cu_skip_flag[ x0 ][ y0 ] = = 0 ) | |
|     merge_flag[ x0 ][ y0 ] | ae(v) |
|   if( merge_flag[ x0 ][ y0 ] ) { | |
|     merge_data( x0, y0, cbWidth, cbHeight ) | |
|   } else if ( CuPredMode[ x0 ][ y0 ] = = MODE_IBC ) { | |
|     mvd_coding( x0, y0, 0, 0 ) | |
|     mvp_l0_flag[ x0 ][ y0 ] | ae(v) |
|     if( sps_amvr_enabled_flag && | |
|       ( MvdL0[ x0 ][ y0 ][ 0 ] != 0 \| \| MvdL0[ x0 ][ y0 ][ 1 ] != 0 ) ) { | |
|       amvr_precision_flag[ x0 ][ y0 ] | ae(v) |
|     } | |
|   } else { | |
|     if( tile_group_type = = B ) | |
|       inter_pred_idc[ x0 ][ y0 ] | ae(v) |
|     if( sps_affine_enabled_flag && cbWidth >= 16 && cbHeight >= 16 ) { | |
|       inter_affine_flag[ x0 ][ y0 ] | ae(v) |
|       if( sps_affine_type_flag && inter_affine_flag[ x0 ][ y0 ] ) | |
|         cu_affine_type_flag[ x0 ][ y0 ] | ae(v) |
|     } | |
| ... | |
| } | |

7.4.7.6 Coding Unit Semantics pred_mode_flag equal to 0 specifies that the current coding unit is coded in inter prediction mode. pred_mode_flag equal to 1 specifies that the current coding unit is coded in intra prediction mode. The variable CuPredMode[xfy] is derived as follows for x=x0 . . . x0+cbWidth−1 and y=y0 . . . y0+cbHeight−1:

If pred_mode_flag is equal to 0,CuPredMode[x][y] is set equal to MODE_INTER.

Otherwise (pred_mode_flag is equal to 1), CuPredMode[xf][y] is set equal to MODE_INTRA.

When pred_mode_flag is not present, it is inferred to be equal to 1 when decoding an I tile group or when decoding a coding unit with cbWidth is equal to 4 and cbHeight is equal to 4, and equal to 0 when decoding a P or B tile group, respectively.

pred_mode_ibc_flag equal to 1 specifies that the current coding unit is coded in IBC prediction mode. pred_mode_ibc_flag equal to 0 specifies that the current coding unit is not coded in IBC prediction mode.

When pred_mode_ibc_flag is not present, it is inferred to be equal to the value of sps_ibc_enabled_flag when decoding an I tile group or when decoding a coding unit coded in skip mode and cbWidth is equal to 4 and cbHeight is equal to 4, and 0 when decoding a P or B tile group, respectively.

When pred_mode_ibc_flag is equal to 1, the variable CuPredMode[x]I[y] is set to be equal to MODE_IBC for x=x0 . . . x0+cbWidth−1 and y=y0 . . . y0+cbHeight−1.

inter_pred_idc[x0][y0] specifies whether list0, list1, or bi-prediction is used for the current coding unit according to Table 7-9. The array indices x0, y0 specify the location (x0, y0) of the top-left luma sample of the considered coding block relative to the top-left luma sample of the picture.

TABLE 7-9

Name association to inter prediction mode

| | Name of inter_pred_idc | |
|---|---|---|
| inter_pred_idc | ( cbWidth + cbHeight ) != 8 | ( cbWidth + cbHeight ) == 8 \|\| ( cbWidth + cbHeight ) == 12 |
| 0 | PRED_L0 | PRED_L0 |
| 1 | PRED_L1 | PRED_L1 |
| 2 | PRED_BI | n.a. |

When inter_pred_idc[x0][y0] is not present, it is inferred to be equal to PRED_L0.

8.5.2.1 General
Inputs to this process are:
 a luma location (xCb, yCb) of the top-left sample of the current luma coding block relative to the top-left luma sample of the current picture,
 a variable cbWidth specifying the width of the current coding block in luma samples,
 a variable cbHeight specifying the height of the current coding block in luma samples.
Outputs of this process are:
 the luma motion vectors in 1/16 fractional-sample accuracy mvL0[0][0] and mvL1[0],[0]
 the reference indices refIdxL0 and refIdxL1,
 the prediction list utilization flags predFlagL0[0][0] and predFlagL1[0][0],
 the bi-prediction weight index gbiIdx.
Let the variable LX be RefPicList[X], with X being 0 or 1, of the current picture.
For the derivation of the variables mvL0[0][0] and mvL1[0][0], refIdxL0 and refIdxL1, as well as predFlagL0[0][0] and predFlagL1[0][0], the following applies:
 If merge_flag[xCb][yCb] is equal to 1, the derivation process for luma motion vectors for merge mode as specified in clause 8.5.2.2 is invoked with the luma location (xCb, yCb), the variables cbWidth and cbHeight inputs, and the output being the luma motion vectors mvL0[0][0], mvL1[0][0], the reference indices refIdxL0, refIdxL1, the prediction list utilization flags predFlagL0[0][0] and predFlagL1[0][0], and the bi-prediction weight index gbiIdx.
 Otherwise, the following applies:
  For X being replaced by either 0 or 1 in the variables predFlagLX[0][0], mvLX[0][0] and refIdxLX, in PRED_LX, and in the syntax elements ref_idx_lX and MvdLX, the following ordered steps apply:
   5. The variables refIdxLX and predFlagLX[0][0] are derived as follows:
    If inter_pred_idc[xCb][yCb] is equal to PRED_LX or PRED_BI, $$refIdxLX=ref\_idx\_lX[xCb][yCb] \qquad (8\text{-}266)$$

$$predFlagLX[0][0]=1 \qquad (8\text{-}267)$$

Otherwise, the variables refIdxLX and predFlagLX[0][0] are specified by:

$$refIdxLX=-1 \qquad (8\text{-}268)$$

$$predFlagLX[0][0]=0 \qquad (8\text{-}269)$$

6. The variable mvdLX is derived as follows:

$$mvdLX[0]=MvdLX[xCb][yCb][0] \qquad (8\text{-}270)$$

$$mvdLX[1]=MvdLX[xCb][yCb][1] \qquad (8\text{-}271)$$

7. When predFlagLX[0][0] is equal to 1, the derivation process for luma motion vector prediction in clause 8.5.2.8 is invoked with the luma coding block location (xCb, yCb), the coding block width cbWidth, the coding block height cbHeight and the variable refIdxLX as inputs, and the output being mvpLX.
8. When predFlagLX[0][0] is equal to 1, the luma motion vector mvLX[0][0] is derived as follows:

$$uLX[0]=(mvpLX[0]+mvdLX[0]+2^{18})\% \ 2^{18} \qquad (8\text{-}272)$$

$$mvLX[0][0][0]=(uLX[0]>=2^{17})?(uLX[0]-2^{18}):uLX[0] \qquad (8\text{-}273)$$

$$uLX[1]=(mvpLX[1]+mvdLX[1]+2^{18})\% \ 2^{18} \qquad (8\text{-}274)$$

$$mvLX[0][0][1]=(uLX[1]>=2^{17})?(uLX[1]-2^{18}):uLX[1] \qquad (8\text{-}275)$$

NOTE 1—The resulting values of mvLX[0][0][0] and mvLX[0][0][1] as specified above will always be in the range of $-2^{17}$ to $2^{17}-1$, inclusive.

The bi-prediction weight index gbiIdx is set equal to gbi_idx[xCb][yCb].
When all of the following conditions are true, refIdxL1 is set equal to −1, predFlagL1 is set equal to 0, and gbiIdx is set equal to 0:
 predFlagL0[0][0] is equal to 1.
 predFlagL1[0][0] is equal to 1.
 (cbWidth+cbHeight==8)||(cbWidth+cbHeight==12)
 cbWidth is equal to 4.
 cbHeight is equal to 4.
The updating process for the history-based motion vector predictor list as specified in clause 8.5.2.16 is invoked with luma motion vectors mvL0[0][0] and mvL1[0][0], reference indices refIdxL0 and refIdxL1, prediction list utilization flags predFlagL0[0][0] and predFlagL1[0][0], and bi-prediction weight index gbiIdx.

8.5.2.2 Derivation Process for Luma Motion Vectors for Merge Mode

This process is only invoked when merge_flag[xCb][yPb] is equal to 1, where (xCb, yCb) specify the top-left sample of the current luma coding block relative to the top-left luma sample of the current picture.
Inputs to this process are:
 a luma location (xCb, yCb) of the top-left sample of the current luma coding block relative to the top-left luma sample of the current picture,
 a variable cbWidth specifying the width of the current coding block in luma samples,
 a variable cbHeight specifying the height of the current coding block in luma samples.
Outputs of this process are:
 the luma motion vectors in 1/16 fractional-sample accuracy mvL0[0][0] and mvL1[0][0],
 the reference indices refIdxL0 and refIdxL1,
 the prediction list utilization flags predFlagL0[0][0] and predFlagL1[0][0],
 the bi-prediction weight index gbiIdx.
The bi-prediction weight index gbiIdx is set equal to 0.
The variables xSmr, ySmr, smrWidth, smrHeight, and smrNumHmvpCand are derived as follows:

$$xSmr=IsInSmr[xCb][yCb]?SmrX[xCb][yCb]:xCb \qquad (8\text{-}276)$$

$$ySmr=IsInSmr[xCb][yCb]?SmrY[xCb][yCb]:yCb \qquad (8\text{-}277)$$

smrWidth=IsInSmr[xCb][yCb]?SmrW[xCb][yCb]cb-
Width     (8-278)

smrHeight=IsInSmr[xCb][yCb]?SmrH[xCb][yCb]
cbHeight     (8-279)

smrNumHmvpCand=IsInSmr[xCb][yCb]
?NumHmvpSmrCand: NumHmvpCand     (8-280)

8.5.2.6 Derivation Process for History-Based Merging Candidates

Inputs to this process are:
a merge candidate list mergeCandList,
a variable isInSmr specifying whether the current coding unit is inside a shared merging candidate region,
the number of available merging candidates in the list numCurrMergeCand.

Outputs to this process are:
the modified merging candidate list mergeCandList,
the modified number of merging candidates in the list numCurrMergeCand.

The variables isPrunedA$_1$ and isPrunedB$_1$ are both set equal to FALSE.
The array smrHmvpCandList and the variable smrNumHmvpCand are derived as follows:

smrHmvpCandList=isInSmr?HmvpSmrCandList:
HmvpCandList     (8-353)

smrNumHmvpCand=isInSmr?NumHmvpSmrCand:
NumHmvpCand     (8-354)

For each candidate in smrHmvpCandList[hMvpIdx] with index hMvpIdx=1 . . . smrNumHmvpCand, the following ordered steps are repeated until numCurrMergeCand is equal to (MaxNumMergeCand−1):

1. The variable sameMotion is derived as follows:
    If all of the following conditions are true for any merging candidate N with N being A$_1$ or B$_1$, sameMotion and isPrunedN are both set equal to TRUE:
        hMvpIdx is less than or equal to 2.
        The candidate smrHmvpCandList[smrNumHmvpCand−hMvpIdx] is equal to the merging candidate N.
        isPrunedN is equal to FALSE.
    Otherwise, sameMotion is set equal to FALSE.

2. When sameMotion is equal to FALSE, the candidate smrHmvpCandList[smrNumHmvpCand−hMvpIdx] is added to the merging candidate list as follows:

mergeCandList[numCurrMergeCand++]smrHmvp-
CandList[smrNumHmvpCand −hMvpIdx]     (8-355)

9.5.3.8 Binarization Process for Inter_Pred_Idc

Input to this process is a request for a binarization for the syntax element inter_pred_idc, the current luma coding block width cbWidth and the current luma coding block height cbHeight.

Output of this process is the binarization of the syntax element.

The binarization for the syntax element inter_pred_idc is specified in Table 9-9.

TABLE 9-9

| | | Binarization for inter_pred_idc | |
|---|---|---|---|
| | | | Bin string |
| Value of inter_pred_idc | Name of inter_pred_idc | ( cbWidth + cbHeight ) != 8 | ( cbWidth + cbHeight ) = = 8 \|\| ( cbWidth + cbHeight ) = = 12 |
| 0 | PRED_L0 | 00 | 0 |
| 1 | PRED_L1 | 01 | 1 |
| 2 | PRED_BI | 1 | — |

9.5.4.2.1 General

TABLE 9-10

| Assignment of ctxInc to syntax elements with context coded bins | | | | | |
|---|---|---|---|---|---|
| inter_pred_idc[ x0 ][ y0 ] | ( cbWidth + cbHeight ) != 8 && ( cbWidth + cbHeight ) != 12 ? 7 − ( ( 1 + Log2( cbWidth ) + Log2( cbHeight ) ) >> 1 ) : 4 | 4 na | na | na | na |

FIG. 11 is a block diagram of a video processing apparatus 1100. The apparatus 1100 may be used to implement one or more of the methods described herein. The apparatus 1100 may be embodied in a smartphone, tablet, computer, Internet of Things (IoT) receiver, and so on. The apparatus 1100 may include one or more processors 1102, one or more memories 1104 and video processing hardware 1106. The processor(s) 1102 may be configured to implement one or more methods described in the present document. The memory (memories) 1104 may be used for storing data and code used for implementing the methods and techniques described herein. The video processing hardware 1106 may be used to implement, in hardware circuitry, some techniques described in the present document.

Figure 12:
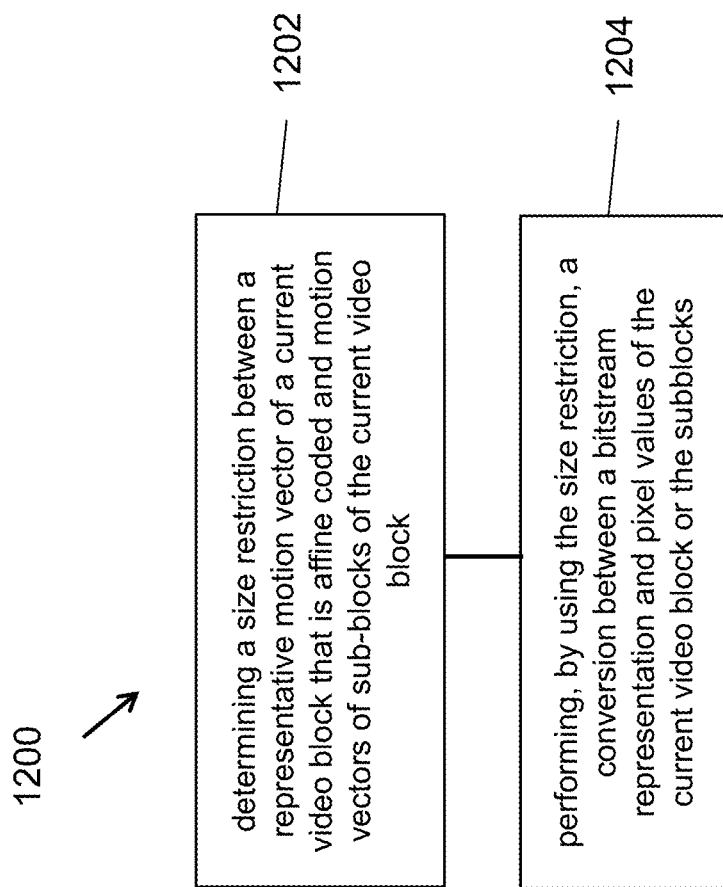
FIG. 12 is a flowchart for an example method of video processing.

FIG. 12 is a flowchart for an example method 1200 of video processing. The method 1200 includes determining (1202) a size restriction between a representative motion vector of a current video block that is affine coded and motion vectors of sub-blocks of the current video block and performing (1204), by using the size restriction, a conversion between a bitstream representation and pixel values of the current video block or the subblocks.

In the present document, the term "video processing" may refer to video encoding, video decoding, video compression or video decompression. For example video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that the disclosed techniques are useful to implement embodiments in which implementation complexity of the video processing is reduced by reduced memory requirements or line buffer size requirements. Some presently disclosed techniques may be described using the following clause-based description.

1. A method of video processing, comprising:
  determining a size restriction between a representative motion vector of a current video block that is affine coded and motion vectors of sub-blocks of the current video block; and
  performing, by using the size restriction, a conversion between a bitstream representation and pixel values of the current video block or the subblocks.

2. The method of clause 1, wherein the performing the conversion includes generating the bitstream representation from the pixel values.

3. The method of clause 1, wherein the performing the conversion includes generating the pixel values from the bitstream representation.

4. The method of any of clauses 1 to 3, wherein the size restriction comprises constraining values of motion vectors (MVx, MVy) of a sub-block according to: MVx>=MV'x-DH0 and MVx<=MV'x+DH1 and MVy>=MV'y-DV0 and MVy<=MV'y+DV1, where MV'=(MV'x, MV'y);
  wherein MV' represents the representative motion vector; and wherein DH0, DH1, DV0 and DV1 represent positive numbers.

5. The method of clause 4, wherein the size restriction includes at least one of the following:
  i. DH0 is equal to DH1 or DV0 is equal to DV1
  ii. DH0 is equal to DV0 or DH1 is equal to DV1
  iii. DH0 and DH1 are different or DV0 and DV1 are different
  iv. DH0, DH1, DV0 and DV1 are signaled in the bitstream representation at a video parameter set level or a sequence parameter set level or a picture parameter set level or a slice header level or a tile group header level or a tile level or a coding tree unit level or a coding unit level or a prediction unit level
  v. DH0, DH1, DV0 and DV1 are a function of a mode of the video processing
  vi. DH0, DH1, DV0 and DV1 depend on a width and a height of the current video block
  vii. DH0, DH1, DV0 and DV1 depend on whether the current video block is coded using uni-prediction or bi-prediction
  viii. DH0, DH1, DV0 and DV1 depend on a position of the sub-block.

6. The method of any of clauses 1 to 5, wherein the representative motion vector corresponds to a control point motion vector of the current video block.

7. The method of any of clauses 1 to 5, wherein the representative motion vector corresponds to a motion vector for a corner sub-block of the current video block.

8. The method of any of clauses 1 to 7, wherein a precision used for the motion vectors of the sub-blocks and the representative motion vector corresponds to motion vector signaling precision in the bitstream representation.

9. The method of any of clauses 1 to 7, wherein a precision used for the motion vectors of the sub-blocks and the representative motion vector corresponds to a storage precision for storing the motion vectors.

10. A method of video processing, comprising:
  determining for a current video block that is affine coded, one or more sub-blocks of the current video block, wherein each sub-block has a size of M×N pixels, where M and N are multiples of 2 or 4;
  conforming motion vectors of the sub-blocks to a size restriction; and
  performing, conditionally based on a trigger, by using the size restriction, a conversion between a bitstream representation and pixel values of the current video block.

11. The method of clause 10, wherein the performing the conversion includes generating the bitstream representation from the pixel values.

12. The method of clause 10, wherein the performing the conversion includes generating the pixel values from the bitstream representation.

13. The method of any of clauses 10 to 12, wherein the size restriction limits a maximum difference between integer parts of sub-block motion vectors of the current video block is less than or equal to K pixels, where K is an integer.

14. The method of any of clauses 10-13, wherein method is applied only in cases where the current video block is coded using bi-prediction.

15. The method of any of clauses 10-13, wherein method is applied only in cases where the current video block is coded using uni-prediction.

16. The method of any of clauses 10-13, wherein values of M, N or K are a function of uni-prediction or bi-prediction mode of the current video block.

17. The method of any of clauses 10-13, wherein values of M, N or K are a function of a height or a width of the current video block.

18. The method of any of clauses 10 to 17, wherein the trigger is included in the bitstream representation at a video parameter set level or a sequence parameter set level or a picture parameter set level or a slice header level or a tile group header level or a tile level or a coding tree unit level or a coding unit level or a prediction unit level.

19. The method of clause 18, wherein the trigger signals values of M, N or K.

20. The method of any of clauses 10 to 19, wherein the one or more sub-blocks of the current video block are calculated based on a type of affine coding used for the current video block.

21. The method of clause 20, wherein two different methods are used for calculating sub-blocks of uni-prediction and bi-prediction affine prediction modes.

22. The method of clause 21, wherein, in case that the current video block is a bi-predicted affine block, widths or heights of sub-blocks from different reference lists are different.

23. The method of any of clauses 20-22, wherein the one or more sub-blocks correspond to luma component.

24. The method of any of clauses 10 to 23, wherein a width and a height of one of the one or more sub-blocks is determined using a motion vector difference between motion vector values of the current video block and that of the one of the one or more sub-blocks.

25. The method of any of clauses 20 to 23, wherein the calculating is based on a pixel precision signaled in the bitstream representation.

26. A method of video processing, comprising:
  determining that a current video block satisfies a size condition; and performing, based on the determining, a conversion between a bitstream representation and pixel values of the current video block by excluding bi-prediction encoding mode for the current video block.

27. A method of video processing, comprising:
determining that a current video block satisfies a size condition; and
performing, based on the determining, a conversion between a bitstream representation and pixel values of the current video block wherein an inter prediction mode is signaled in the bitstream representation according to the size condition.

28. A method of video processing, comprising:
determining that a current video block satisfies a size condition; and
performing, based on the determining, a conversion between a bitstream representation and pixel values of the current video block wherein a generation of merge candidate list during the conversion is dependent on the size condition.

29. A method of video processing, comprising:
determining that a child coding unit of a current video block satisfies a size condition; and
performing, based on the determining, a conversion between a bitstream representation and pixel values of the current video block, wherein a coding tree splitting process used to generate the child coding unit is dependent on the size condition.

30. The method of any of clauses 26 to 29, wherein the size condition is one of the following, where w is a width and h is a height:
(a) w is equal to T1 and h is equal to T2, or h is equal to T1 and w is equal to T2;
(b) w is equal to T1 and h is not greater than T2, or h is equal to T1 and w is not greater than T2;
(c) w is not greater than T1 and h is not greater than T2, or h is not greater than T1 and w is not greater than T2.

31. The method of clause 30, wherein T1=8 and T2=8 or T1=8, T2=4, or T1=4 and T2=4, or T1=4 and T2=16.

32. The method of any of clauses 26 to 29 wherein the conversion includes generating the bitstream representation from pixel values of the current video block or generating pixel values of the current video block from the bitstream representation.

33. A method of video processing, comprising:
determining, a weight index for a generalized bi-prediction (GBi) process for a current video block based on a position of the current video block; and
performing a conversion between the current video block and a bitstream representation thereof using the weight index to implement the GBi process.

34. The method of any clause 33, wherein the conversion includes generating the bitstream representation from pixel values of the current video block or generating pixel values of the current video block from the bitstream representation.

35. The method of any of clauses 33 or 34, wherein the determining includes, for the current video block in a first position, inheriting or predicting another weight index of a neighboring block, and for the current video block in a second position, calculating the GBI without inheriting from the neighboring block.

36. The method of clause 35, wherein the second position comprises the current video block located in a different coding tree unit than the neighboring block.

37. The method of clause 35, wherein the second position corresponds to the current video block being in a different coding tree unit line or a different coding tree unit row than the neighboring block.

38. A method of video processing, comprising:
determining that a current video block is coded as an intra-inter prediction (IIP) coded block; and
performing a conversion between the current video block and a bitstream representation thereof using a simplification rule for determining an intra-prediction mode or a most probable mode (MPM) for the current video block.

39. The method of clause 38, wherein the conversion includes generating the bitstream representation from pixel values of the current video block or generating pixel values of the current video block from the bitstream representation.

40. The method of any of clauses 38-39, wherein the simplification rule specifies determining an intra-prediction coding mode of a current video block that is intra-inter prediction (IIP) coded to be independent from another intra-prediction coding mode of a neighboring video block.

41. The method of any of clauses 38 to 39, wherein the intra-prediction coding mode is represented in the bitstream representation using a coding that is independent of that of neighboring blocks.

42. The method of any of clauses 38 to 40, wherein the simplification rule specifies to prioritize selection to favor coding mode of an intra-coded block over that of an intra-prediction coded block.

43. The method of clause 38, wherein the simplification rule specifies the determining the MPM by inserting intra prediction modes from intra-coded neighboring blocks before inserting intra prediction modes from IIP coded neighboring blocks.

44. The method of clause 38, wherein the simplification rule specifies to use a same construction process for the determining the MPM as used for another normal intra-coded block.

45. A method of video processing, comprising:
determining that a current video block meets a simplification criterion; and
performing a conversion between the current video block and a bitstream representation by disabling use of inter-intra prediction mode for the conversion or by disabling additional coding tools used for the conversion.

46. The method of clause 45, wherein the conversion includes generating the bitstream representation from pixel values of the current video block or generating pixel values of the current video block from the bitstream representation.

47. The method of any of clauses 45-46, wherein the simplification criterion includes that a width or a height of the current video block is equal to T1, where T1 is an integer.

48. The method of any of clauses 45-46, wherein the simplification criterion includes that a width or a height of the current video block is greater than T1, where T1 is an integer.

49. The method of any of clauses 45-46, wherein the simplification criterion includes that a width of the current video block is equal to T1 and a height of the current video block is equal to T2.

48. The method of any of clauses 45-46, wherein the simplification criterion specifies that the current video block uses a bi-prediction mode.

49. The method of any of clauses 45-46, wherein the additional coding tools include bi-directional optical flow (BIG) coding.

50. The method of any of clauses 45-46, wherein the additional coding tools include overlapped block motion compensation mode.

51. A method of video processing, comprising:
performing a conversion between a current video block and a bitstream representation for the current video block using a motion vector based encoding process, wherein:
(a) a precision P1 is used for storing spatial motion prediction results and a precision P2 is used for storing temporal motion prediction results during the conversion process, wherein P1 and P2 are fractional numbers, or
(b) a precision Px is used for storing x-motion vectors and a precision Py is used for storing y-motion vectors, wherein Px and Py are fractional numbers.

52. The method of clause 51, wherein P1, P2, Px and Py are different numbers.

53. The method of clause 52, wherein:
P1 is 1/16 luma pixel and P2 is 1/4 luma pixel, or
P1 is 1/16 luma pixel and P2 is 1/8 luma pixel, or
P1 is 1/8 luma pixel and P2 is 1/4 luma pixel, or
P1 is 1/8 luma pixel and P2 is 1/8 luma pixel, or
P2 is 1/16 luma pixel and P1 is 1/4 luma pixel, or
P2 is 1/16 luma pixel and P1 is 1/8 luma pixel, or
P2 is 1/8 luma pixel and P1 is 1/4 luma pixel.

54. The method of clauses 51-52, wherein P1 and P2 are different for different pictures in different temporal layers that are included in the bitstream representation.

55. The method of clauses 51-52, wherein a computed motion vector is processed through a precision correction process prior to storing as the temporal motion prediction.

56. The method of clauses 51-52, wherein the storing includes storing the x-motion vectors and the y-motion vectors as an N bit integer, and wherein a range of values of x-motion vectors is [MinX, MaxX] and a range of values of y-motion vectors is [MinY, MaxY], wherein the ranges satisfy one or more of:
a. MinX is equal to MinY,
b. MaxX is equal to MaxY,
c. {MinX, MaxX} depend on Px;
d. {MinY, MaxY} depend on Py;
e. {MinX, MaxX, MinY, MaxY} depend on N.
f. {MinX, MaxX, MinY, MaxY} are different for an MV stored for spatial motion prediction and another MV stored for temporal motion prediction.
g. {MinX, MaxX, MinY, MaxY} are different for pictures in different temporal layers.
h. {MinX, MaxX, MinY, MaxY} are different for pictures with different widths or heights.
i. {MinX, MaxX} are different for pictures with different width.
j. {MinY, MaxY} are different for pictures with different height.
k. MVx is clipped to [MinX, MaxX] prior to storing for spatial motion prediction.
l. MVx is clipped to [MinX, MaxX] prior to storing for temporal motion prediction.
m. MVy is clipped to [MinY, MaxY] prior to storing for spatial motion prediction.
n. MVy is clipped to [MinY, MaxY] prior to storing for temporal motion prediction.

59. A method of video processing, comprising: interpolating, a small sub-block of W1×H1 size within a large sub-block of W2×H2 size of a current video block by fetching a (W2+N−1−PW)*(H2+N−1−PH) block, pixel padding the fetched block, performing boundary pixel repeating on the pixel padded block and obtaining pixel values of the small sub-block, wherein W1, W2, H1, H2, and PW and PH are integers; and performing a conversion between the current video block and a bitstream representation of the current video block using the interpolated pixel values of the small sub-block.

60. The method of clause 59, wherein the conversion includes generating the current video block from the bitstream representation or generating the bitstream representation from the current sub-block.

61. The method of any of clauses 59-60, wherein W2=H2=8, W1=H1=4 and PW=PH=0.

62. A method of video processing, comprising:
performing, during a conversion of a current video block of W×H dimension and a bitstream representation of the current video block, a motion compensation operation by fetching (W+N−1−PW)*(W+N−1−PH) reference pixels and padding reference pixels outsize the fetched reference pixels during the motion compensation operation; and
performing a conversion between the current video block and a bitstream representation of the current video block using a result of the motion compensation operation, wherein W, H, N, PW and PH are integers.

63. The method of clause 62, wherein the conversion includes generating the current video block from the bitstream representation or generating the bitstream representation from the current sub-block.

64. The method of any of clauses 62-63, wherein the padding includes repeating left or right boundaries of the fetched pixels.

65. The method of any of clauses 62-63, wherein the padding includes repeating top or bottom boundaries of the fetched pixels.

66. The method of any of clauses 62-63, wherein the padding includes setting pixel values to a constant.

67. The method of clause 38, wherein the rule specifies that a same arithmetic coding context is used during the conversion as used for other intra-coded blocks.

68. The method of clause 38, wherein the conversion of the current video block excludes using the MPM for the current video block.

69. The method of clause 38, wherein the simplification rule specifies to use only DC and planar mode for the bitstream representation of the current video block that is the IP coded block.

70. The method of clause 38, wherein the simplification rule specifies different intra-prediction modes for luma and chroma components.

71. The method of clause 44, wherein a subset of the MPMs are used for the current video block that is IIP coded.

72. The method of clause 38, wherein the simplification rule indicates that the MPM is selected based on an intra prediction mode included in a MPM list.

73. The method of clause 38, wherein the simplification rule indicates that a subset of MPMs are to be selected from a MPM list, and to signal a mode index associated with the subset.

74. The method of clause 38, wherein a context used for coding intra MPM modes are used for coding intra mode for the current video block that is IIP coded.

75. The method of clause 44, wherein equal weights are used for an intra-prediction block and an inter-prediction block that are generated for the current video block, the current video block being an IIP coded block.

76. The method of clause 44, wherein zero weights are used for positions in an IIP coding process for the current video block.

77. The method of clause 77, wherein the zero weights are applied to an intra prediction block used in the IIP coding process.

78. The method of clause 77, wherein the zero weights are applied to an inter prediction block used in the IIP coding process.

79. A method of video processing, comprising:
determining, based on a size of a current video block, that bi-prediction or uni-prediction of the current video block is disallowed; and
performing, based on the determining, a conversion between a bitstream representation and pixel values of the current video block by disabling bi-prediction or uni-prediction mode. For example, disallowed modes are not used either for encoding or decoding the current video block. The conversion operation may represent either video coding or compression, or video decoding or decompression.

80. The method of clause 79, wherein the current video block is 4×8, and determining includes determining that bi-prediction is disallowed. Other examples are given in Example 5.

81. The method of clause 79, wherein the current video block is 4×8 or 8×4, and determining includes determining that bi-prediction is disallowed.

82. The method of clause 79, wherein the current video block is 4×N, where N is an integer<=16, and determining includes determining that bi-prediction is disallowed.

83. The method of any of clauses 26-29 or 79-82, wherein the size of the current block corresponds to on a size of a color component or a luma component of the current block.

84. The method of clause 83, wherein the disabling bi-prediction or uni-prediction is applied to all three components of the current video block.

85. The method of clause 83, wherein the disabling bi-prediction or uni-prediction is applied only to a color component whose size is used as the size of the current block.

86. The method of any of clauses 79 to 85, wherein the conversion is performed by disabling bi-prediction and further using a merge candidate that is bi-predicted, then assigning only one motion vector from only one reference list to the current video block.

87. The method of clause 79, wherein the current video block is 4×4, and determining includes determining that both bi-prediction and uni-prediction are disallowed.

88. The method of clause 87, wherein the current video block is coded as an intra-block.

89. The method of clause 87, wherein the current video block is restricted to using integer pixel motion vectors.

Additional examples and embodiments for clauses 78-89 are described in Example 5.

90. A method of processing video, comprising:
determining, based on a size of a current video block, a video coding condition for the current video block; and
performing, based on the video coding condition, a conversion between the current video block and a bitstream representation of the current video block.

91. The method of clause 90, wherein the video coding condition specifies selectively signaling a skip flag or an intra block coding flag in the bitstream representation.

92. The method of clause 90 or 91, wherein the video coding condition specifies selectively signaling a prediction mode for the current video block.

93. The method of any of clauses 90 to 92, wherein the video coding condition specifies selectively signaling a triangle mode coding of the current video block.

94. The method of any of clauses 90 to 93, wherein the video coding condition specifies selectively signaling an inter prediction direction for the current video block.

95. The method of any of clauses 90 to 94, wherein the video coding condition specifies selectively modifying motion vectors or block vectors used for intra block copy of the current video block.

96. The method of any of clauses 90-95, wherein the video condition is dependent on a height in pixels of the current video block.

97. The method of any of clauses 90-96, wherein the video condition is dependent on a width in pixels of the current video block.

98. The method of any of clauses 90-95, wherein the video condition is dependent on whether the current video block is square shaped.

Additional examples of clauses 90 to 98 are provided in Items 11 to 16 listed in Section 4 of the present document.

99. A video encoder apparatus that comprises a processor configured to perform a method recited in one or more of clauses 1 to 98.

100. A video decoder apparatus that comprises a processor configured to perform a method recited in one or more of clauses 1 to 98.

101. A computer readable medium having code stored thereon, the code, when executed by a processor, causing the processor to implement a method recited in any one or more of clauses 1 to 98.

Figure 16:
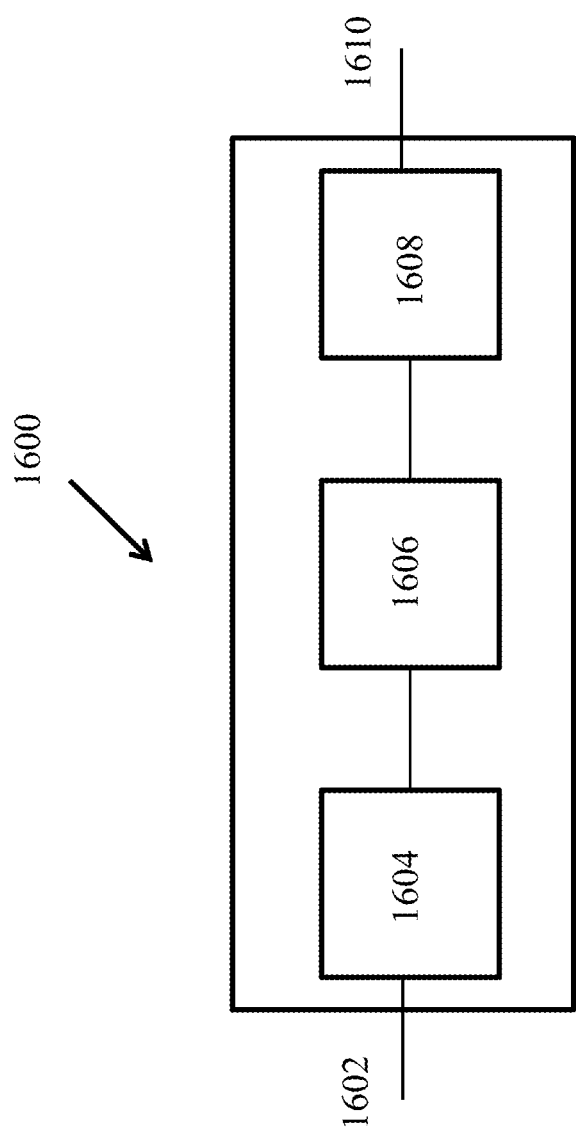
FIG. 16 is a block diagram of an example video processing system in which disclosed techniques may be implemented.

FIG. 16 is a block diagram showing an example video processing system 1600 in which various techniques disclosed herein may be implemented. Various implementations may include some or all of the components of the system 1600. The system 1600 may include input 1602 for receiving video content. The video content may be received in a raw or uncompressed format, e.g., 8 or 10 bit multi-component pixel values, or may be in a compressed or encoded format. The input 1602 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1600 may include a coding component 1604 that may implement the various coding or encoding methods described in the present document. The coding component 1604 may reduce the average bitrate of video from the input 1602 to the output of the coding component 1604 to produce a coded representation of the video. The coding techniques are therefore sometimes called video compression or video transcoding techniques. The output of the coding component 1604 may be either stored, or transmitted via a communication connected, as represented by the component 1606. The stored or communicated bitstream (or coded) representation of the video received at the input 1602 may be used by the component 1608 for generating pixel values or displayable video that is sent to a display interface 1610. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 17:
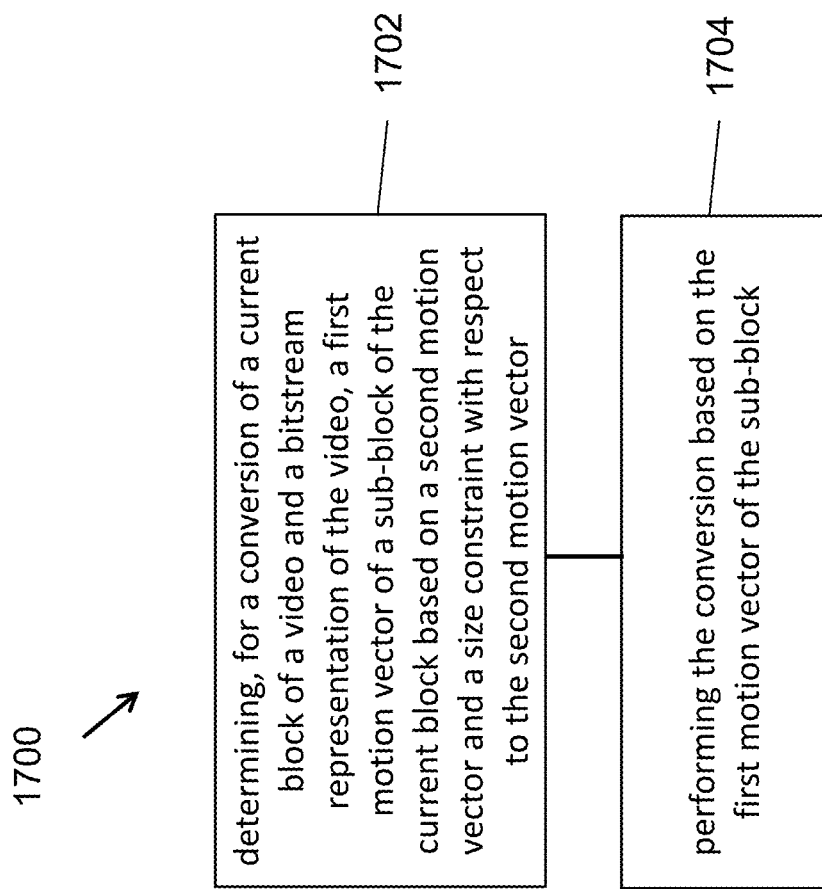
FIG. 17 is a flowchart represent of a method for video processing in accordance with the present disclosure.

FIG. 17 is a flowchart representation of a method 1700 for video processing in accordance with the present disclosure. The method 1700 includes, at operation 1702, determining, for a conversion between a current block of a video and a bitstream representation of the video using an affine coding tool, that a first motion vector of a sub-block of the current block and a second motion vector that is a representative motion vector for the current block comply with a size constraint. The method 1700 also includes, at operation 1704, performing the conversion based on the determining.

In some embodiments, the first motion vector of the sub-block is represented as (MVx, MVy) and the second motion vector is represented as (MV'x, MV'y). The size constraint indicates that MVx>=MV'x-DH0, MVx<=MV'x+DH1, MVy>=MV'y-DV0, and MVy<=MV'y+DV1, DH0, DH1, DV0 and DV1 being positive numbers. In some embodiments, DH0=DH1. In some embodiments, DH0≠DH1. In some embodiments, DV0=DV1. In some embodiments, DV0≠DV0. In some embodiments, DH0=DV0. In some embodiments, DH0≠DV0. In some embodiments, DH1=DV1. In some embodiments, DH1≠DV1.

In some embodiments, at least one of DH0, DH1, DV0, or DV1 is signaled in the bitstream representation in a video parameter set level, a sequence parameter set level, a picture parameter set level, a slice header, a tile group header, a tile level, a coding tree unit level, a coding unit level, or a prediction unit level. In some embodiments, DH0, DH1, DV0, and DV1 are different for different profiles, levels, or tiers of the conversion. In some embodiments, wherein DH0, DH1, DV0, and DV1 are based on a weight or a height of the current block. In some embodiments, DH0, DH1, DV0, and DV1 are based on a prediction mode of the current block, the prediction mode being a uni-prediction mode or a bi-prediction mode. In some embodiments, DH0, DH1, DV0, and DV1 are based on a position of the sub-block in the current block.

In some embodiments, the second motion vector comprises a control point motion vector of the current block. In some embodiments, the second motion vector comprises a motion vector for a second sub-block of the current block. In some embodiments, the second sub-block comprises a center sub-block of the current block. In some embodiments, the second sub-block comprises a corner sub-block of the current block. In some embodiments, the second motion vector comprises a motion vector derived for a position inside or outside of the current block, the position coded using a same affine model as the current block. In some embodiments, the position comprises a center position of the current block.

In some embodiments, the first motion vector is adjusted to satisfy the size constraint. In some embodiments, the bitstream is invalid in case the first motion vector fails to satisfy the size constraint with respect to the second motion vector. In some embodiments, the first motion vector and the second motion vector are represented according to a motion vector signaling precision in the bitstream representation. In some embodiments, the first motion vector and the second motion vector are represented according to a storage precision for storing motion vectors. In some embodiments, the first motion vector and the second motion vector are represented according to a precision that is different from a motion vector signaling precision or a storage precision for storing motion vectors.

Figure 18:
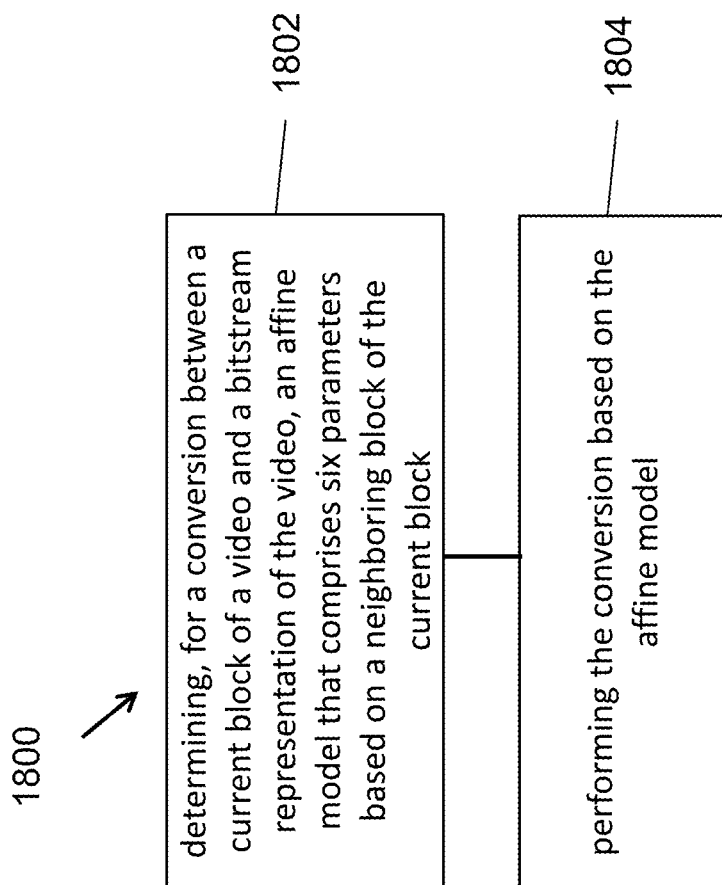
FIG. 18 is a flowchart represent of another method for video processing in accordance with the present disclosure.

FIG. 18 is a flowchart representation of a method 1800 for video processing in accordance with the present disclosure. The method 1800 includes, at operation 1802, determining, for a conversion between a current block of a video and a bitstream representation of the video, an affine model that comprises six parameters. The affine model is inherited from affine coding information of a neighboring block of the current block. The method 1800 includes, at operation 1804, performing the conversion based on the affine model.

In some embodiments, the neighboring block is coded using a second affine model having six parameters, the affine model being same as the second affine model. In some embodiments, the neighboring block is coded using a third affine model having four parameters. In some embodiments, the affine model is determined based on a position of the current block. In some embodiments, the affine model is determined according to the third affine model in case the neighboring block is not in a same coding tree unit (CTU) as the current block. In some embodiments, the affine model is determined according to the third affine model in case the neighboring block is not in a same CTU line or a same CTU row as the current block.

In some embodiments, a tile, a slice, or a picture is split into multiple non-overlapped regions. In some embodiments, the affine model is determined according to the third affine model in case the neighboring block is not in a same region as the current block. In some embodiments, the affine model is determined according to the third affine model in case the neighboring block is not in a same region line or a same region row as the current block. In some embodiments, each region has a size of 64×64. In some embodiments, a top-left corner of the current block is represented as (x, y) and a top-left corner of the neighboring block is represented as (x', y'), and wherein the affine model is determined according to the third affine model in case a condition regarding x, y, x' and y' is satisfied. In some embodiments, the condition indicates x/M≠x'/M, M being a positive integer. In some embodiments, M is 128 or 64. In some embodiments, the condition indicates y/N≠y'/N, N being a positive integer. In some embodiments, N is 128 or 64. In some embodiments, the condition indicates x/M≠x'/M and y/N≠y'/N, M and N being a positive integer. In some embodiments, M=N=128 or M=N=64. In some embodiments, the condition indicates x>>M≠x'>>M, M being a positive integer. In some embodiments, M is 6 or 7. In some embodiments, the condition indicates y>>N≠y'>>N, N being a positive integer. In some embodiments, N is 6 or 7. In some embodiments, the condition indicates x>>M≠x'>>M and y>>N≠y'>>N, M and N being a positive integer. In some embodiments, M=N=6 or M=N=7.

Figure 19:
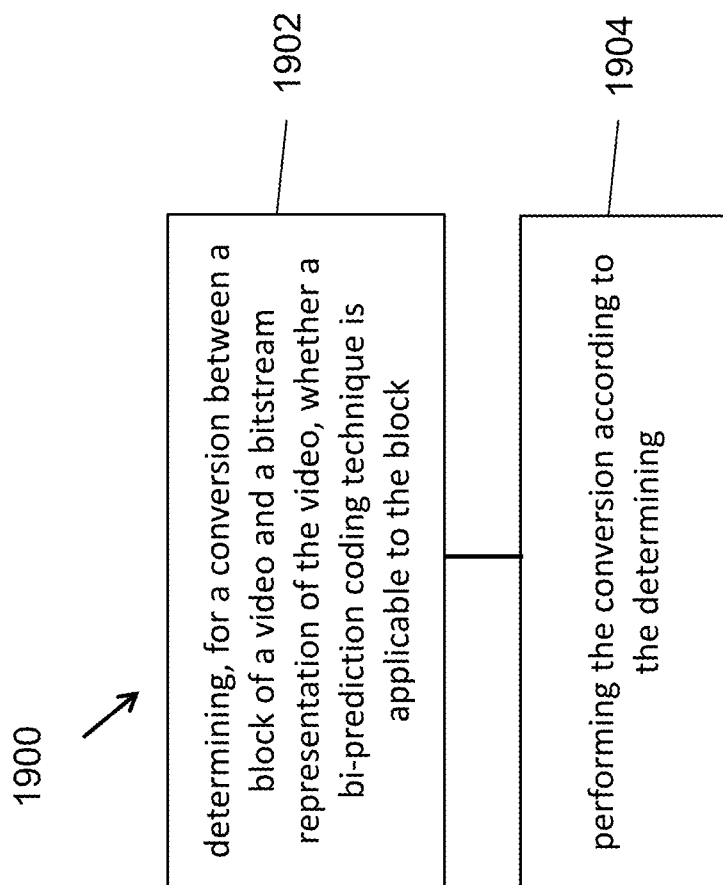
FIG. 19 is a flowchart represent of another method for video processing in accordance with the present disclosure.

FIG. 19 is a flowchart representation of a method 1900 for video processing in accordance with the present disclosure. The method 1900 includes, at operation 1902, determining, for a conversion between a block of a video and a bitstream representation of the video, whether a bi-prediction coding technique is applicable to the block based on a size of the block having a width W and a height H, W and H being positive integers. The method 1900 includes, at operation 1904, performing the conversion according to the determining.

In some embodiments, the bi-prediction coding technique is not applicable in case W=T1 and H=T2, T1 and T2 being positive integers. In some embodiments, the bi-prediction coding technique is not applicable in case W=T2 and H=T1, T1 and T2 being positive integers. In some embodiments, the bi-prediction coding technique is not applicable in case W=T1 and H≤T2, T1 and T2 being positive integers. In some embodiments, the bi-prediction coding technique is not applicable in case W≤T2 and H=T1, T1 and T2 being positive integers. In some embodiments, T1=4 and T2=16. In some embodiments, the bi-prediction coding technique is not applicable in case W≤T1 and H≤1 T2, T1 and T2 being positive integers. In some embodiments, T1=T2=8. In some embodiments, T1=8 and T2=4. In some embodiments, T1=T2=4. In some embodiments, T1=4 and T2=8.

In some embodiments, an indicator indicating information about the bi-prediction coding technique is signaled in the bitstream in case the bi-prediction coding technique is applicable. In some embodiments, an indicator indicating information about the bi-prediction coding technique for the block is excluded from the bitstream in case the bi-prediction coding technique is not applicable to the block. In some embodiments, the bi-prediction coding technique is not applicable in case the size of the block is one of: 4×8 or 8×4. In some embodiments, the bi-prediction coding technique is not applicable in case the size of the block is 4×N or N×4, N being a positive integer and N≤16. In some embodiments, the size of the block corresponds to a first color component of the block, and whether a bi-prediction coding technique is applicable is determined for the first color component and remaining color components of the block. In some embodiments, the size of the block corresponds to a first color component of the block, and whether a bi-prediction coding technique is applicable is determined only for the first color component. In some embodiments, the first color component includes a luma component.

In some embodiments, the method further comprises, in case the bi-prediction coding technique is not applicable to the current block, assigning a single motion vector from a first reference list or a second reference list upon determining that a selected merge candidate is coded using the bi-prediction coding technique. In some embodiments, the method further comprises, in case the bi-prediction coding technique is not applicable to the current block, determining that a triangular prediction mode is not applicable to the block. In some embodiments, whether the bi-prediction coding technique is applicable is associated with a prediction direction, the prediction direction further associated with a uni-prediction coding technique, and wherein the prediction direction is signaled in the bitstream based on the size of the block. In some embodiments, information about the uni-prediction coding technique is signaled in the bitstream in case (1) W×H<64 or (2) W×H=64, W being unequal to H. In some embodiments, information about the uni-prediction coding technique or the bi-direction coding technique is signaled in the bitstream in case (1) W×H>64 or (2) W×H=64, W being equal to H.

In some embodiments, a restriction indicates that neither the bi-direction coding technique nor the uni-direction technique is applicable to the block in case the size of the block is 4×4. In some embodiments, the restriction is applicable in case the block is affine coded. In some embodiments, the restriction is applicable in case the block is not affine coded. In some embodiments, the restriction is applicable in case the block is intra-coded. In some embodiments, the restriction is not applicable in case a motion vector of the block has an integer precision.

In some embodiments, signaling that the block is generated based on a split of a parent block is skipped in the bitstream, the parent block having a size of (1) 8×8 for a quad-tree split, (2) 8×4 or 4×8 for a binary tree split, (3) or 4×16 or 16×4 for a triple tree split. In some embodiments, an indicator indicating that the motion vector has the integer precision is set to 1 in the bitstream. In some embodiments, the motion vector of the block is rounded to the integer precision.

In some embodiments, the bi-prediction coding technique is applicable to the block. A reference block has a size of (W+N−1−PW)×(H+N−1−PH), and boundary pixels of the reference block are repeated to generate a second block having a size of (W+N−1)×(H+N−1) for an interpolation operation, N representing an interpolation filter tap, N, PW and PH being integers. In some embodiments, PH=0, and pixels of at least a left boundary or a right boundary are repeated to generate the second block. In some embodiments, PW=0, and pixels of at least a top boundary or a bottom boundary are repeated to generate the second block. In some embodiments, PW>0 and PH>0, and the second block is generated by repeating pixels of at least a left boundary or a right boundary followed by repeating pixels of at least a top boundary or a bottom boundary. In some embodiments, PW>0 and PH>0, and the second block is generated by repeating pixels of at least a top boundary or a bottom boundary followed by repeating pixels of at least a left boundary or a right boundary. In some embodiments, pixels of a left boundary are repeated M1 times, and wherein pixels of a right boundary are repeated (PW−M1) times. In some embodiments, pixels of a top boundary are repeated M2 times, and wherein pixels of a bottom boundary are repeated (PH−M2) times. In some embodiments, how the boundary pixels of the reference block are repeated is applied to some or all reference blocks for the conversion. In some embodiments, PW and PH are different for different components of the block.

In some embodiments, a merge candidate list construction process is performed based on the size of the block. In some embodiments, a merge candidate is considered as a uni-prediction candidate referring to a first reference list in a uni-prediction coding technique in case (1) the merge candidate is coded using the bi-prediction coding technique and (2) bi-prediction is not applicable to the block according to the size of the block. In some embodiments, the first reference list comprises a reference list 0 or a reference list 1 of the uni-prediction coding technique. In some embodiments, a merge candidate is considered as unavailable in case (1) the merge candidate is coded using the bi-prediction coding technique and (2) bi-prediction is not applicable to the block according to the size of the block. In some embodiments, the unavailable merge candidate is removed from a merge candidate list in the merge candidate list construction process. In some embodiments, the merge candidate list construction process for Triangular Prediction Mode is invoked in case bi-prediction is not applicable to the block according to the size of the block.

Figure 20:
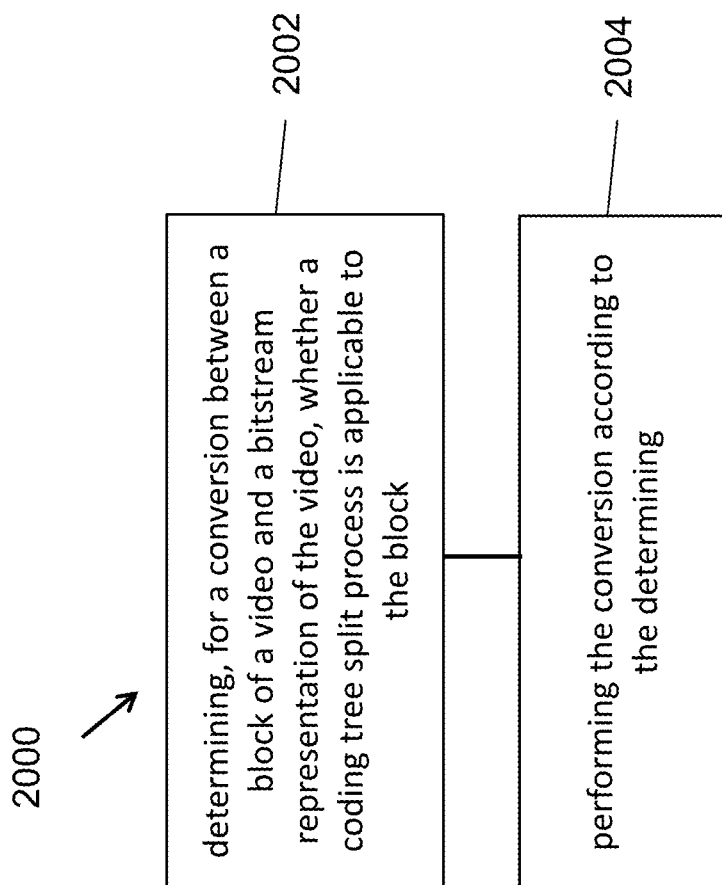
FIG. 20 is a flowchart represent of another method for video processing in accordance with the present disclosure.

FIG. 20 is a flowchart representation of a method 2000 for video processing in accordance with the present disclosure. The method 2000 includes, at operation 2002, determining, for a conversion between a block of a video and a bitstream representation of the video, whether a coding tree split process is applicable to the block based on a size of a sub-block that is a child coding unit of the block according to the coding tree split process. The sub-block has a width W and a height H, W and H being positive integers. The method 2000 also includes, at operation 2004, performing the conversion according to the determining.

In some embodiments, the coding tree split process is not applicable in case W=T1 and H=T2, T1 and T2 being positive integers. In some embodiments, the coding tree split process is not applicable in case W=T2 and H=T1, T1 and T2 being positive integers. In some embodiments, the coding tree split process is not applicable in case W=T1 and H≤T2, T1 and T2 being positive integers. In some embodiments, the coding tree split process is not applicable in case W≤T2 and H=T1, T1 and T2 being positive integers. In some embodiments, T1=4 and T2=16. In some embodiments, the coding tree split process is not applicable in case W≤T1 and H≤T2, T1 and T2 being positive integers. In some embodiments, T1=T2=8. In some embodiments, T1=8 and T2=4. In some embodiments, T1=T2=4. In some embodiments, T1=4. In some embodiments, T2=4. In some embodiments, signaling of the coding tree split process is omitted from the bitstream in case the coding tree split process is not applicable to the current block.

Figure 21:
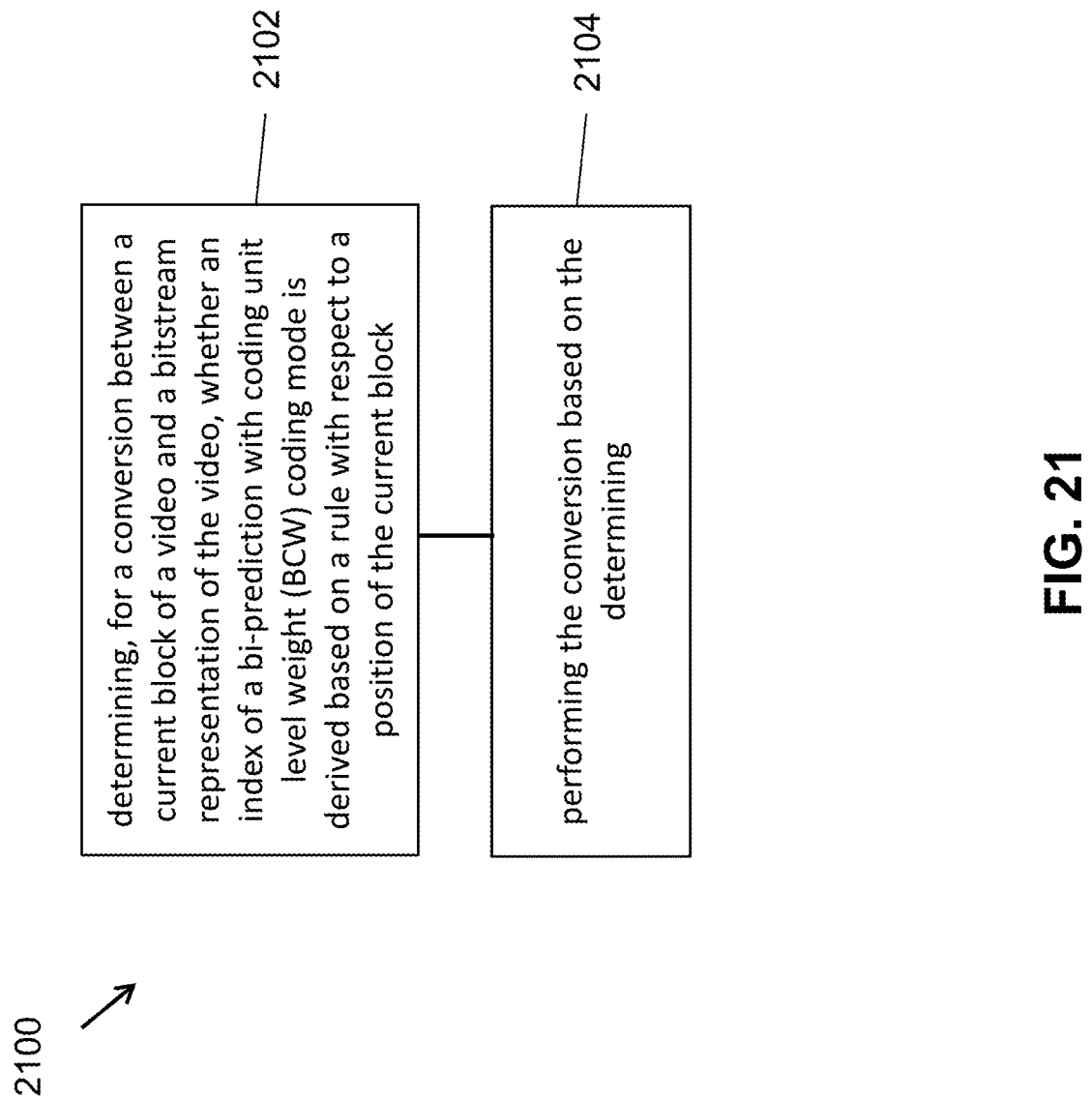
FIG. 21 is a flowchart represent of another method for video processing in accordance with the present disclosure.

FIG. 21 is a flowchart representation of a method 2100 for video processing in accordance with the present disclosure. The method 2100 includes, at operation 2102, determining, for a conversion between a current block of a video and a bitstream representation of the video, whether an index of a bi-prediction with coding unit level weight (BCW) coding mode is derived based on a rule with respect to a position of the current block. In the BCW coding mode, a weight set including multiple weights is used to generate bi-prediction values of the current block. The method 2100 also includes, at operation 2104, performing the conversion based on the determining.

In some embodiments, the bi-prediction values of the current block are generated as a non-averaging weighted sum of two motion vectors in case at least one weight in the weight set is applied. In some embodiments, rule specifies that the index is not derived according to the neighboring block in case the current block and the neighboring block are positioned in different coding tree units or largest coding units. In some embodiments, the rule specifies the index is not derived according to the neighboring block in case the current block and the neighboring block are positioned in different lines or rows in a coding tree unit. In some embodiments, the rule specifies the index is not derived according to the neighboring block in case the current block and the neighboring block are positioned in different non-overlapped regions of a tile, a slice, or a picture of the video. In some embodiments, the rule specifies the index is not derived according to the neighboring block in case the current block and the neighboring block are positioned in different rows of non-overlapped regions of a tile, a slice, or a picture of the video. In some embodiments, each region has a size of 64×64.

In some embodiments, a top corner of the current block is represented as (x,y) and a top corner of the neighboring block is represented as (x', y'). The rule specifies the index is not derived according to the neighboring block in case (x, y) and (x', y') satisfy a condition. In some embodiments, the condition indicates that x/M≠x'/M, M being a positive integer. In some embodiments, M is 128 or 64. In some embodiments, the condition indicates that y/N≠y'/N, N being a positive integer. In some embodiments, N is 128 or 64. In some embodiments, the condition indicates that (x/M≠x'/M) and (y/N≠y'/N), M and N being positive integers. In some embodiments, M=N=128 or M=N=64. In some embodiments, the condition indicates that x>>M≠x'>>M, M being a positive integer. In some embodiments, M is 6 or 7. In some embodiments, the condition indicates that y>>N≠y'>>N, N being a positive integer. In some embodiments, wherein N is 6 or 7. In some embodiments, the condition indicates that (x>>M≠x'>>M) and (y>>N≠y'>>N), M and N being positive integers. In some embodiments, M=N=6 or M=N=7.

In some embodiments, whether the BCW coding mode is applicable to a picture, a slice, a tile group, or a tile is signaled respectively in a picture parameter set, a slice header, a tile group header, or a tile in the bitstream. In some embodiments, whether the BCW coding mode is applicable to a picture, a slice, a tile group, or a tile is derived based on information associated with the picture, the slice, the tile group, or the tile. In some embodiments, the information comprises at least a quantization parameter (QP), a temporal layer, or a Picture Order Count distance.

Figure 22:
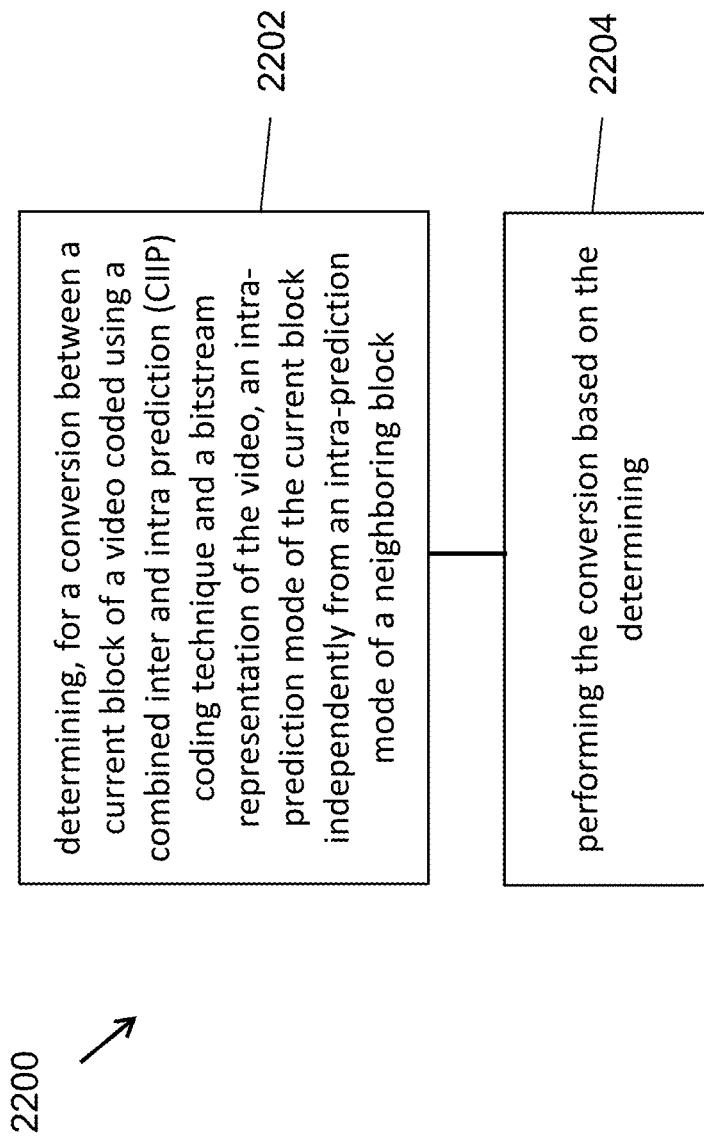
FIG. 22 is a flowchart represent of another method for video processing in accordance with the present disclosure.

FIG. 22 is a flowchart representation of a method 2200 for video processing in accordance with the present disclosure. The method 2200 includes, at operation 2202, determining, for a conversion between a current block of a video coded using a combined inter and intra prediction (CIIP) coding technique and a bitstream representation of the video, an intra-prediction mode of the current block independently from an intra-prediction mode of a neighboring block. The CIIP coding technique uses an intermediate inter prediction value and an intermediate intra prediction value to derive a final prediction value of the current block. The method 2200 also includes, at operation 2204, performing the conversion based on the determining.

In some embodiments, the intra-prediction mode of the current block is determined without referencing an intra-prediction prediction mode of any neighboring blocks. In some embodiments, a neighboring block is coded using the CIIP coding technique. In some embodiments, the intra-prediction of the current block is determined based on an intra-prediction mode of a second neighboring block that is coded using an intra-prediction coding technique. In some embodiments, whether to determine the intra-prediction mode of the current block according to the second intra-prediction mode is based on whether a condition is satisfied, the condition specifying a relationship between the current block as a first block and the second neighboring block as a second block. In some embodiments, the determining is a part of a Most Probable Modes (MPM) construction process of the current block to derive a list of MPM modes.

Figure 23:
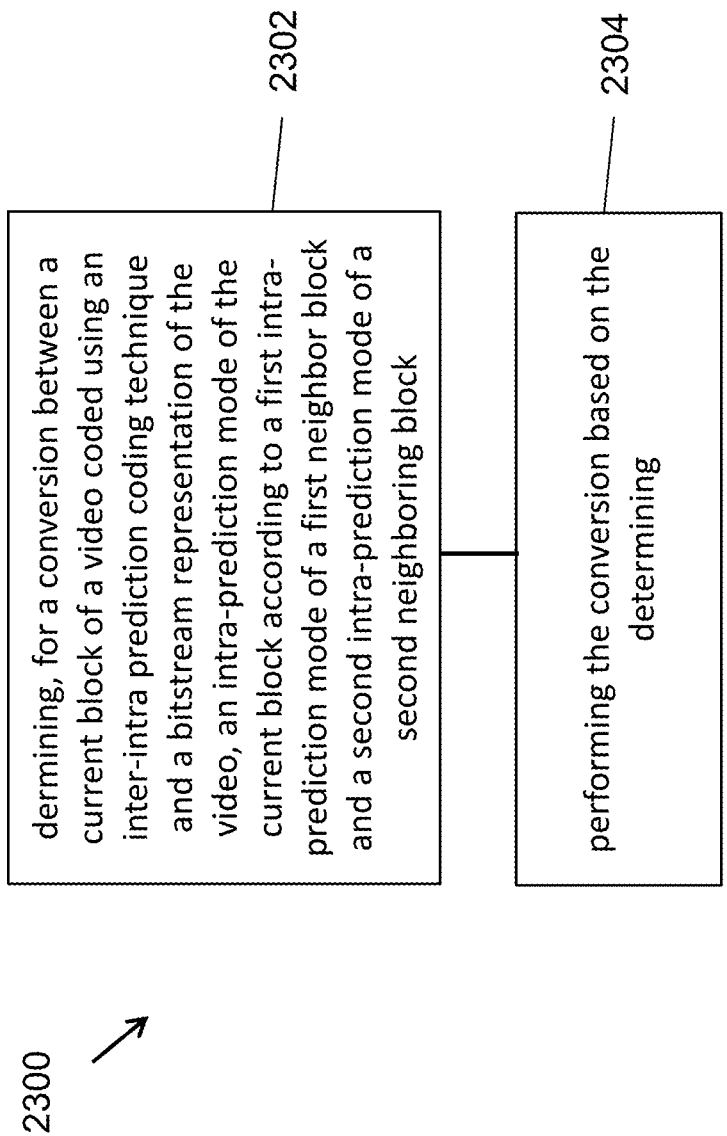
FIG. 23 is a flowchart represent of another method for video processing in accordance with the present disclosure.

FIG. 23 is a flowchart representation of a method 2300 for video processing in accordance with the present disclosure. The method 2300 includes, at operation 2302, determining, for a conversion between a current block of a video coded using a combined inter and intra prediction (CIIP) coding technique and a bitstream representation of the video, an intra-prediction mode of the current block according to a first intra-prediction mode of a first neighboring block and a second intra-prediction mode of a second neighboring block. The first neighboring block is coded using an intra-prediction coding technique and the second neighboring block is coded using the CIIP coding technique. The first intra-prediction mode is given a priority different than the second intra-prediction mode. The CIIP coding technique uses an intermediate inter prediction value and an intermediate intra prediction value to derive a final prediction value of the current block. The method 2300 also includes, at operation 2304, performing the conversion based on the determining.

In some embodiments, the determining is a part of a Most Probable Modes (MPM) construction process of the current block to derive a list of MPM modes. In some embodiments, the first intra-prediction mode is positioned prior to the second intra-prediction mode in the list of MPM candidates. In some embodiments, the first intra-prediction mode is positioned after the second intra-prediction mode in the list of MPM candidates. In some embodiments, coding of the intra-prediction mode bypasses a Most Probable Modes (MPM) construction process of the current block. In some embodiments, the method also comprises determining an intra-prediction mode of a subsequent block according to the intra-prediction mode of the current block, wherein the subsequent block is coded using an intra-prediction coding technique and the current block is coded using the CIIP coding technique. In some embodiments, the determining is a part of a Most Probable Modes (MPM) construction process of the subsequent block. In some embodiments, in the MPM construction process of the subsequent block, the intra-prediction mode of the current block is given a lower priority than an intra-prediction mode of another neighboring block coded using the intra-prediction coding technique. In some embodiments, whether to determine the intra-prediction mode of the subsequent block according to the intra-prediction mode of the current block is based on whether a condition is satisfied, the condition specifying a relationship between the subsequent block as a first block and the current block as a second block. In some embodiments, the condition comprises at least one of: (1) the first block and the second block are positioned in a same line of a coding tree unit (CTU), (2) the first block and the second block are positioned in the same CTU, (3) the first block and the second block are in a same region, or (4) the first block and the second block are in a same line of the region. In some embodiments, a width of the region is same as a height of the region. In some embodiments, the region has a size of 64×64.

In some embodiments, only a subset of a list of Most Probable Modes (MPMs) for a normal intra coding technique is used for the current block. In some embodiments, the subset comprises a single MPM mode in the list of MPM modes for the normal intra coding technique. In some embodiments, the single MPM mode is a first MPM mode in the list. In some embodiments, an index indicating the single MPM mode is omitted in the bitstream. In some embodiments, the subset comprises first four MPM modes in the list of MPM modes. In some embodiments, an index indicating an MPM mode in the subset is signaled in the bitstream. In some embodiments, a coding context for coding the intra-coded block is reused for coding the current block. In some embodiments, a first MPM flag for the intra-coded block and a second MPM flag for the current block share the same coding context in the bitstream. In some embodiments, the intra-prediction mode of the current block is selected from the list of MPM modes regardless of a size of the current block. In some embodiments, the MPM construction processed is defaulted to be enabled, and wherein a flag indicating the MPM construction process is omitted in the bitstream. In some embodiments, no MPM list construction process is needed for the current block.

In some embodiments, a luma-predict-chroma mode is used for processing a chroma component of the current block. In some embodiments, a derived mode is used for processing the chroma component of the current block. In some embodiments, multiple intra-prediction modes are used for processing the chroma component of the current block. In some embodiments, the multiple intra-prediction modes are used based on a color format of the chroma component. In some embodiments, in case the color format is 4:4:4, the multiple intra-prediction modes are same as intra-prediction modes for a luma component of the current block. In some embodiments, each of four intra-prediction modes is coded using one or more bits, the four intra-prediction modes including a Planar mode, a DC mode, a Vertical mode, and a Horizontal mode. In some embodiments, the four intra-prediction modes are coded using 00, 01, 10, and 11. In some embodiments, the four intra-prediction modes are coded using 0, 10, 110, 111. In some embodiments, the four intra-prediction modes are coded using 1, 01, 001, 000. In some embodiments, in case a width W and a height H of the current block satisfy a condition, only a subset of the four intra-prediction modes is available for use. In some embodiments, the subset comprises the Planar mode, the DC mode, and the Vertical mode in case W>N×H, N being an integer. In some embodiments, the Planar mode, the DC mode, and the Vertical mode are coded using 1, 01, and 11. In some embodiments, the Planar mode, the DC mode, and the Vertical mode are coded using 0, 10, and 00. In some embodiments, the subset comprises the Planar mode, the DC mode, and the Horizontal mode in case H>N×W, N being an integer. In some embodiments, the Planar mode, the DC mode, and the Horizontal mode are coded using 1, 01, and 11. In some embodiments, the Planar mode, the DC mode, and the Horizontal mode are coded using 0, 10, and 00. In some embodiments, N=2. In some embodiments, only a DC mode and a Planar mode are used for the current block. In some embodiments, an indicator indicating the DC mode or the Planar mode is signaled in the bitstream.

Figure 24:
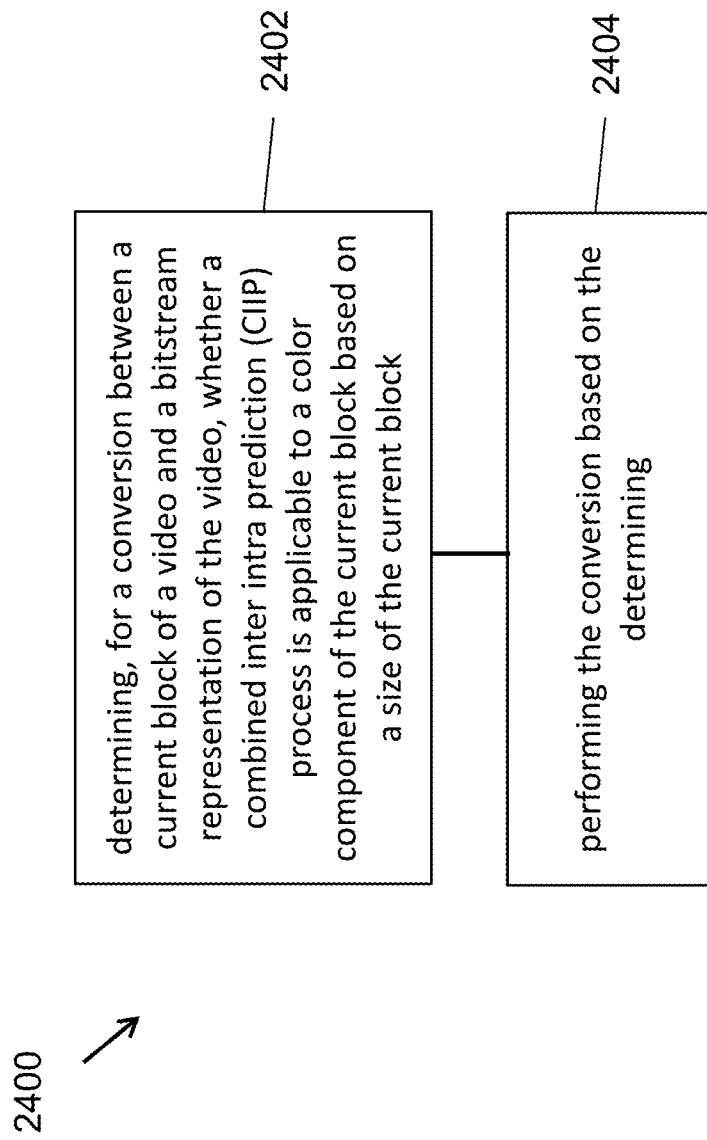
FIG. 24 is a flowchart represent of another method for video processing in accordance with the present disclosure.

FIG. 24 is a flowchart representation of a method 2400 for video processing in accordance with the present disclosure. The method 2400 includes, at operation 2402, determining, for a conversion between a current block of a video and a bitstream representation of the video, whether a combined inter intra prediction (CIIP) process is applicable to a color component of the current block based on a size of the current block. The CIIP coding technique uses an intermediate inter prediction value and an intermediate intra prediction value to derive a final prediction value of the current block. The method 2400 also includes, at operation 2404, performing the conversion based on the determining.

In some embodiments, the color component comprises a chroma component, and wherein the CIIP process is not performed to the chroma component in case a width of the current block is smaller than 4. In some embodiments, the color component comprises a chroma component, and wherein the CIIP process is not performed to the chroma component in case a height of the current block is smaller than 4. In some embodiments, an intra-prediction mode for a chroma component of the current block is different than an intra-prediction mode for a luma component of the current block. In some embodiments, the chroma component uses one of: a DC mode, a Planar mode, or a Luma-predict-chroma mode. In some embodiments, the intra-prediction mode for the chroma component is determined based on color format of the chroma component. In some embodiments, the color format comprises 4:2:0 or 4:4:4.

Figure 25:
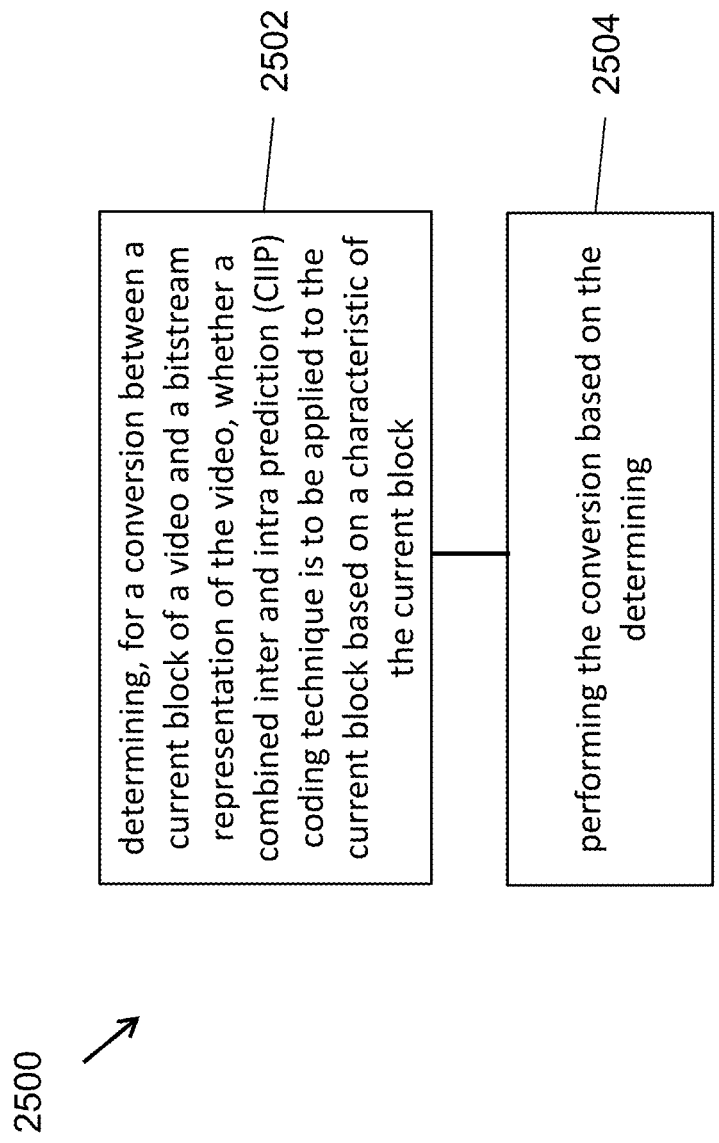
FIG. 25 is a flowchart represent of another method for video processing in accordance with the present disclosure.

FIG. 25 is a flowchart representation of a method 2500 for video processing in accordance with the present disclosure. The method 2500 includes, at operation 2502, determining, for a conversion between a current block of a video and a bitstream representation of the video, whether a combined inter and intra prediction (CIIP) coding technique is to be applied to the current block based on a characteristic of the current block. The CIIP coding technique uses an intermediate inter prediction value and an intermediate intra prediction value to derive a final prediction value of the current block. The method 2500 also includes, at operation 2504, performing the conversion based on the determining.

In some embodiments, the characteristic comprises a size of the current block having a width W and a height H, W and H being integers, and the inter-intra prediction coding technique is disabled for the current block in case the size of the block satisfies a condition. In some embodiments, the condition indicates that W is equal to T1, T1 being an integer. In some embodiments, the condition indicates that H is equal to T1, T1 being an integer. In some embodiments, T1=4. In some embodiments, T1=2. In some embodiments, the condition indicates that W is greater than T1 or H is greater than T1, T1 being an integer. In some embodiments, T1=64 or 128. In some embodiments, the condition indicates that W is equal to T1 and H is equal to T2, T1 and T2 being integers. In some embodiments, the condition indicates that W is equal to T2 and H is equal to T1, T1 and T2 being integers. In some embodiments, T1=4 and T2=16.

In some embodiments, the characteristic comprises a coding technique applied to the current block, and the CIIP coding technique is disabled for the current block in case the coding technique satisfies a condition. In some embodiments, the condition indicates that the coding technique is a bi-prediction coding technique. In some embodiments, a bi-prediction coded merge candidate is converted to a uni-prediction coded merge candidate to allow the inter-intra prediction coding technique to be applied to the current block. In some embodiments, the converted merge candidate is associated with a referent list 0 of a uni-prediction coding technique. In some embodiments, the converted merge candidate is associated with a referent list 1 of a uni-prediction coding technique. In some embodiments, only uni-prediction coded merge candidates of the block are selected for the conversion. In some embodiments, bi-prediction coded merge candidates are discarded for determining a merge index indicating a merge candidate in the bitstream representation. In some embodiments, the inter-intra prediction coding technique is applied to the current block according to the determining. In some embodiments, a merge candidate list construction process for a Triangular Prediction Mode is used to derive a motion candidate list for the current block.

Figure 26:
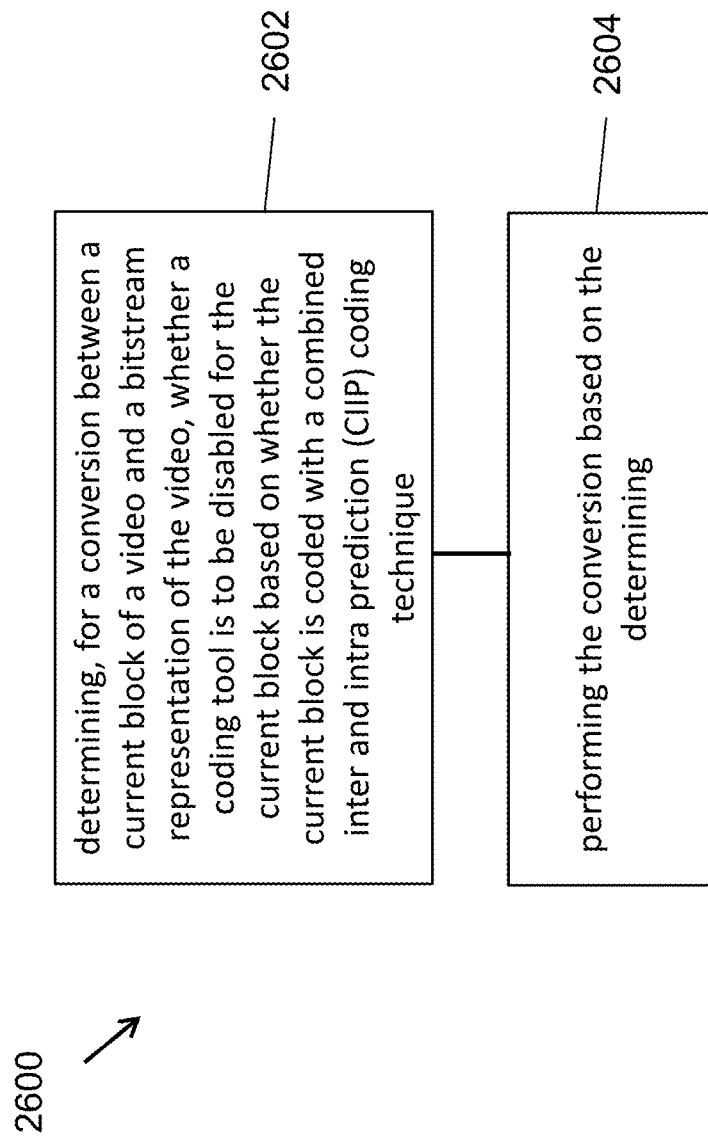
FIG. 26 is a flowchart represent of another method for video processing in accordance with the present disclosure.

FIG. 26 is a flowchart representation of a method 2600 for video processing in accordance with the present disclosure. The method 2600 includes, at operation 2602, determining, for a conversion between a current block of a video and a bitstream representation of the video, whether a coding tool is to be disabled for the current block based on whether the current block is coded with a combined inter and intra prediction (CIIP) coding technique. The CIIP coding technique uses an intermediate inter prediction value and an intermediate intra prediction value to derive a final prediction value of the current block. The coding tool comprises at least one of: a Bi-Directional Optical Flow (BDOF), an Overlapped Block Motion Compensation (OBMC), or a decoder-side motion vector refinement process (DMVR). The method 2500 also includes, at operation 2604, performing the conversion based on the determining.

In some embodiments, an intra-prediction process for the current block is different from an intra-prediction process for a second block that is coded using an intra-prediction coding technique. In some embodiments, in the intra-prediction process for the current block, filtering of neighboring samples is skipped. In some embodiments, in the intra-prediction process for the current block, a position-dependent intra prediction sample filtering process is disabled. In some embodiments, in the intra-prediction process for the current block, a multiline intra-prediction process is disabled. In some embodiments, in the intra-prediction process for the current block, a wide-angle intra-prediction process is disabled.

Figure 27:
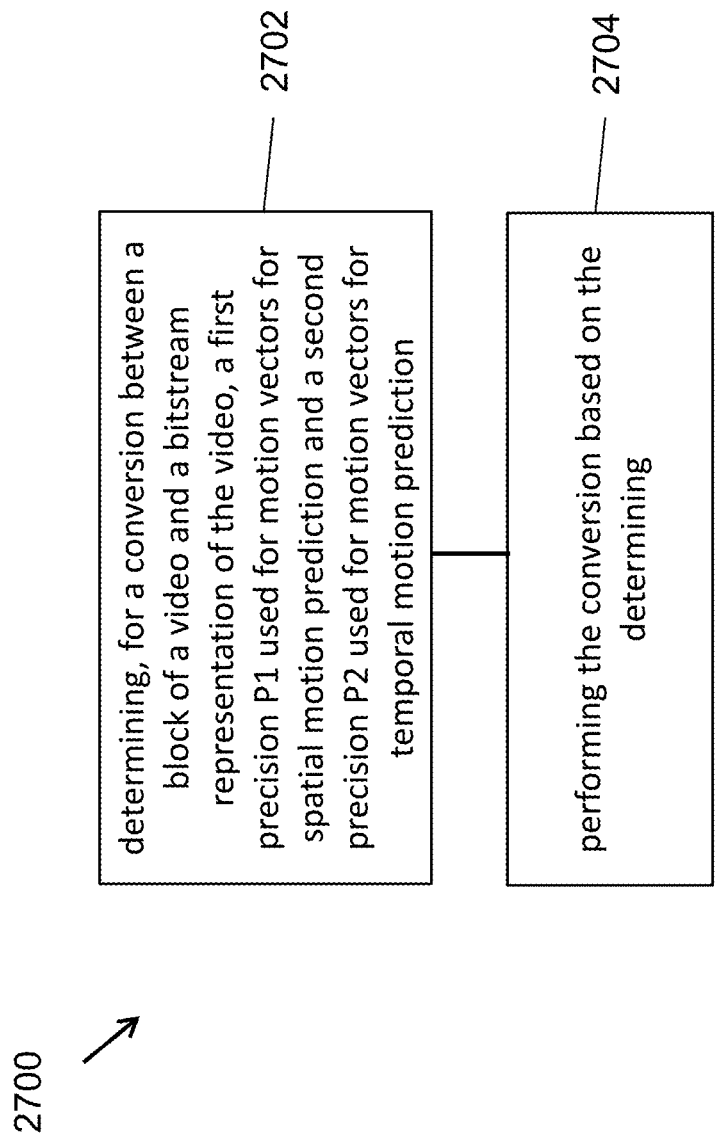
FIG. 27 is a flowchart represent of another method for video processing in accordance with the present disclosure.

FIG. 27 is a flowchart representation of a method 2700 for video processing in accordance with the present disclosure. The method 2700 includes, at operation 2702, determining, for a conversion between a block of a video and a bitstream representation of the video, a first precision P1 used for motion vectors for spatial motion prediction and a second precision P2 used for motion vectors for temporal motion prediction. P1 and/or P2 are fractions. P1 and P2 are different from each other. The method 2600 also includes, at operation 2704, performing the conversion based on the determining.

In some embodiments, the first precision is 1/16 luma pixel and the second precision is 1/4 luma pixel. In some embodiments, the first precision is 1/16 luma pixel and the second precision is 1/8 luma pixel. In some embodiments, the first precision is 1/8 luma pixel and the second precision is 1/4 luma pixel. In some embodiments, the first precision is 1/16 luma pixel and the second precision is 1/4 luma pixel. In some embodiments, the first precision is 1/16 luma pixel and the second precision is 1/8 luma pixel. In some embodiments, the first precision is 1/8 luma pixel and the second precision is 1/4 luma pixel. In some embodiments, at least one of the first or second precision is lower than 1/16 luma pixel.

In some embodiments, at least one of the first or the second precision is variable. In some embodiments, the first precision or the second precision is variable according to a profile, a level, or a tier of the video. In some embodiments, the first precision or the second precision is variable according to a temporal layer of a picture in the video. In some embodiments, the first precision or the second precision is variable according to a size of a picture in the video.

In some embodiments, at least one of the first or the second precision is signaled in a video parameter set, a sequence parameter set, a picture parameter set, a slice header, a tile group header, a tile, a coding tree unit, or a coding unit in the bitstream representation. In some embodiments, a motion vector is represented as (MVx, MVy) and a precision for the motion vector is represented as (Px, Py), and wherein Px is associated with MVx and Py is associated with MVy. In some embodiments, Px and Py are variables according to a profile, a level, or a tier of the video. In some embodiments, Px and Py are variable according to a temporal layer of a picture in the video. In some embodiments, Px and Py are variables according to a width of a picture in the video. In some embodiments, Px and Py are signaled in a video parameter set, a sequence parameter set, a picture parameter set, a slice header, a tile group header, a tile, a coding tree unit, or a coding unit in the bitstream representation. In some embodiments, a decoded motion vector is denoted as (MVx, MVy), and wherein the motion vector is adjusted according to the second precision prior to the motion vector is stored as a temporal motion prediction motion vector. In some embodiments, temporal motion prediction motion vector is adjusted to be (Shift(MVx, P1-P2), Shift(MVy, P1-P2)), P1 and P2 being integers and P1≥P2, Shift representing a right shift operation on an unsigned number. In some embodiments, the temporal motion prediction motion vector is adjusted to be (SignShift(MVx, P1-P2), SignShift(MVy, P1-P2)), P1 and P2 being integers and P1≥P2, SignShift representing a right shift operation on a signed number. In some embodiments, the temporal motion prediction motion vector is adjusted to be (MVx<<(P1-P2)), MVy<<(P1-P2)), P1 and P2 being integers and P1≥P2, << representing a left shift operation on a signed or an unsigned number.

Figure 28:
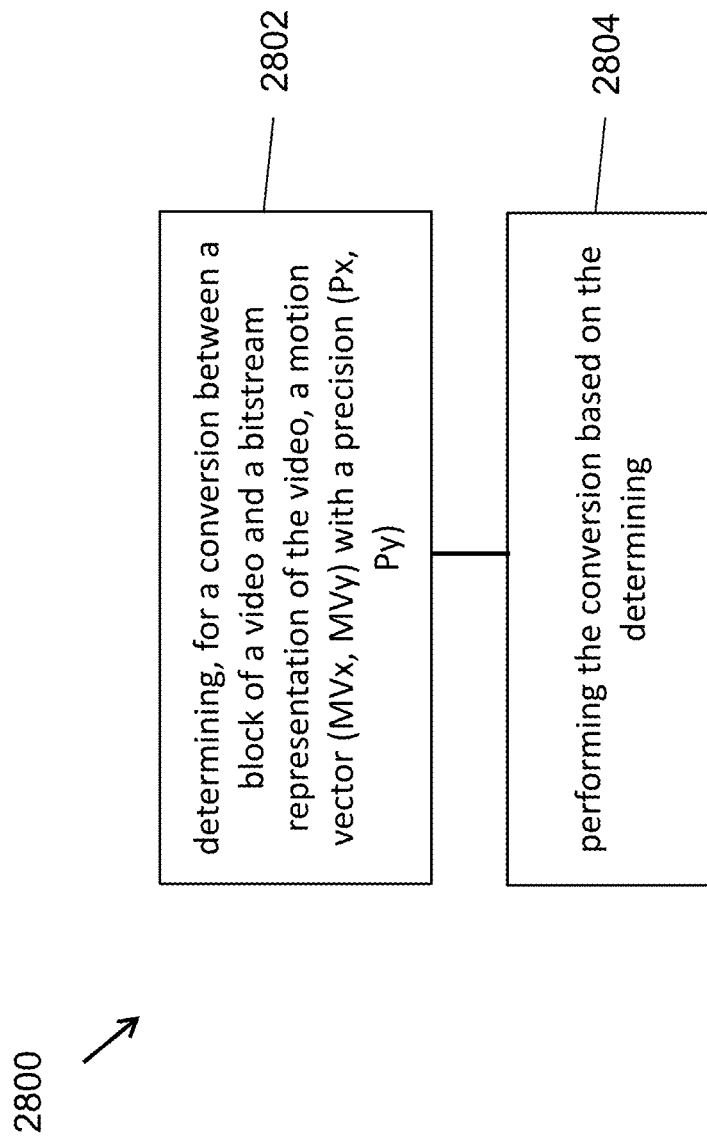
FIG. 28 is a flowchart represent of another method for video processing in accordance with the present disclosure.

FIG. 28 is a flowchart representation of a method 2800 for video processing in accordance with the present disclosure. The method 2800 includes, at operation 2802, determining, for a conversion between a block of a video and a bitstream representation of the video, a motion vector (MVx, MVy) with a precision (Px, Py). Px is associated with MVx and Py is associated with MVy. MVx and MVy are represented using N bits, and MinX≤MVx≤MaxX and MinY≤MVy≤MaxY, MinX, MaxX, MinY, and MaxY being real numbers. The method 2700 also includes, at operation 2804, performing the conversion based on the determining.

In some embodiments, MinX=MinY. In some embodiments, MinX≠MinY. In some embodiments, MaxX=MaxY. In some embodiments, MaxX≠MaxY.

In some embodiments, at least one of MinX or MaxX is based on Px. In some embodiments, the motion vector has a precision denoted as (Px, Py), and wherein at least one of MinY or MaxY is based on Py. In some embodiments, at least one of MinX, MaxX, MinY, or MaxY is based on N. In some embodiments, at least one of MinX, MaxX, MinY, or MaxY for a spatial motion prediction motion vector is different than a corresponding MinX, MaxX, MinY, or MaxY for a temporal motion prediction motion vector. In some embodiments, at least one of MinX, MaxX, MinY, or MaxY is variable according to a profile, a level, or a tier of the video. In some embodiments, at least one of MinX, MaxX, MinY, or MaxY is variable according to a temporal layer of a picture in the video. In some embodiments, at least one of MinX, MaxX, MinY, or MaxY is variable according to a size of a picture in the video. In some embodiments, at least one of MinX, MaxX, MinY, or MaxY is signaled in a video parameter set, a sequence parameter set, a picture parameter set, a slice header, a tile group header, a tile, a coding tree unit, or a coding unit in the bitstream representation. In some embodiments, MVx is clipped to [MinX, MaxX] before being used for spatial motion prediction or temporal motion prediction. In some embodiments, MVy is clipped to [MinY, MaxY] before being used for spatial motion prediction or temporal motion prediction.

Figure 29:
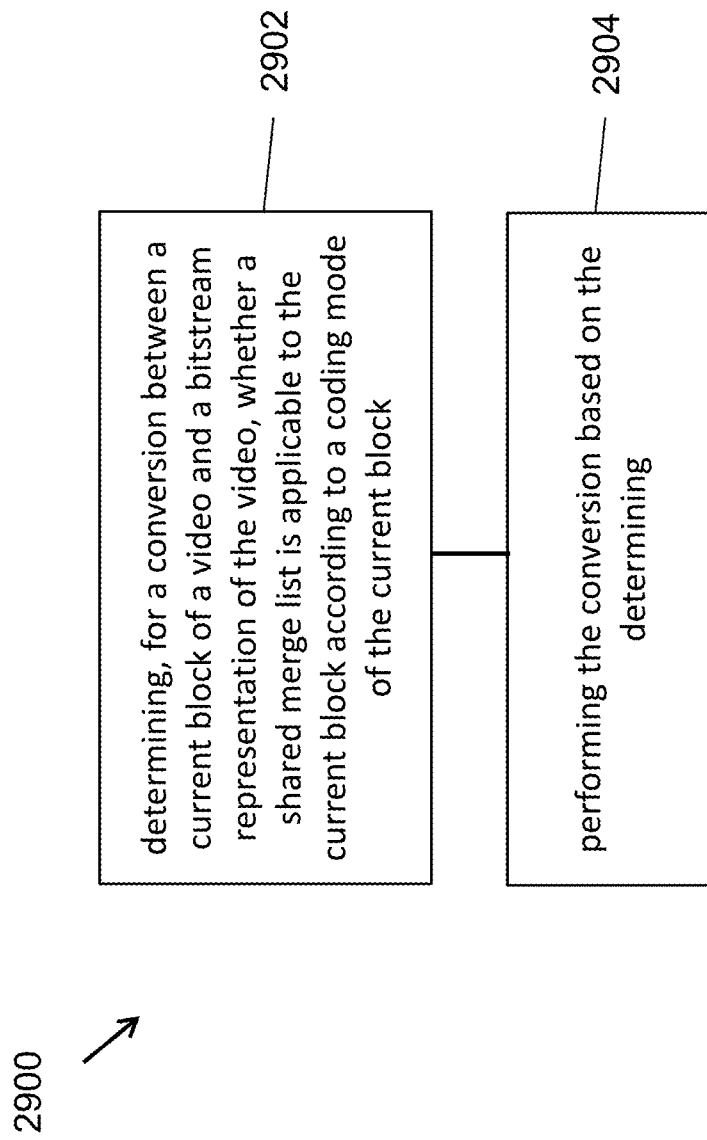
FIG. 29 is a flowchart represent of another method for video processing in accordance with the present disclosure.

FIG. 29 is a flowchart representation of a method 2900 for video processing in accordance with the present disclosure. The method 2900 includes, at operation 2902, determining, for a conversion between a current block of a video and a bitstream representation of the video, whether a shared merge list is applicable to the current block according to a coding mode of the current block. The method 2800 includes, at operation 2904, performing the conversion based on the determining.

In some embodiments, the shared merge list is not applicable in case the current block is coded using a regular merge mode. In some embodiments, the shared merge list is applicable in case the current block is coded using an Intra Block Copy (IBC) mode. In some embodiments, the method further comprises: maintaining, prior to performing the conversion, a table of motion candidates based on past conversions of the video and the bitstream representation; and disabling, after performing the conversion, an update of the table of motion candidates in case the current block is a child of a parent block to which a shared merge list is applicable, and the current block is coded using a regular merge mode.

Figure 30:
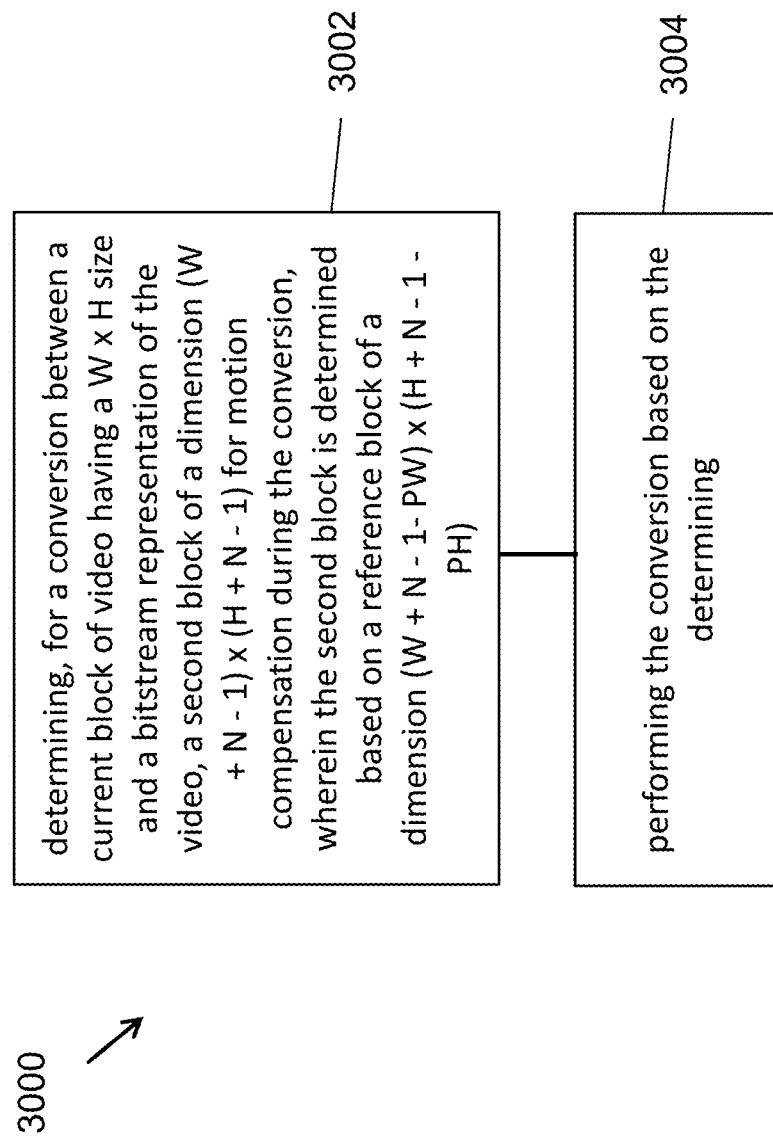
FIG. 30 is a flowchart represent of another method for video processing in accordance with the present disclosure.

FIG. 30 is a flowchart representation of a method 3000 for video processing in accordance with the present disclosure. The method 3000 includes, at operation 3002, determining, for a conversion between a current block of video having a W×H size and a bitstream representation of the video, a second block of a dimension (W+N−1)×(H+N−1) for motion compensation during the conversion. The second block is determined based on a reference block of a dimension (W+N−1−PW)×(H+N−1−PH). N represents a filter size, and W, H, N, PW and PH are non-negative integers. PW and PH are not both equal to 0. The method 3000 also includes, at operation 3004, performing the conversion based on the determining.

In some embodiments, pixels in the second block that are located outside of the reference block are determined by repeating one or more boundaries of the reference block. In some embodiments, PH=0, and at least a left boundary or a right boundary of the reference block is repeated to generate the second block. In some embodiments, PW=0, and at least a top boundary or a bottom boundary of the reference block is repeated to generate the second block. In some embodiments, PW>0 and PH>0, and the second block is generated by repeating at least a left boundary or a right boundary of the reference block and subsequently repeating at least a top boundary or a bottom boundary of the reference block. In some embodiments, PW>0 and PH>0, and the second block is generated by repeating at least a top boundary or a bottom boundary of the reference block and subsequently repeating at least a left boundary or a right boundary of the reference block.

In some embodiments, a left boundary of the reference block is repeated M1 times, and a right boundary of the reference block is repeated (PW−M1) times, M1 being a positive integer. In some embodiments, a top boundary of the reference block is repeated M2 times, and a bottom boundary of the reference block is repeated (PH−M2) times, M2 being a positive integer. In some embodiments, at least one of PW or PH is different for different color components of the current block, the color components including at least a luma component or one or more chroma components. In some embodiments, at least one of PW or PH is variable according to a size or a shape of the current block. In some embodiments, at least one of PW or PH is variable according to a coding characteristic of the current block, the coding characteristic including uni-prediction coding or a bi-prediction coding.

In some embodiments, pixels in the second block that are located outside of the reference block are set to a single value. In some embodiments, the single value is 1<<(BD−1), BD being a bit-depth of pixel samples in the reference block. In some embodiments, BD is 8 or 10. In some embodiments, the single value is derived based on pixel samples of the reference block. In some embodiments, the single value is signaled in a video parameter set, a sequence parameter set, a picture parameter set, a slice header, a tile group header, a tile, a coding tree unit row, a coding tree unit, a coding unit, or a prediction unit. In some embodiments, padding of pixels in the second block that are located outside of the reference block is disabled in case the current block is affine coded.

Figure 31:
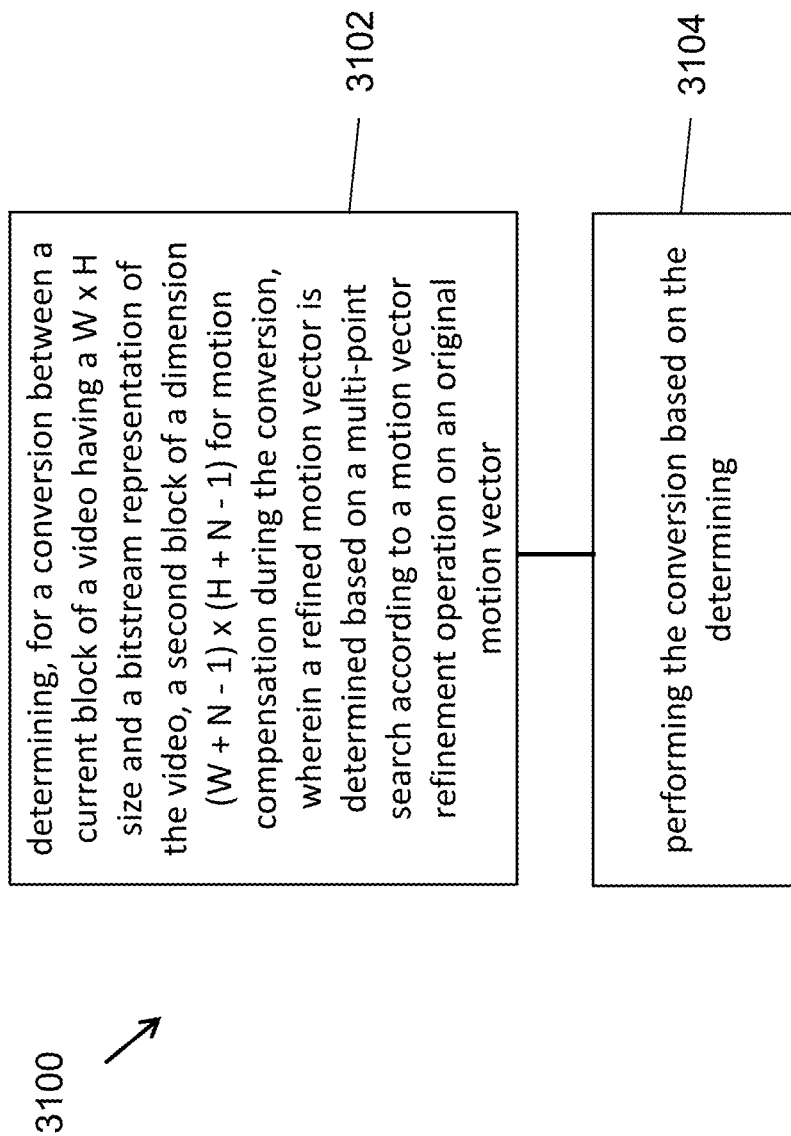
FIG. 31 is a flowchart represent of another method for video processing in accordance with the present disclosure.

FIG. 31 is a flowchart representation of a method 3000 for video processing in accordance with the present disclosure. The method 3000 includes, at operation 3102, determining, for a conversion between a current block of a video having a W×H size and a bitstream representation of the video, a second block of a dimension (W+N−1)×(H+N−1) for motion compensation during the conversion. W, H are non-negative integers, and wherein N are non-negative integers and based on a filter size. During the conversion, a refined motion vector is determined based on a multi-point search according to a motion vector refinement operation on an original motion vector, and wherein pixels long boundaries of the reference block are determined by repeating one or more non-boundary pixels. The method 3100 also includes, at operation 3104, performing the conversion based on the determining.

In some embodiments, processing the current block comprises filtering the current block in a motion vector refinement operation. In some embodiments, whether the reference block is applicable to the processing of the current block is determined based on a dimension of the current block. In some embodiments, interpolating the current block comprises: interpolating multiple sub-blocks of the current block based on the second block. Each sub-block has a size of W1×H1, W1, H1 being non-negative integers. In some embodiments, W1=H1=4, W=H=8, and PW=PH=0. In some embodiments, the second block is determined entirely based on an integer part of a motion vector of at least one of the multiple sub-blocks. In some embodiments, in case a maximum difference between integer parts of motion vectors of all the multiple sub-blocks is equal to or less than 1 pixel, the reference block is determined based on an integer part of a motion vector of a top-left sub-block of the current block, and each of the right boundary and the bottom boundary of the reference block is repeated once to obtain the second block. In some embodiments, in case a maximum difference between integer parts of motion vectors of all the multiple sub-blocks is equal to or less than 1 pixel, the reference block is determined based on an integer part of a motion vector of a bottom-right sub-block of the current block, and each of the left boundary and the top boundary of the reference block is repeated once to obtain the second block. In some embodiments, the second block is determined entirely based on a modified motion vector of one of the multiple sub-blocks.

In some embodiments, in case a maximum difference between integer parts of motion vectors of all the multiple sub-blocks is equal to or less than two pixels, a motion vector of a top-left sub-block of the current block is modified by adding one integer pixel distance to each component to obtain the modified motion vector. The reference block is determined based on the modified motion vector, and each of the left boundary, the right boundary, the top boundary, and the bottom boundary of the reference block is repeated once to obtain the second block.

In some embodiments, in case a maximum difference between integer parts of motion vectors of all the multiple sub-blocks is equal to or less than two pixels, a motion vector of a bottom-right sub-block of the current block is modified by subtracting one integer pixel distance from each component to obtain the modified motion vector. The reference block is determined based on the modified motion vector, and each of the left boundary, the right boundary, the top boundary, and the bottom boundary of the reference block is repeated once to obtain the second block.

Figure 32:
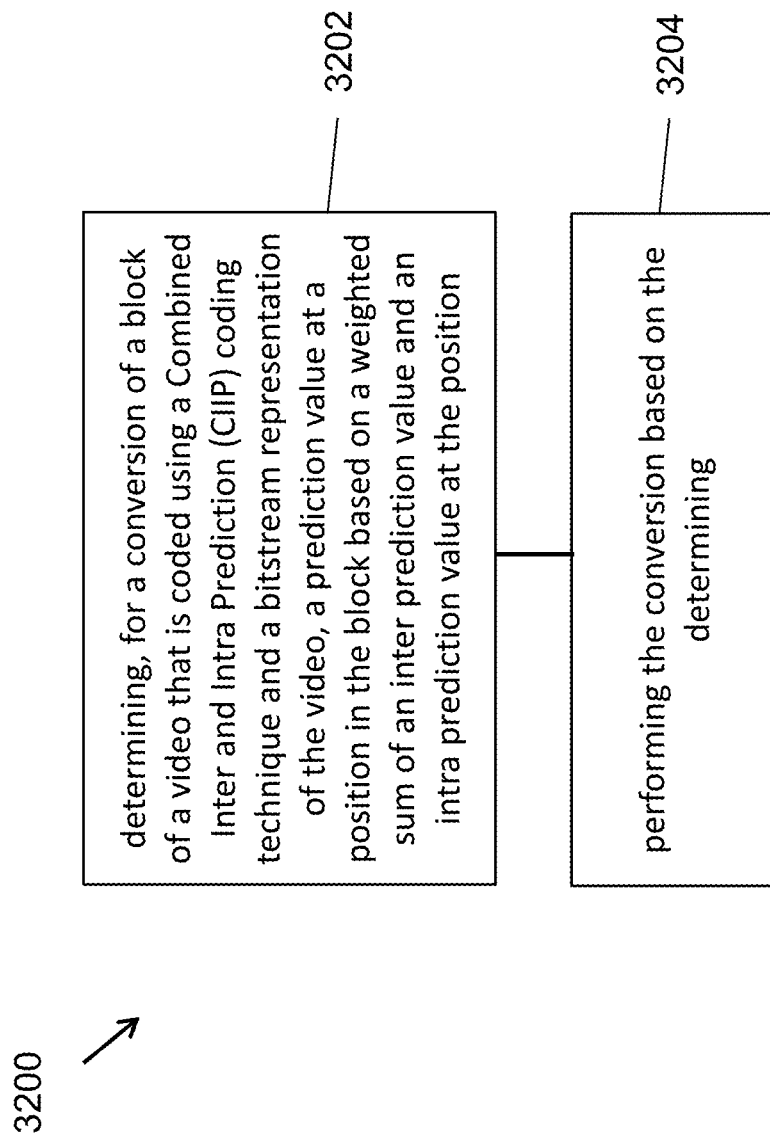
FIG. 32 is a flowchart represent of yet another method for video processing in accordance with the present disclosure.

FIG. 32 is a flowchart representation of a method 3200 for video processing in accordance with the present disclosure. The method 3200 includes, at operation 3202, determining, for a conversion of a block of a video that is coded using a Combined Inter and Intra Prediction (CIIP) coding technique and a bitstream representation of the video, a prediction value at a position in the block based on a weighted sum of an inter prediction value and an intra prediction value at the position. The weighted sum is based on adding an offset to an initial sum obtained based on the inter prediction value and the intra prediction value, and the offset is added prior to a right-shift operation performed to determine the weighted sum. The method 3200 also includes, at operation 3204, performing the conversion based on the determining.

In some embodiments, the position in the block is represented as (x, y), the inter prediction value at the position (x, y) is represented as Pinter(x, y), the intra prediction value at the position (x, y) is represented as Pintra(x, y), an inter-prediction weight at the position (x, y) is represented as w_inter(x, y), and an intra-prediction weight at the position (x, y) is represented as w_intra(x, y). The prediction value at the position (x, y) is determined to be (Pintra(x, y)×w_intra(x, y)+Pinter(x, y)×w_inter(x, y)+offset(x, y))>>N, wherein w_intra(x, y)+w_inter(x, y)=2^N and offset(x, y)=2^(N−1), N being a positive integer. In some embodiments, N=2.

In some embodiments, the weighted sum is determined using equal weights for the inter prediction value and the intra prediction value at the position. In some embodiments, a zero weight is used according to the position in the block to determine the weighted sum. In some embodiments, the zero weight is applied to the inter prediction value. In some embodiments, the zero weight is applied to the intra prediction value.

In some embodiments, performing the conversion in the above methods includes generating the bitstream representation based on the current block of the video. In some embodiments, performing the conversion in the above methods includes generating the current block of the video from the bitstream representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method for video processing, comprising:
   determining, for a conversion between a current block of a video coded using a combined inter and intra prediction coding technique and a bitstream of the video, an intra-prediction mode of the current block independently from an intra-prediction mode of a neighboring block; and
   performing the conversion based on the determining;
   wherein a weight pair is determined for the current block, and the weight pair comprising a first weight for an intermediate inter prediction value of the current block and a second weight for an intermediate intra prediction value of the current block, wherein the combined inter and intra prediction coding technique uses a weighted sum of the intermediate inter prediction value and the intermediate intra prediction value by using the weight pair to derive a prediction value of the current block, and
   wherein the intra-prediction mode of the current block is determined without referencing an intra-prediction mode of any neighboring block,
   wherein whether a combined inter and intra prediction process is applicable to a color component of the current block is determined based on a color format of the current block, and
   wherein in response to the combined inter and intra prediction process being applicable to the color component, the intermediate inter prediction value and the intermediate intra prediction value of the color component are used to derive a prediction value of the color component, and
   wherein a Planar intra prediction mode is used for the current block.

2. The method of claim 1, wherein the neighboring block comprises a block coded using the combined inter and intra prediction coding technique.

3. The method of claim 1, wherein determining the intra-prediction mode bypasses a Most Probable Modes (MPM) construction process of the current block.

4. The method of claim 1, wherein only a subset of a list of Most Probable Modes (MPMs) for a normal intra coding technique is used for the current block.

5. The method of claim 4, wherein the subset comprises a single MPM mode in the list of MPM modes for the normal intra coding technique.

6. The method of claim 4, wherein the single MPM mode is the first MPM mode in the list.

7. The method of claim 5, wherein an index indicating the single MPM mode is omitted in the bitstream.

8. The method of claim 1, wherein whether the combined inter and intra prediction process is applicable to the color component of the current block is further based on a size of the current block.

9. The method of claim 8, wherein the color component comprises a chroma component, and wherein the combined inter and intra prediction process is not performed to the chroma component in case that the color format is 4:2:0 and a width of the current block is equal to or smaller than 4.

10. The method of claim 8, wherein the color component comprises a chroma component, and wherein the combined inter and intra prediction process is not performed to the chroma component in case that the color format is 4:2:0 and a height of the current block is equal to or smaller than 4.

11. The method of claim 8, wherein the chroma component uses a Planar intra prediction mode.

12. The method of claim 8, wherein the color component comprises a chroma component, and wherein the combined inter and intra prediction process is not performed to the chroma component in case that the color format is 4:4:4 and a width or a height of the current block is smaller than 4.

13. The method of claim 1, wherein performing the conversion includes decoding the current block from the bitstream.

14. The method of claim 1, wherein performing the conversion includes encoding the current block into the bitstream.

15. An apparatus for processing video data comprising a processor and a non-transitory memory with instructions thereon, wherein the instructions upon execution by the processor, cause the processor to:
- determine, for a conversion between a current block of a video coded using a combined inter and intra prediction coding technique and a bitstream of the video, an intra-prediction mode of the current block independently from an intra-prediction mode of a neighboring block; and
- perform the conversion based on the determining;
- wherein a weight pair is determined for the current block, and the weight pair comprising a first weight for an intermediate inter prediction value of the current block and a second weight for an intermediate intra prediction value of the current block, wherein the combined inter and intra prediction coding technique uses a weighted sum of the intermediate inter prediction value and the intermediate intra prediction value by using the weight pair to derive a prediction value of the current block, and
- wherein the intra-prediction mode of the current block is determined without referencing an intra-prediction mode of any neighboring block,
- wherein whether a combined inter and intra prediction process is applicable to a color component of the current block is determined based on a color format of the current block, and
- wherein, in response to the combined inter and intra prediction process being applicable to the color component, the intermediate inter prediction value and the intermediate intra prediction value of the color component are used to derive a prediction value of the color component, and
- wherein a Planar intra prediction mode is used for the current block.

16. A non-transitory computer-readable storage medium storing instructions that cause a processor to:
- determine, for a conversion between a current block of a video coded using a combined inter and intra prediction coding technique and a bitstream of the video, an intra-prediction mode of the current block independently from an intra-prediction mode of a neighboring block; and
- perform the conversion based on the determining;
- wherein a weight pair is determined for the current block, and the weight pair comprising a first weight for an intermediate inter prediction value of the current block and a second weight for an intermediate intra prediction value of the current block, wherein the combined inter and intra prediction coding technique uses a weighted sum of the intermediate inter prediction value and the intermediate intra prediction value by using the weight pair to derive a prediction value of the current block, and
- wherein the intra-prediction mode of the current block is determined without referencing an intra-prediction mode of any neighboring block,
- wherein whether a combined inter and intra prediction process is applicable to a color component of the current block is determined based on a color format of the current block;
- wherein, in response to the combined inter and intra prediction process being applicable to the color component, the intermediate inter prediction value and the intermediate intra prediction value of the color component to derive a prediction value of the color component, and
- wherein a Planar intra prediction mode is used for the current block.

17. A non-transitory computer-readable recording medium storing a bitstream of a video which is generated by a method performed by a video processing apparatus, wherein the method comprises:
- determining, for a current block of a video coded using a combined inter and intra prediction coding technique, an intra-prediction mode of the current block independently from an intra-prediction mode of a neighboring block; and
- generating the bitstream from the current block based on the determining;
- wherein a weight pair is determined for the current block, and the weight pair comprising a first weight for an intermediate inter prediction value of the current block and a second weight for an intermediate intra prediction value of the current block, wherein the combined inter and intra prediction coding technique uses a weighted sum of the intermediate inter prediction value and the intermediate intra prediction value by using the weight pair to derive a prediction value of the current block, and
- wherein the intra-prediction mode of the current block is determined without referencing an intra-prediction mode of any neighboring block,
- wherein whether a combined inter and intra prediction process is applicable to a color component of the current block is determined based on a color format of the current block, and
- wherein, in response to the combined inter and intra prediction process being applicable to the color component, the intermediate inter prediction value and the intermediate intra prediction value of the color component to derive a prediction value of the color component, and
- wherein a Planar intra prediction mode is used for the current block.

18. The apparatus of claim 15, wherein the neighboring block comprises a block coded using the combined inter and intra prediction coding technique.

19. The non-transitory computer-readable storage medium of claim 16, wherein the neighboring block comprises a block coded using the combined inter and intra prediction coding technique.

* * * * *